(12) United States Patent
Archer et al.

(10) Patent No.: US 11,728,487 B2
(45) Date of Patent: Aug. 15, 2023

(54) CONDUCTING COATINGS FOR ANODES, METHODS OF MAKING AND USING SAME, AND USES THEREOF

(71) Applicant: CORNELL UNIVERSITY, Ithaca, NY (US)

(72) Inventors: Lynden A. Archer, Ithaca, NY (US); Jingxu Zheng, Shenzen (CN); Tian Tang, Nanchang (CN); Qing Zhao, Tianjin (CN)

(73) Assignee: CORNELL UNIVERSITY, Ithaca, NY (US)

( * ) Notice: Subject to any disclaimer, the term of this patent is extended or adjusted under 35 U.S.C. 154(b) by 0 days.

(21) Appl. No.: 17/604,860

(22) PCT Filed: Apr. 27, 2020

(86) PCT No.: PCT/US2020/030136
§ 371 (c)(1),
(2) Date: Oct. 19, 2021

(87) PCT Pub. No.: WO2020/220042
PCT Pub. Date: Oct. 29, 2020

(65) Prior Publication Data
US 2022/0149378 A1   May 12, 2022

Related U.S. Application Data

(60) Provisional application No. 62/839,485, filed on Apr. 26, 2019.

(51) Int. Cl.
*H01M 4/62* (2006.01)
*H01M 4/04* (2006.01)
(Continued)

(52) U.S. Cl.
CPC ......... *H01M 4/625* (2013.01); *H01M 4/0452* (2013.01); *H01M 4/134* (2013.01);
(Continued)

(58) Field of Classification Search
None
See application file for complete search history.

(56) References Cited

U.S. PATENT DOCUMENTS 6,670,308 B2 * 12/2003 Goyal ................. C23C 18/1635
205/333
9,237,658 B2    1/2016 Dai et al.

FOREIGN PATENT DOCUMENTS

WO    2011/060017 A1    5/2011

OTHER PUBLICATIONS

Yang et al., Graphene anchored on Cu foam as a lithiophilic 3D current collector for a stable and dendrite-free lithium metal anode, Apr. 2018, Journal of Materials Chemistry A, vol. 6, Issue 21, pp. 9899-9905. (Year: 2018).*

(Continued)

*Primary Examiner* — Jonathan Crepeau
*Assistant Examiner* — Angela J Martin
(74) *Attorney, Agent, or Firm* — Paul J. Roman, Jr.; Johnson, Marcou, Isaacs & Nix, LLC

(57) ABSTRACT

Conducting coatings disposed on a metal member. The conducting coatings may have a desired texture and provide homoepitaxial or heteroepitaxial coating of an electrodeposited layer. A conducting coating may be formed by applying a shear force during deposition of the conducting coating. The conducting coatings may be used in anodes of various electrochemical devices. A conducting coating, which may be part of an electrochemical device, may have an electrochemically deposited layer disposed on at least a portion of a surface of the conducting coating. The electrochemically (Continued)

Lattice misfit $\delta = \frac{a_e - a_s}{a_s} \times 100\%$ epitaxial layer
← coherent interface (perfectly matched)
substrate    $\delta < 15\%$ epitaxial layer
← semi-coherent interface (defects involved)
substrate deposited layer may be reversibly electrochemically deposited.

27 Claims, 59 Drawing Sheets

(51) Int. Cl.
*H01M 4/134* (2010.01)
*H01M 10/0525* (2010.01)
*H01M 10/054* (2010.01)
*H01M 4/02* (2006.01)

(52) U.S. Cl.
CPC ...... *H01M 10/054* (2013.01); *H01M 10/0525* (2013.01); *H01M 2004/027* (2013.01)

(56) References Cited

OTHER PUBLICATIONS

Yan, et al., "Superior cycling stability and high rate capability of three-dimensional Zn/Cu foam electrodes for zinc-based alkaline batteries", RSC Advances, vol. 5, issue 102, Sep. 17, 2015 (Sep. 17, 2015).

Yang, et al, "Graphene anchored on Cu foam as a lithiophilic 3D current collector for a stable and dendrite-free lithium metal anode", Journal of Materials Chemistry A, vol. 6, issue 21, Apr. 25, 2018 (Apr. 25, 2018).

Xin, et al, "Dendrite-Free Epitaxial Growth of Lithium-Metal during Charging in Li—O2 Batteries", Angew. Chem. Int'l. Ed vol. 57, issue 40, Aug. 22, 2018 (Aug. 22, 2018).

Zheng, et al, "Reversible epitaxial electrodeposition of metals in battery anodes", Science, vol. 366, Nov. 1, 2019 (Nov. 1, 2019).

* cited by examiner

A

B

B

C

A

B

GSS  SS $$\text{Lattice misfit } \delta = \frac{a_e - a_s}{a_s} \times 100\%$$

epitaxial layer

← coherent interface (perfectly matched)

substrate     $\delta < 15\%$ epitaxial layer

← semi-coherent interface (defects involved)

substrate 12 mins & 0.8 mAh/cm²

Zn on bare stainless steel (SS)

12 mins & 0.8 mAh/cm2

Zn on Ketjen Black coated SS

KB is an amorphous, nano-spherical carbon, as a control.

X-ray diffraction
(ps: 0002 ≡ 002)

Zn plating/stripping reversibility

Zn CE on bare stainless steel

Zn plating/stripping reversibility

| Ref # | Current Density (mA/cm²) | Cycle number | CE of Zn Plating/Stripping |
|---|---|---|---|
| (1) | 0.5 | 1000 | 99.68% |
| (2) | 0.2 | 50 | 99% |
| (3) | 1 | 200 | 99.5% |
| (4) | 10 | 5 | 88%~99% |
| (5) | 1 | 150 | ~96.5% |
| (6) | 0.5 | 12 | ~96% |
| Present work | 40 | 10000 | 99.9% |

Fig. 49

Capacity retention over cycling

Zn||α-MnO$_2$ full cell demonstration under stringent N:P condition

Voltage profile

Nonaqueous electrolytes for Zn batteries

Rationale:

▶ Suppress the $H_2$ generation at Zn anode.

▶ Expand the high-voltage stability at the cathode.

Han et al. *ACS applied materials & interfaces* 8.5 (2016): 3021-3031.

Coulombic efficiency of Zn plating/stripping in
0.2 M Zn(CF$_3$SO$_3$)$_2$ dimethylether

SEM of Zn in Zn(CF$_3$SO$_3$)$_2$ DME. Left: G-SS; Right: SS.

Nonaqueous Zn batteries

▶ Electrolytes that promote fast Zn plating/stripping kinetics.

▶ Zn$^{2+}$/Li$^+$ hybrid battery chemistry.

Lattice parameter of FCC crystals

| Face-Centered Cubic (FCC) | Lattice Parameter a=b=c |
|---|---|
| Ni | 3.54 |
| Cu | 3.61 |
| Rh | 3.80 |
| Ir | 3.83 |
| Pd | 3.88 |
| Pt | 3.91 |
| Al | 4.04 |
| Au | 4.07 |
| Ag | 4.07 |
| Pb | 4.93 |
| Ca | 5.56 |
| Sr | 6.05 |
| Ce | 6.9 |

Fig. 55

Synthesis of Au sheets exposing close-packed (111)

0.005 M HAuCl$_4$ and 0.1 M PVP in ethylene glycol was kept at 120 °C.

Deposition morphology of Al

Al deposits on control substrates: stainless steel, nickel foam

Al deposits on (111)-Au coated stainless steel

D1(Zn) = 2.7Å; D1(G) = 2.5Å;
D2(Zn) = 2.3Å; D2(G) = 2.1Å;

CONDUCTING COATINGS FOR ANODES, METHODS OF MAKING AND USING SAME, AND USES THEREOF

CROSS-REFERENCE TO RELATED APPLICATIONS

This application is a U.S. national stage entry of International Application No. PCT/US2020/030136 filed Apr. 27, 2020, which claims priority to U.S. Provisional Application No. 62/839,485 filed on Apr. 26, 2019, the disclosures of each of which are incorporated herein by reference in their entirety.

STATEMENT REGARDING FEDERALLY SPONSORED RESEARCH

This invention was made with government support under grant no. DE-SC0012673 awarded by the Department of Energy. The government has certain rights in the invention.

BACKGROUND

The electrochemical deposition process is an area of interest due to the important role it plays in the reversibility of energy storage in secondary/rechargeable batteries that utilize electrochemically active metals, including Li, Na, K, Ca, Mg, Zn, and Al as anodes for achieving high cell-level energy storage per unit mass or volume. Such batteries derive their high storage capacity both from the fact that they do not require inactive host materials, such as graphite, to intercalate metal ions during the charge cycle and because oxidation of the metal anode provides an intrinsic source of metal ions. This last trait is particularly significant because it enables rechargeable batteries based cathodes composed of essentially any electrochemically active molecule (e.g. sulfur, oxygen, carbon dioxide, and transition metal compounds) able to undergo reversible redox reactions with the metal ions of interest. In comparison with an intercalating anode, the advantage of a metal anode is therefore on the one hand obvious—the weight, volume from the intercalation host material can be saved and the versatility of cathode choices may lead to dramatic enhancements in the amount of energy stored per unit mass or volume—but on the other hand leads to as significant downsides—the uneven electrodeposition of metals not only leads to material loss via multiple mechanisms but also raises serious safety concerns associated with short circuiting due to the penetration of electrodeposited metal through the separator (see left model in FIG. 1A).

The propensity of metals to form irregular and non-planar electrodeposits at liquid/solid interfaces has emerged as a fundamental barrier to high-energy, rechargeable batteries that utilize metal anodes. The problem of rough, dendritic electrodeposition of metals plays a role in premature failure and short-circuiting of high-capacity metallic battery anodes. Classical transport theory predicts that the growth and proliferation of such dendrites are the result of a combination of morphological and hydrodynamic instabilities, which lead to complex interfacial transport behaviors, including formation of an ion depleted Extended Space Charge Layer (ESCL) near any ion selective interphase in an electrolyte and to the nucleation and rapid growth of diffusion-limited, classical tree-like structures termed dendrites. Dendritic electrodeposition is fundamentally unsafe in the battery context because once formed at a battery anode, dendrites may grow aggressively to fill the inter-electrode space, short-circuiting the battery.

SUMMARY OF THE DISCLOSURE

In an aspect, the present disclosure provides conducting coatings (the conducting coatings may be referred to as epilayers) for reversible metal anodes. The conducting coatings may be epitaxial conducting coatings (e.g., have a desirable amount of lattice mismatch with an electrodeposited layer). The conducting coating may be referred to as a base layer. Non-limiting examples of conducting coatings are provided herein. It is desirable that the conducting coating results in epitaxial electrodeposition, which may be reversible, of a metal. It is desirable that conductive coating is conductive (e.g., able to conduct electrons) so that the electrochemical deposition can occur. A conducting coating may be ordered. A conducting coating may be crystalline. In various examples, a conducting coating is single crystalline or polycrystalline. In certain examples, the conducting coating is textured, preferentially exposing certain crystal facets.

The conducting coating can comprise various materials. The conducting coating materials may comprise (or be) inorganic materials or organic materials. Non-limiting examples of organic conducting materials and inorganic conducting materials are 2-dimensional (2D) organic conducting materials and 2-dimensional (2D) inorganic conducting materials, examples of which are known in the art.

In an aspect, the present disclosure provides anodes. An anode comprises one or more conducting coating(s) of the present disclosure. A portion or all of the conducting coatings may be epitaxial conducting coatings. The anode may be a reversible anode. In various examples, one or more or all of coating(s) is/are made by a method of the present disclosure. In various examples, the anode(s) are part of secondary batteries or secondary cells, which may be rechargeable batteries. An anode may promote epitaxial electrodeposition, which may be reversible, of the reduced form the metal-ions of an ion-conducting electrochemical device.

In an aspect, the present disclosure provides devices. A device comprises one or more conducting coating(s) and/or one or more metal anode(s). A device may exhibit epitaxial electrodeposition (e.g., homoepitaxial electrodeposition or heteroepitaxial deposition) of the metal form of the conducting ions of the device. A device may be an electrochemical device. Non-limiting examples of electrochemical devices include batteries, supercapacitors, fuel cells, electrolyzers, electrolytic cells, and the like. A device may be various batteries.

In an aspect, the present disclosure provides methods of making conducting coatings, anodes, and devices of the present disclosure. In various examples, the conducting coating is formed (e.g., deposited) by a casting method, chemical vapor deposition, physical vapor deposition, electrochemical deposition, or the like. In various examples, the substrate (e.g., metal member) is rotated to a specific orientation and/or at a desired angle during deposition of the conducting coating. In other examples, after deposition of the conducting coating, the conducting coating is subjected a process that provides a coating with a desired orientation. The process may use a shear force (e.g., doctor blading) to provide a desired alignment and/or texture.

In an aspect, the present disclosure provides methods of operating an electrochemical device. The methods provide an electrochemically deposited layer of a metal formed by the reduction of the metal-ions of the metal-ion conducting electrochemical device.

BRIEF DESCRIPTION OF THE FIGURES

For a fuller understanding of the nature and objects of the disclosure, reference should be made to the following detailed description taken in conjunction with the accompanying figures.

FIG. 49 shows a comparison of Zn plating/stripping efficiency with previous work.

FIG. 55 shows lattice parameters of FCC crystals.

DETAILED DESCRIPTION OF THE DISCLOSURE

Figure 1:
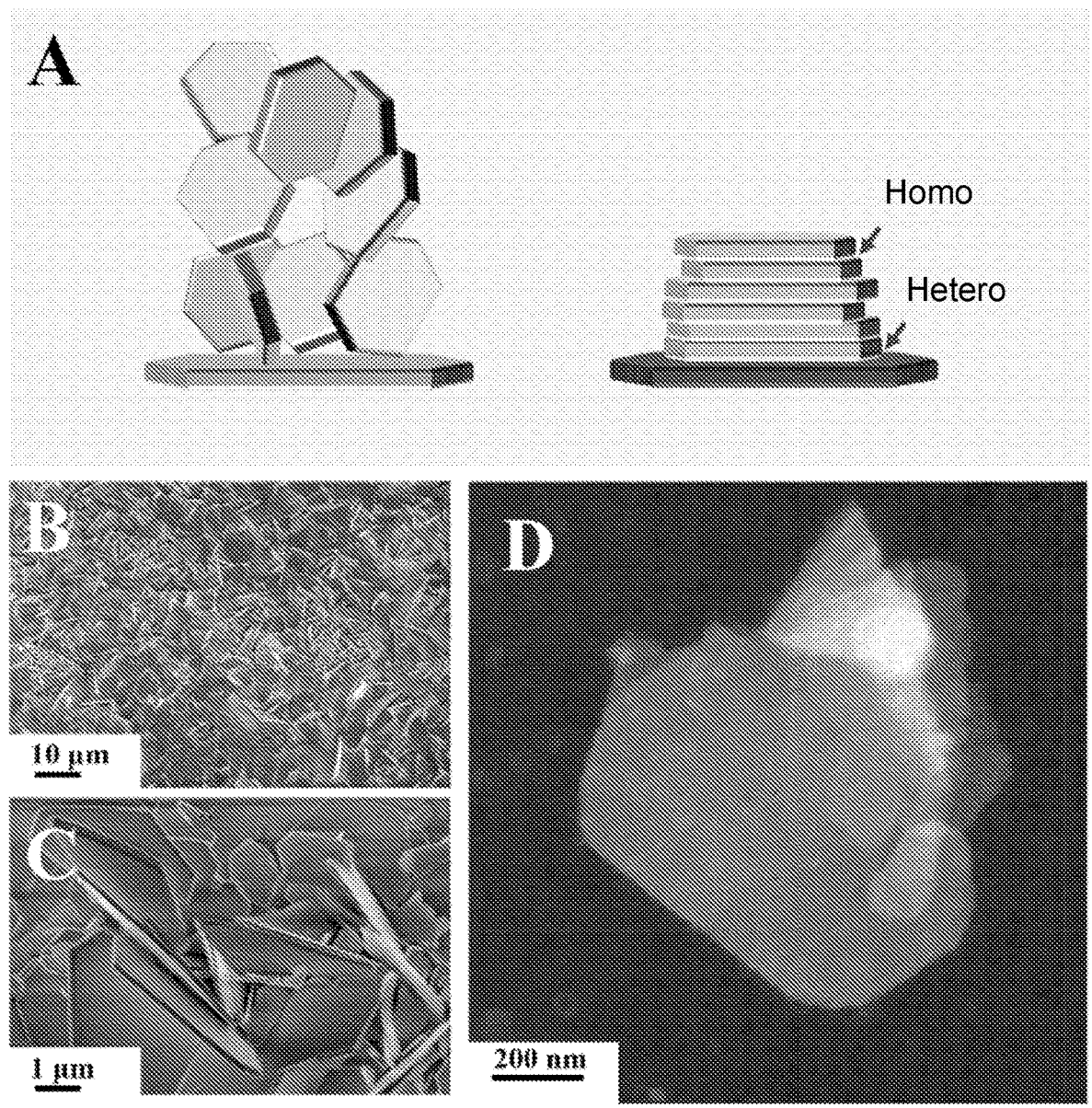
FIG. 1 shows an electrochemical growth pattern of Zn. (A) Scheme illustrating the design principle of epitaxial metal electrodeposition. (B),(C) SEM images and (D) HAADF-STEM image of Zn electrodeposits on bare stainless steel from aqueous electrolyte. Current density J=4 mA/cm$^2$.

Although subject matter of the present disclosure is described in terms of certain embodiments and examples, other embodiments and examples, including embodiments and examples that do not provide all of the benefits and features set forth herein, are also within the scope of this disclosure. For example, various structural, logical, and process step changes may be made without departing from the scope of the disclosure.

The present disclosure provides conducting coatings, which may be used for reversible metal anodes. The present disclosure also provides metal anodes comprising one or more of the conducting coating(s) and devices comprising one or more of the conducting coating(s) and/or one or more of the metal anode(s).

Ranges of values are disclosed herein. The ranges set out a lower limit value and an upper limit value. Unless otherwise stated, the ranges include all values to the magnitude of a value (e.g., either lower limit value or upper limit value) and ranges between the values of the stated range.

The present disclosure describes, for example, methods for creating metal anodes, for example, for rechargeable batteries, with desirable levels of reversibility. For example, electrically conductive coatings of materials, for example, with low lattice misfit (e.g., less than 15%) for the metal anode, are used to facilitate reversible electrodeposition of the metal during the charge and discharge processes. Without intending to be bound by any particular theory, it is considered that the coherent or (semi)coherent interface formed between the conducting coating layer and the newly-deposited metal epitaxially template the nucleation and growth of the metal, which facilitates uniform and compact deposition of the metal. The present disclosure, therefore, may overcome multiple barriers to practical rechargeable batteries that use metal anodes for achieving high energy and power. First, it may promote formation of low-surface area, dense deposits which limit active electrode material loss due to parasitic reactions with liquid and solid-state electrolyte. Second, it may delay the onset of morphological instabilities that produce dendritic electrodeposition during recharge of a metal anode and which are known to produce catastrophic battery failure when dendrites become large-enough to produce internal short circuits in a battery. Finally, the conducting coatings may produce stronger anchoring of the metal electrodeposits to a bulk-like crystalline phase, which prevents physical loss ("orphaning") of the active electrode material as a result of mechanical breakage and electrical disconnection of portions of the metal electrode during battery discharge. As a non-limiting demonstration, metallic zinc electrodes based on the concept of this disclosure were shown to exhibit high greater than 99% Coulombic efficiency and that these high efficiencies can be maintained over 10,000 cycles or more at rates as high as 40 $mA/cm^2$ or greater.

The present disclosure may address a long-standing problem associated with the propensity of all metals to form non-uniform, rough/dendritic electrodeposits with crystal structures that can be completely different from those observed in the bulk. This problem has re-emerged in recent years because rough deposition of metals is now known to pose a particularly stubborn impediment to progress towards practical rechargeable batteries that utilize metals as anodes for achieving high-energy charge storage. Notwithstanding significant efforts by research teams worldwide, no obvious paths forward that would enable progress in overcoming the propensity of all metals to form non-uniform electrodeposits at planar interfaces are presently known. It the present disclosure atomic-scale intervention via an epitaxial mechanism can be used to regulate the nucleation, growth, and morphological evolution of metal electrodes inside a battery. It is desirable that the that the conducting coating is electrochemically inert at the potentials at which the metal is deposited and removed from the battery electrode.

The present disclosure, in an example, uses a Zn anode. In so doing, examples of crystallographic, surface texturing, and electrochemical properties that result in reversible epitaxial electrodeposition at a Zn anode were demonstrated. In this example, it was shown that that textured interphases formed by graphene, which like Zn also crystallizes in a HCP lattice structure, and which exhibits low lattice mismatch to Zn were effective in providing epitaxial electrodeposition of Zn with a locked crystallographic orientation relation with the graphene substrate.

In an aspect, the present disclosure provides conducting coatings (the conducting coatings may be referred to as epilayers) for reversible metal anodes. The conducting coatings may be epitaxial conducting coatings (e.g., have a desirable amount of lattice mismatch with an electrodeposited layer). Lattice mismatch may also be referred to as lattice misfit. The conducting coating may be referred to as a base layer. Non-limiting examples of conducting coatings are provided herein.

The conducting coatings may provide a surface that results in epitaxial (e.g., low lattice mismatch) electrodeposition, which may be reversible, of the reduced form of the metal ions of metal-ion conducting electrochemical devices. Without intending to be bound by any particular theory, it is considered that the conducting coatings promote epitaxial (e.g., low lattice mismatch) electrodeposition of the reduced form of the metal ions of metal-ion conducting electrochemical devices. In various examples, the electrodeposited metals have the same or similar crystal structures to those observed in the bulk material. As an illustrative example, the conducting coatings provide a surface that results in epitaxial (e.g., low lattice mismatch) electrodeposition, which may be reversible, of lithium metal of a lithium-ion conducting electrochemical device (e.g., a lithium-ion conducting battery such as, for example, a primary or secondary lithium-ion conducting battery).

It is desirable that the conducting coating results in epitaxial electrodeposition, which may be reversible, of a metal. It is desirable that conductive coating is conductive (e.g., able to conduct electrons) so that the electrochemical deposition can occur. In certain examples, the conducting coating is textured, preferentially exposing certain crystal facets. Without intending to be bound by any particular theory, it is considered that when the lattice misfit between the conducting coating and the metal is low, the epitaxial effect is strong.

The epitaxial coatings may exhibit a desirable amount of lattice strain (particularly, with regard to the first metal layer deposited on the conducting coating) and/or lattice mismatch. Epitaxial growth of films of metal layer may be based on specific interface structures between the crystal lattices of the layer ($a_{epi}$), which would be the metal layer (e.g., the reduced form of the metal ions of the metal-ion conducting electrochemical device) formed on the epitaxial conducting coating, and substrate ($a_{sub}$), which refers to the epitaxial conducting coating. These interfaces may characterized by the lattice mismatch, which may be defined as f, where $$f = \frac{a_{sub} - a_{epi}}{a_{sub}}.$$

The conducting coating may have a 20% or less lattice mismatch (e.g., 10% or less, 5% or less, 4% or less, 3% or less, 2% or less, or 1% or less), which may be f, with the reduced form (i.e., metal form) of the metal-ions of the metal ion-conducting electrochemical device. The conducting coating may have a 20% or less lattice mismatch (e.g., 10% or less, 5% or less, 4% or less, 3% or less, 2% or less, or 1% or less), which may be f, with the reduced form (i.e., metal form) of the metal-ions of the metal ion-conducting electrochemical device having, for example, a close packed plane, such as, for example, a (001) plane in hexagonal close packed structures, a (111) plane in face centered cubic structures, (110) plane in body centered cubic structures, and the like.

A conducting coating may have various textures. The electrodeposits in general show a preference for exposing the crystal planes that have high packing density, e.g. the close-pack plane. The "texturing" describes a process in which the electrodeposits tend to align their close-packed basal plane horizontally with respect to the electrode surface. The outcome of texturing is the creation of a relatively smooth, compact deposition morphology/microstructure.

A conducting coating may comprise a plurality of aligned domains. A domain may be a particle. For example, a domain is an individual graphene sheet (e.g., graphene nanosheet) or a metal particle (which may be a sheet, such as, for example, a nanosheet), or the like. A conducting coating may have various textures. A desired texture (of a conducting coating and/or an electrodeposited layer) may be horizontally aligned close-packed basal planes with respect to the metal member or anode surface. Such a textured surface may exhibit a desirably smooth, compact morphology/microstructure. In various examples, a textured conducting coating comprises crystalline facets (e.g., disposed on a surface of the conducting coating and available for interaction, for example, with an electrolyte of an electrochemical device) and 20% to 100% (e.g., 50%-100%, 60%-100%, 70-100%, or 80%-100%), including all 0.1% values and ranges therebetween, of the crystalline facets are desired crystalline facets. A desired crystal facet may be a close packed plane, such as, for example, a (001) plane in hexagonal close packed structures, a (111) plane in face centered cubic structures, (110) plane in body centered cubic structures, or the like. The percentage of desired crystalline facets may be determined by methods known in the art. In various examples, the percentage of desired crystalline facets may be determined by X-ray diffraction.

In various examples, the conducting coating exhibits one or both of the following: the conducting coating material preferentially expose a certain set of crystal facets, the lattice misfit between the exposed facet and the anode metal is small, i.e., less than 20% or less than 15%. Without intending to be bound by any particular theory, it is considered that when these conditions are met the metal can be epitaxially electrodeposited, which may be reversible, on the anode surface.

In an illustrative example, the conducting coating is graphene and zinc as the metal produced by electrodeposition. In other illustrative examples, the conducting coating is Au or Ag and the metal produced by electrodeposition is Al. In yet other illustrative examples, the conducting coating is Zr or Ti and the metal produced by electrodeposition is Mg. In still other illustrative examples, the conducting coating is Fe or Cr and the metal produced by electrodeposition is Li.

In various examples, the conducting coating has a bcc crystal structure (e.g., metals, such as, for example, iron, magnesium, molybdenum, chromium, vanadium, tungsten, and the like) and the metal produced by electrodeposition has bcc crystal structure (e.g., metals, such as, for example, sodium, lithium, and the like). In various other examples, the conducting coating has a fcc crystal structure (e.g., metals, such as, for example, silver, gold, and the like) and the metal produced by electrodeposition has fcc crystal structure (e.g., metals, such as, for example, aluminum metal and the like).

The conductive coating may have the same crystal structure as the metal produced by electrodeposition. It is not necessary that the conducting coating has the same crystal structure as the metal produced by electrodeposition. The conductive coating may a different crystal structure than the metal produced by electrodeposition. The conducting coatings may be processed such that a desired surface (e.g., textured surface) is formed.

In various examples, a conducting coating, which may be an epitaxial conducting coating, is disposed on at least a portion of a surface, which may be an exterior surface, of a metal member (e.g., all portions of the metal member that would be or are in contact with the electrolyte of the metal ion-conducting electrochemical device). The conducting coating may promote epitaxial electrodeposition, which may be reversible, of the reduced form the metal-ions of an ion-conducting electrochemical device.

A conducting coating (or an anode comprising one or more conducting coating(s)) may further comprise an electrodeposited layer disposed on at least a portion of an exterior surface of the conducting coating (e.g., at least a portion or all portions of the metal member that would be or are in contact with the electrolyte of the metal ion-conducting electrochemical device). The electrodeposited layer may be the reduced form (i.e., metal form) of the metal ions of a metal ion-conducting battery. For example, epitaxial electrodeposition is provided by a conducting coating that has 20% or less lattice mismatch (e.g., 10% or less, 5% or less, 4% or less, 3% or less, 2% or less, or 1% or less), with the reduced form (i.e., metal form) of the metal-ions of the metal ion-conducting electrochemical device. When the lattice mismatch is greater than 20%, the epitaxial electrodeposition may also occur on a textured conductive coating, which may have exposed a particular (e.g. oriented) crystal facet or plane), in which a certain crystal facet may be exposed (e.g., a close packed plane, such as, for example, a (001) plane in hexagonal close packed structures, a (111) plane in face centered cubic structures, (110) plane in body centered cubic structures, and the like). In various examples, the interface between the conducting coating and electrodepostited layer is coherent or semicoherent.

The conducting coating may epitaxially template deposition of the reduced form (i.e., metal form) of the metal ions of a metal ion-conducting battery. In various examples, the metal-ions lithium ions, sodium ions, potassium ions, calcium ions, magnesium ions, zinc ions, aluminum ions, iron ions, and the like and the reduced form (e.g., metal form) of the metal ions is lithium metal, sodium-metal, potassium metal, calcium metal, magnesium metal, zinc metal, aluminum metal, iron metal, and the like, respectively. The epitaxial templating may be homoepitaxial templating or heteroepitaxial templating.

An electrodeposited layer can have various thickness. The thickness may depend on, for example, battery components, conducting ion/electrodeposited metal, battery capacity, etc. In various examples, an electrodeposited layer has a thickness of 0.5 to 100 microns. The electrodeposited layer may be uniform and/or a smooth morphology (e.g., as determined by AFM, SEM, profilometer, or the like, or a combination thereof.

The conducting coating can comprise various materials. The conducting coating materials may comprise (or be) inorganic materials or organic materials. Non-limiting examples of organic conducting materials and inorganic conducting materials are 2-dimensional (2D) organic conducting materials and 2-dimensional (2D) inorganic conducting materials, examples of which are known in the art.

In various examples, the conducting coating comprises (e.g., is) an organic material. The organic material may be conducting or non-conducting. Non-limiting examples of organic materials include graphene, functionalized graphene, reduced graphene oxide, and the like, C3N4, and the like, which may be crystalline (e.g., crystals). An organic material may be chemically inert and/or electrochemically stable under the electrochemical cycling conditions.

In various examples, the conducting coating comprises (e.g., is) an inorganic material. The inorganic material may be conducting or non-conducting. Non-limiting examples of inorganic materials include inorganic compounds (such as, for example, metal sulfides, $MoS_2$, $TiS_2$, and the like), metals, metal alloys (e.g., metal alloys comprising two or more bcc metals or a fcc metal and a bcc metal), intermetallic compounds, and combinations thereof. Non-limiting examples of metals include gold, silver, zirconium, titanium, iron, chromium, and the like. Non-limiting examples of metal alloys include any combinations of gold, silver, zirconium, titanium, iron, chromium, or the like. An inorganic material may be chemically inert and/or electrochemically stable under the electrochemical cycling conditions.

A conducting coating may be ordered. A conducting coating may be crystalline. In various examples, a conducting coating is single crystalline or polycrystalline.

At least a portion or all of an exterior surface of the metal member (e.g., at least a portion or all portions of the metal member that would be or are in contact with the electrolyte of the metal ion-conducting electrochemical device) may have crystal facets. In various examples, at least a portion or all of an exterior surface of the metal member (e.g., at least a portion or all portions of the metal member that would be or are in contact with the electrolyte of the metal ion-conducting electrochemical device) the crystal facets are a close packed plane, such as, for example, a (001) plane in hexagonal closest packed structure, a (111) plane in face centered cubic structures, (110) plane in body centered cubic structures, or the like.

A conducting coating can have various thicknesses. In various examples, the thickness of the conducting coating is a single layer to 100 μm, including all integer number of layers and integer nm values and ranges thereof therebetween. A single layer may be a single graphene sheet, a monolayer of a metal or monolayer of metal particles.

A metal members may comprise (or be) various materials. A metal member may comprise (or be) a solid metal or a metal foam. A metal member may be a current collector. The metal member may be an active metal member (e.g., the same metal as the electrodeposited metal) or an inactive metal member (e.g., a different metal than the electrodeposited metal). Non-limiting examples of metal members include lithium metal, sodium metal, potassium metal, calcium metal, magnesium metal, zinc metal, aluminum metal, iron metal, stainless steel, copper metal (e.g., copper foil), or the like.

A conducting coating may have one or more desirable property(ies). In various examples, the conducting coating has a conductivity of $10^1$ to $10^9$ S/m, including all integer S/m values and ranges therebetween, the conducting coating is electrochemically stable against anode reaction(s) and/or electrolyte chemistry, the conducing coating has a desirable lattice misfit with an/or similar crystal symmetry to an electrodeposited metal, or a combination thereof.

In an aspect, the present disclosure provides anodes. An anode comprises one or more conducting coating(s) of the present disclosure. A portion or all of the conducting coatings may be epitaxial conducting coatings. The anode may be a reversible anode. In various examples, one or more or all of coating(s) is/are made by a method of the present disclosure. Non-limiting examples of anodes are provided herein.

In various examples, the anode(s) are part of secondary batteries or secondary cells, which may be rechargeable batteries. Non-limiting examples of secondary batteries and primary batteries include Li-ion batteries, Li metal batteries, sodium-ion batteries, sodium-metal batteries, and the like. The electrodes (e.g., cathodes or anodes), electrode materials (e.g., cathode materials or anode materials), catalysts, and catalyst materials may comprise an active material, which may be a catalytic material and/or an anode material or a cathode material. Suitable examples of active materials are known in the art. Non-limiting examples of active materials provided herein. In various examples, an electrode or electrode material does not exhibit metal orphaning. In various examples, an electrode, electrode material, catalyst, or catalyst material does not comprise a binder.

The anode may comprise a current collector other than the anode material(s) (e.g., conducting coating(s) and/or metal member(s)). In an example, an anode does not comprise a metal current collector. The conducting coating may be disposed on a current collector (e.g., a metal current collector). The anode may be free of other conducting materials (e.g., carbon-based conducting materials and the like).

An anode may promote epitaxial electrodeposition, which may be reversible, of the reduced form the metal-ions of an ion-conducting electrochemical device. A conducing coating may comprise (or be) the same metal as the electrodeposited metal. In this case, the electrodeposition is referred to homoepitaxial electrodeposition. A conducing coating may comprise (or be) a different material than electrodeposited metal. In this case, the electrodeposition is referred to heteroepitaxial electrodeposition. For example, epitaxial electrodeposition is provided by a conducting coating that has 20% or less lattice mismatch (e.g., 10% or less, 5% or less, 4% or less, 3% or less, 2% or less, or 1% or less), with the reduced form (i.e., metal form) of the metal-ions of the metal ion-conducting electrochemical device. When the lattice mismatch is greater than 20%, the epitaxial electrodeposition may also occur on a textured conductive coating, which may have exposed a particular (e.g. oriented) crystal facet or plane), in which a certain crystal facet may be exposed. (e.g., a close packed plane, such as, for example, a (001) plane in hexagonal close packed structures, a (111) plane in face centered cubic structures, (110) plane in body centered cubic structures, and the like). The anode may epitaxially (e.g., homoepitaxially or heteroepitaxially) template deposition of the reduced form (i.e., metal form) of the metal-ions of the metal ion-conducting electrochemical device.

In an aspect, the present disclosure provides devices. A device comprises one or more conducting coating(s) and/or one or more metal anode(s). A device may exhibit epitaxial electrodeposition (e.g., homoepitaxial electrodeposition or heteroepitaxial deposition) of the metal form of the conducting ions of the device. Non-limiting examples of devices are provided herein.

A device may be an electrochemical device. Non-limiting examples of electrochemical devices include batteries, supercapacitors, fuel cells, electrolyzers, electrolytic cells, and the like.

A device can be various batteries. Non-limiting examples of batteries include secondary/rechargeable batteries, primary batteries, and the like. A battery may be an ion conducting battery. Non-limiting examples of ion-conducting batteries include lithium-ion conducting batteries, potassium-ion conducting batteries, sodium-ion conducting batteries, magnesium-ion conducting batteries, aluminum-ion conducting batteries, iron-ion conducting batteries, and the like. A battery may be a metal battery, such as, for example, a lithium-metal battery, a sodium-metal battery, magnesium-metal battery, or the like. A device may be a solid-state battery or a liquid electrolyte battery.

In the case of a device, which may be a battery, comprising an anode material or anode of the present disclosure, the device may comprise one or more cathode(s), which may comprise one or more cathode material(s). Examples of suitable cathode materials are known in the art. In various examples, the cathode material(s) is/are one or more lithium-containing cathode material(s), one or more potassium-containing cathode material(s), one or more sodium-containing cathode material(s), one or more magnesium-containing cathode material(s), one or more aluminum-containing cathode material(s), or the like. Examples of suitable cathode materials are known in the art. Non-limiting examples of lithium-containing cathode materials include lithium nickel manganese cobalt oxides, $LiCoO_2$, $LiNi_{1/3}Co_{1/3}Mn_{1/3}O_2$, $LiNi_{0.5}Co_{0.2}Mn_{0.3}O_2$, lithium manganese oxides (LMOs), lithium iron phosphates (LFPs), $LiMnPO_4$, $LiCoPO_4$, and $Li_2MMn_3O_8$, where M is chosen from Fe, Co, and the like, and combinations thereof, and the like, and combinations thereof. Non-limiting examples of sodium-containing cathode materials include $Na_2V_2O_5$, $P2-Na_{2/3}Fe_{1/2}Mn_{1/2}O_2$, $Na_3V_2(PO_4)_3$, $NaMn_{1/3}Co_{1/3}Ni_{1/3}PO_4$, $Na_{2/3}Fe_{1/2}Mn_{1/2}O_2$@graphene composites, and the like, and combinations thereof. Non-limiting examples of magnesium-containing cathode materials include magnesium-containing materials (such as, for example, $MgMSiO_4$ (M is Fe, Mn, or Co) materials and $MgFePO_4F$ materials, and the like), $FeS_2$ materials, $MoS_2$ materials, $TiS_2$ materials, and the like. Any of these cathodes/cathode materials may comprise a conducting carbon aid.

The device, which may be a battery, may comprise a conversion-type cathode. Non-limiting examples of conversion-type cathode materials include air (e.g., oxygen), iodine, sulfur, sulfur composite materials, polysulfides, metal sulfides, such as, for example, $MoS_2$, $FeS_2$, $TiS_2$, and the like, and combinations thereof.

A device, which may be a battery, may further comprise a solid electrolyte or liquid electrolyte. It may be desirable that the electrolyte by non-flammable (e.g., a non-flammable aqueous electrolyte). Examples of suitable electrolytes are known in the art.

A device may further comprise a current collector disposed on at least a portion of the anode(s). In various examples, the current collector is a conducting metal or metal alloy.

An electrolyte, a cathode, an anode, and, optionally, the current collector may form a cell of a battery. The battery may comprise a plurality of the cells and each adjacent pair of the cells is separated by a bipolar plate. The number of cells in the battery is determined by the performance requirements (e.g., voltage output and the like) of the battery and is limited only by fabrication constraints. For example, the battery comprises 1 to 500 cells, including all integer number of cells and ranges therebetween.

A metal-ion conducting secondary/rechargeable battery may comprise one or more conducting(s). A battery may further comprise an aqueous or non-aqueous electrolyte. The coating(s) may exhibit epitaxial relation with an electrochemically deposited metal.

In various examples, a battery is a zinc-ion conducting secondary/rechargeable battery comprising one or more graphene conducting coating(s) (e.g., one or more anode(s) of the present disclosure comprising one or more graphene conducting coating(s)) and an aqueous electrolyte, an aluminum-ion conducting secondary/rechargeable battery comprising one or more gold (e.g., gold nanosheet) conducting coating(s) (e.g., one or more anode of the present disclosure comprising one or more gold (e.g., gold nanosheet) conducting coating(s) and an aqueous or non-aqueous electrolyte.

A battery may have one or more desirable property(ies). In various examples, a battery exhibits at least 1,000, at least 2,500, at least 5,000, at least 7,500, or at least 10,000 charging/discharging cycles without failure; exhibits one or more or all charging/discharging cycle(s) with a Coulombic efficiency of at least 90%, at least 95%, at least 98%, or at least 99%, or at least 99.5%; does not exhibit detectible dendritic growth and/or orphaning; exhibits one or more or all charging/discharging cycle(s) with a Coulombic efficiency of 95% or greater for 1,000 cycles or greater, 2500 cycles or greater, 5,000 cycles or greater, 7,500 cycles or greater, or 10,000 cycles or greater and/or at rate of 40 mA/cm$^2$ or greater; or any combination thereof.

In an aspect, the present disclosure provides methods of making conducting coatings, anodes, and devices of the present disclosure. Non-limiting examples of methods are provided herein.

A conducting coating may be formed by various methods. In various examples, the conducting coating is formed (e.g., deposited) by a casting method, chemical vapor deposition, physical vapor deposition, electrochemical deposition, or the like. Non-limiting examples of casting methods include slurry casting, solution casting, and the like. In various examples, the substrate (e.g., metal member) is rotated to a specific orientation and/or at a desired angle during deposition of the conducting coating. In other examples, after deposition of the conducting coating, the conducting coating is subjected a process that provides a coating with a desired orientation. The process may use a shear force (e.g., doctor blading) to provide a desired alignment and/or texture. In the case of methods using a solvent, the solvent may be removed such that the alignment of the conducting coating is retained or substantially retained.

In an example, a method of forming a conducting coating comprises: coating a substrate (e.g., a metal member) with a suspension of graphene (e.g., graphene flakes, which may have an aspect ratio (sheet diameter : thickness ratio) of 100 or greater, 500 or greater, 750 or greater, or 1,000 or greater than 750) in solvent under a shear strain, where a graphene conducting coating is formed, and removing the solvent. The graphene conducting coating may exhibit desirable alignment and/or texture.

It is desirable that the graphene suspension comprises a solvent and graphene content where the suspension exhibits shear thinning behavior. It is desirable that under the shear strain, the graphene suspension provides a layer of aligned graphene (e.g., a layer of horizontally aligned graphene sheets). In various examples, all or substantially all (e.g., at least 75%, at least 80%, at least 90%, at least 95%, or at least 99% of the graphene sheets) have the $[0001]_{graphene}$ surface perpendicular to the surface of the substrate on which the graphene sheets are disposed. A suitable shear force may be provided by a doctor blade. Without intending to be bound by any particular theory, it is considered that the shear force breaks down correlations between graphene sheets and aligns the graphene sheets. The solvent may be removed such that the aligned graphene structure is retained or substantially retained.

In an aspect, the present disclosure provides methods of operating an electrochemical device. The methods provide an electrochemically deposited layer of a metal formed by the reduction of the metal-ions of the metal-ion conducting electrochemical device.

In various examples, during an epitaxial electrodeposition process at an anode of the present disclosure, which may be present in an electrochemical devices, such as, for example, a battery, an electrochemically inactive substrate with the right crystal symmetry and lattice parameters would, upon charging, facilitate the homoepitaxial or heteroepitaxial nucleation and growth of the electrochemically active metal in a strain-free or substantially strain-free state. Once the active metal nucleates cover the surface of the substrate, the as-deposited metal layer would then serve as the new substrate that facilitates subsequent self-templated, homoepitaxial deposition (see right model in FIG. 1) to create large and uniform metal coatings at the electrode. Upon discharging, the metal is stripped away while the electrochemically inactive substrate remains intact and therefore available for a subsequent cycle of charge and discharge.

In an example, an electrochemical device is under current flow and an electrochemically deposited layer of a metal formed by the reduction of the metal-ions of the metal-ion conducting electrochemical device is formed on at least a portion of the conducting coating of the electrochemical device. The electrochemically deposited layer may be reversibly formed. In various examples, the electrochemically deposited layer is reversibly formed (e.g., under charging/discharging conditions), at least 1,000, at least 2,500, at least 5,000, at least 7,500, or at least 10,000 times without failure and the electrochemical deposition may exhibit a Coulombic efficiency of at least 90%, at least 95%, at least 98%, least 99%, or at least 99.5%. The interface between the conducting coating and electrodeposited layer may be coherent or semicoherent. In the case where the electrodeposited layer is formed multiple times, at least a portion or all of the interfaces between the conducting coating and electrodeposited layer may, independently, be coherent or semicoherent.

The following Statements provide examples of conducting coatings, anodes, devices, and methods of the present disclosure:

Statement 1. An anode, which may be for a metal ion-conducting electrochemical device, comprising (consisting essentially of or consisting of) a metal member; a conducting coating, which may be an epitaxial conducting coating, disposed on at least a portion of the metal member (e.g., all portions of the metal member that would be or are in contact with the electrolyte of the metal ion-conducting electrochemical device). The conducting coating may promote epitaxial electrodeposition, which may be reversible, of the reduced form the metal-ions of an ion-conducting electrochemical device. For example, epitaxial electrodeposition is provided by a conducting coating that has 20% or less lattice mismatch (e.g., 10% or less, 5% or less, 4% or less, 3% or less, 2% or less, or 1% or less), with the reduced form (i.e., metal form) of the metal-ions of the metal ion-conducting electrochemical device. When the lattice mismatch is greater than 20%, the epitaxial electrodeposition may also occur on a textured conductive coating, which may have exposed a particular (e.g. oriented) crystal facet or plane), in which a certain crystal facet may be exposed (e.g., a close packed plane, such as, for example, a (001) plane in hexagonal close packed structures, a (111) plane in face centered cubic structures, (110) plane in body centered cubic structures, and the like).

Statement 2. The anode of Statement 1, wherein the conducting coating epitaxially (e.g., homoepitaxially or heteroepitaxially) templates deposition of the reduced form (i.e., metal form) of the metal-ions of a metal ion-conducting electrochemical device. The interface between the conducting coating and electrodepostited layer may be coherent or semicoherent.

Statement 3. The anode of Statement 1 or 2, wherein the conducting coating comprises (e.g., is) an organic material (e.g., graphene, functionalized graphene, reduced graphene oxide, $C_3N_4$, or the like), an inorganic material (e.g., an inorganic compound such as, for example, metal sulfides, $MoS_2$, $TiS_2$, and the like), a metal, a metal alloy (e.g., between two or more bcc metals or a fcc metal and a bcc metal, where the alloy is chemically inert and/or electrochemically stable under the electrochemical cycling conditions), or intermetallic compound, or a combination thereof. Non-limiting examples of organic conducting materials and inorganic conducting materials are 2-dimensional (2D) organic conducting materials and 2-dimensional (2D) inorganic conducting materials, examples of which are known in the art.

Statement 4. The anode of Statement 3, wherein the conducting coating is graphene, reduced graphene oxide, functionalized graphene, or the like.

Statement 5. The anode of Statement 3, wherein the conducting coating is a metal (e.g., gold, silver, zirconium, titanium, iron, chromium, or the like), a metal alloy (e.g., a metal alloy of any combination of gold, silver, zirconium, titanium, iron, chromium, or the like, or a combination thereof.

Statement 6. The anode of any one of the preceding Statements, wherein the conducting coating is crystalline (e.g., single-crystalline).

Statement 7. The anode of any one of the preceding Statements, wherein at least a portion or all of an exterior surface of the metal member (e.g., at least a portion or all portions of the metal member that would be or are in contact with the electrolyte of the metal ion-conducting electrochemical device) have crystal facets (e.g., a close packed plane, such as, for example, a (001) plane in hexagonal closest packed structure, a (111) plane in face centered cubic structures, (110) plane in body centered cubic structures, and the like and/or 20% to 100% (e.g., 50%-100%, 60%-100%, 70-100%, or 80%-100%), including all 0.1% values and ranges therebetween, of the crystalline facets are the desired crystalline facets.)

Statement 8. The anode of any one of the preceding Statements, wherein the thickness of the conducting coating is a single layer to 100 μm, including all integer number of layers and integer nm values and ranges thereof therebetween.

Statement 9. The anode of any one of the preceding Statements, wherein the conducting coating has a conductivity of $10^1$ to $10^9$ S/m, including all integer S/m values and ranges therebetween.

Statement 10. The anode of any one of the preceding Statements, wherein the conducting coating is deposited by a casting method (e.g., slurry casting, solution casting, and the like), chemical vapor deposition, physical vapor deposition, electrochemical deposition, or the like.

Statement 11. The anode of any one of the preceding Statements, wherein the metal-ions of the metal ion-conducting electrochemical device are lithium ions, sodium ions, potassium ions, calcium ions, magnesium ions, zinc ions, aluminum ions, iron ions, or the like.

Statement 12. The anode of any one of the preceding Statements, wherein the metal member (which may be an active metal member (e.g., the same metal as the electrodeposited metal) or an inactive metal member (e.g., a different metal than the electrodeposited metal)) is lithium metal, sodium metal, potassium metal, calcium metal, magnesium metal, zinc metal, aluminum metal, iron metal, stainless steel, copper metal (e.g., copper foil), or the like. A metal member may comprise (or be) a solid metal or a metal foam.

Statement 13. A device comprising one or more anode(s) of the present disclosure (e.g., one or more anode(s) of any one of Statements 1-12 and/or one or more anode(s) made by a method of the present disclosure).

Statement 14. The device of Statement 13, wherein the device is an electrochemical device. The conduction process of the electrochemical device may involve reduction of metal ions to form a metal and oxidation of that metal to form metal ions.

Statement 15. The device of Statement 14, wherein the electrochemical device is a battery (e.g., a secondary/rechargeable battery, a primary battery, and the like), a supercapacitor, a fuel cell, an electrolyzer, an electrolytic cell, or the like.

Statement 16. The device of Statement 15, wherein the battery is an ion-conducting battery (e.g., a metal-ion conducting battery).

Statement 17. The device of Statement 16, wherein the ion-conducting battery is a lithium-ion conducting battery, a potassium-ion conducting battery, a sodium-ion conducting battery, a calcium-ion conducting battery, a magnesium-ion conducting battery, a zinc-ion conducting battery, an aluminum-ion conducting battery, iron-ion conducting battery, or the like.

Statement 18. The device of any one of Statements 15-17, wherein the battery further comprises a cathode (e.g., a cathode comprising a conversion material or intercalation material) and/or one or more electrolyte(s) and/or, optionally, one or more current collector(s) and/or, optionally, one or more additional structural component(s). Examples of conversion materials and intercalation materials are known in the art.

Statement 19. The device of Statement 18, wherein the electrolyte is a liquid electrolyte or solid-state electrolyte.

Statement 20. The device of Statement 19, wherein the liquid electrolyte is an aqueous electrolyte or a non-aqueous electrolyte (e.g., carbonate-based electrolytes, ether-based electrolytes, or the like, or combinations thereof).

Statement 21. The device of any one of Statements 18-20, wherein the one or more additional structural component(s) is/are chosen from bipolar plates, external packaging, and electrical contacts/leads to connect wires, and combinations thereof.

Statement 22. The device of any one of Statements 15-21, wherein the battery comprises a plurality of cells, each cell comprising one or more electrode (e.g., one or more cathode and/or anode) or one or more electrode material (e.g., one or more cathode material and/or anode material), and optionally, one or more anode(s), electrolyte(s), current collector(s), or a combination thereof.

Statement 23. The device of Statement 22, wherein the battery comprises 1 to 500 cells.

Statement 24. The device of any one of Statement 14-23, wherein device is configured so that the conducting metal ions electrodeposit (e.g., reversibly electrodeposit) on at least a portion or all of the surface of the conducting coating in contact with the electrolyte forming a metal layer comprising one or more crystalline domains or a crystalline metal layer.

Statement 25. The device of Statement 24, wherein the electrochemically deposited metal layer has low surface area and/or high density. The density of the epitaxially deposited metal may be bulk metal density or substantially bulk metal density (e.g., within 5% or less, 4% or less, 3% or less, 2% or less, 1% or less, or 0.1% or less of bulk density).

Statement 26. The device of Statement 24 or 25, wherein the electrochemically deposited metal layer comprises metal layers, which may be uniform.

Statement 27. The device of any one of Statements 15-26, wherein battery exhibits one or more of the following: the battery does not exhibit detectible (e.g., detectible by imaging techniques, such as, for example, SEM, TEM, and the like) dendritic growth (e.g., dendritic growth pattern) and/or orphaning, and/or a plating and/or stripping Coulombic efficiency of 95% or greater, 98% or greater, 99% or greater, or 99.5% or greater, and/or a plating and/or stripping Coulombic efficiency of 95% or greater, 98% or greater, 99% or greater, or 99.5% or greater for 10,000 cycles or greater and/or at rate of 40 mA/cm$^2$ or greater.

The steps of the methods described in the various embodiments and examples disclosed herein are sufficient to produce a conducting coating, an anode, or device, or carry out a method of the present disclosure. Thus, in an embodiment, a method consists essentially of a combination of the steps of the methods disclosed herein. In another embodiment, a method consists of such steps.

The following Examples are presented to illustrate the present disclosure. These examples are not intended to be limiting in any matter.

EXAMPLE 1

This example provides a description of conducting coatings, anodes, and devices of the present disclosure.

This example describes an epitaxial mechanism to regulate nucleation, growth, and reversibility of metal anodes. The crystallographic, surface texturing, and electrochemical criteria for reversible epitaxial electrodeposition of metals are defined and their effectiveness demonstrated using Zn, a safe, low-cost and energy-dense battery anode material. Graphene, with low lattice mismatch for Zn, is shown to be effective in driving deposition of Zn with a locked crystallographic orientation relation. The resultant epitaxial Zn anodes achieve exceptional reversibility over thousands of cycles at moderate and high rates. Reversible electrochemical epitaxy of metals provides a general pathway towards energy-dense batteries with high reversibility.

In an epitaxial electrodeposition process, a film electrodeposited film forms a (semi-)/coherent lattice interface with the substrate. The single crystalline new phase (epilayer) exhibits a correlated orientation in relation to the substrate and low residual stresses. Typically, the strongest orientation correlations are achieved through directed nucleation and growth of the epilayer on a substrate that imposes minimal lattice strain. The process can be used to deposit metals, e.g. Cu and Pt, on substrates of different chemistries. Textured interphases which add negligibly to the mass of a battery electrode and which form low-lattice-misfit interfaces are of specific interest in the present study. Furthermore, because the epilayer and substrate can be composed of the same (homo-) or different (hetero-) materials, either homoepitaxy or heteroepitaxy could be used in the process.

During charging, an electrochemically inactive interphase with selected crystal symmetry and lattice parameters would facilitate heteroepitaxial nucleation and growth of a metal anode in a strain-free state. Once the nucleates cover the substrate, the as-deposited metal layer would then facilitate homoepitaxial deposition (FIG. 1A) to create uniform metal coatings. Upon discharging, the metal is stripped away while the substrate remains intact and therefore available for a subsequent cycle of charge and discharge.

The morphology and reversibility of a zinc metal anode in a 2M-ZnSO4 aqueous electrolyte was studied. This system is of interest because rechargeable batteries based on Zn anodes have remerged as an area of scientific and technological interest. Important considerations in choosing Zn include—its low reactivity and relatively low cost; the divalent Zn can be electrochemically coupled with low-cost cathode chemistries (e.g. $MnO_2$) in non-flammable aqueous electrolytes; and Zn anodes do not suffer from continuous parasitic reaction with electrolyte. The last of these attributes is the most important for the present example, because it allows us to focus on the atomic scale processes that control the onset of morphological instability in the metal anode. Furthermore, Zn has a much higher Young's modulus than alkali metals of contemporary interest as battery anodes ($E_{Zn} \approx 108$ GPa; $E_{Li} \approx 5$ GPa; $E_{Na} \approx 10$ GPa); once formed, Zn dendrites can more easily proliferate to cause battery failure by metal orphaning or short-circuiting mechanisms.

Figure 5:
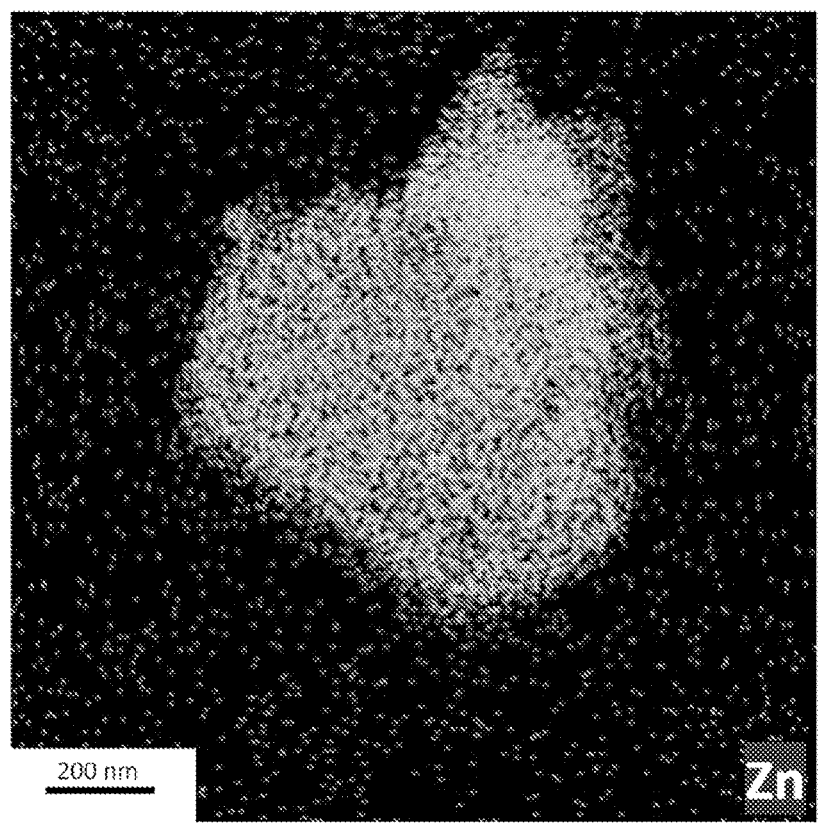
FIG. 5 shows energy dispersive spectroscopy of an Zn deposit under STEM.
Figure 6:
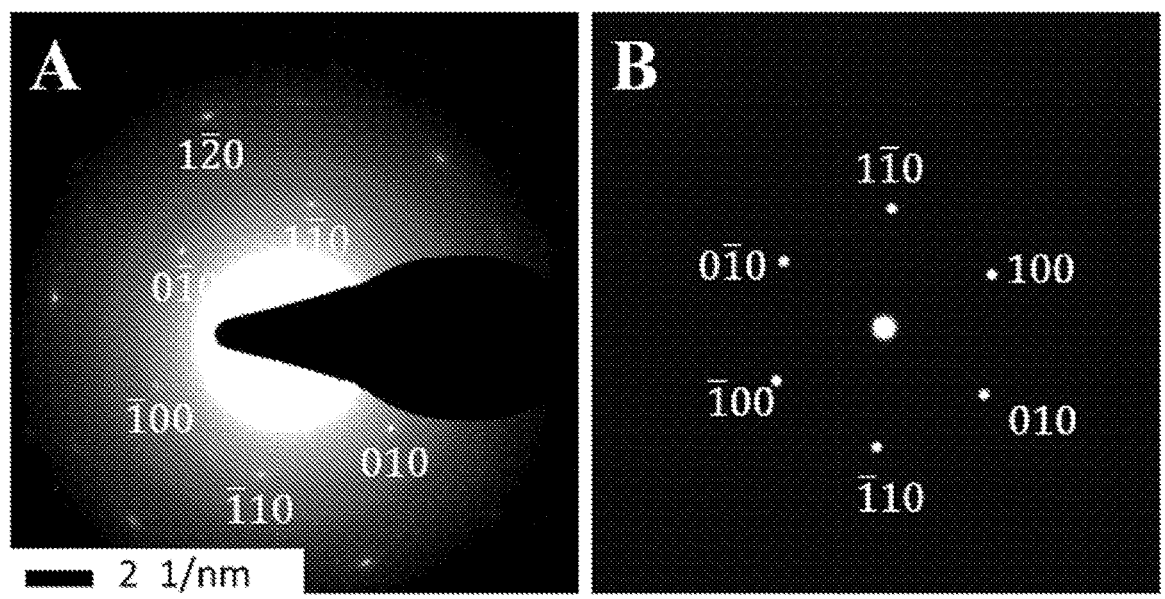
FIG. 6 shows a TEM diffraction pattern (A) and simulated diffraction pattern (B) of a $[0001]_{Zn}$.
Figure 7:
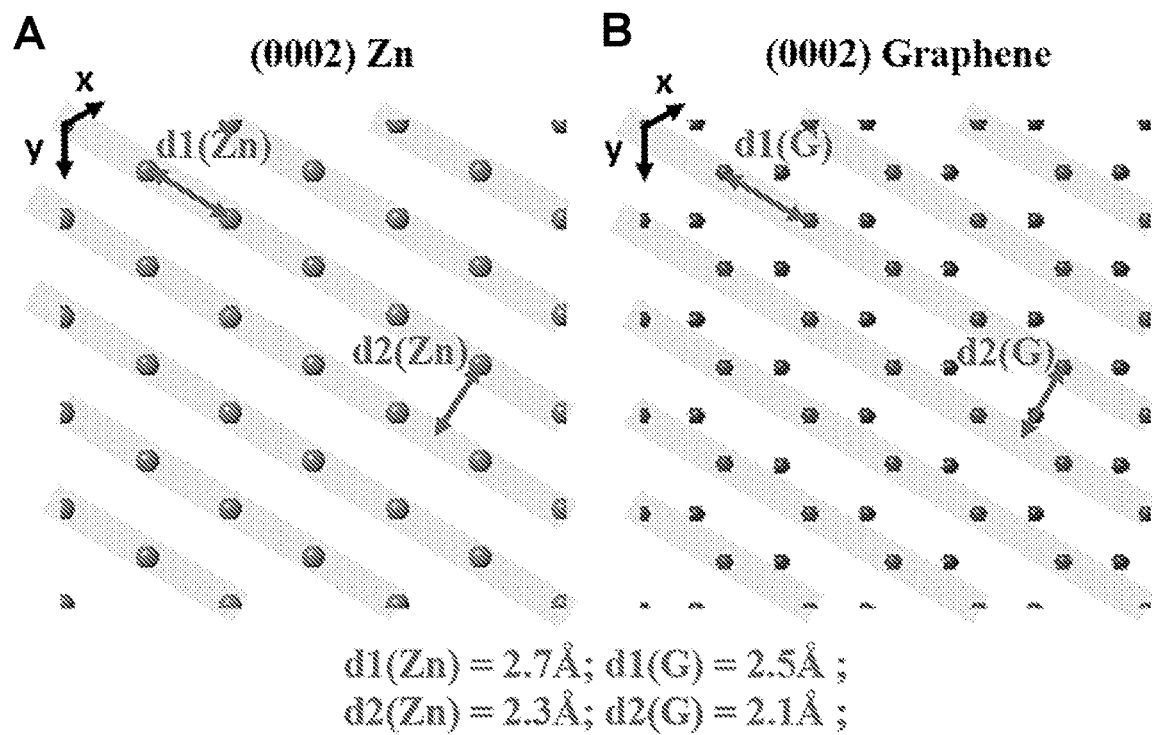
FIG. 7 shows atomic arrangements of (A) (0002)Zn and (B) (0002)Graphene. The lattice misfit between graphene and Zn is δ≈7%, indicating that the interface formed between graphene and Zn is semicoherent, and is hence energy favorable.

FIG. 1B-D report the intrinsic growth mode of electrodeposited Zn. Zn exhibits a strong tendency to deposit as platelets, implying that a lower thermodynamic free energy is associated with the exposed closest packed plane, i.e. (0002) in HCP. High angle annular dark field scanning transmission electron microscopy (HAADF-STEM) (FIG. 1D, EDS mapping in FIG. 5), confirms the plate-like morphology. The electron diffraction pattern (FIG. 5) shows that the plane normal of the Zn plate is $[0001]_{Zn}$. Therefore, a candidate substrate for epitaxial electrodeposition of Zn should show similar atomic arrangement to the $(0002)_{Zn}$ plane (FIG. 7).

A preliminary screening based on crystal structure was performed. Criteria included: (a) Does the crystal plane exhibits a small lattice misfit with $(0002)_{Zn}$. Numerically, the lattice misfit should be no larger than 25% as an empirical value to form a (semi)coherent interface; and (b) Does the crystal plane of interest have a low lattice index. A low lattice index is preferred because it indicates higher atomic packing density and therefore higher surface stability. Finally, the substrate should remain intact and therefore electrochemically inactive during cycling. Within this screening framework, graphene stands out as a candidate material that meets all the specified criteria (FIG. 7).

Figure 2:
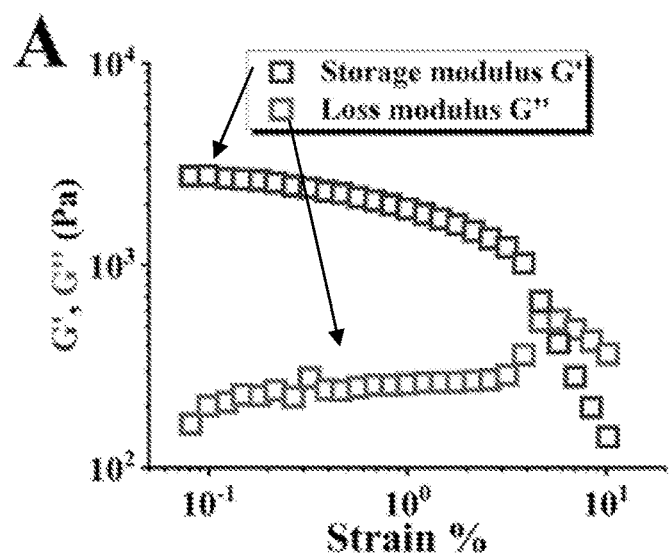
FIG. 2 shows preparation of an epitaxial substrate in which graphene sheets are parallel to the substrate. (A) Strain sweep of the 4% graphene in NMP slurry. SEM images of graphene membranes prepared (B) with and (C) without the shearing.
Figure 2:
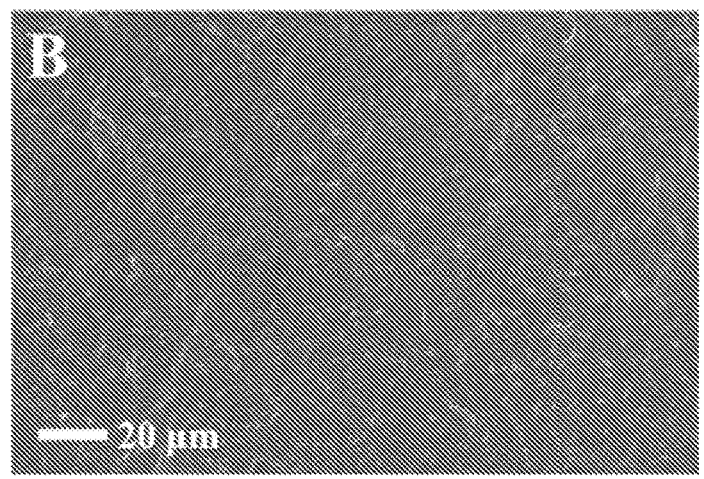
Figure 2:
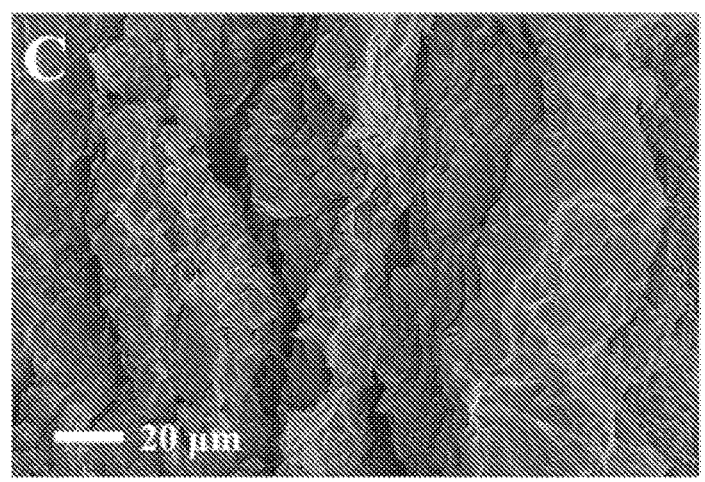
Figure 8:
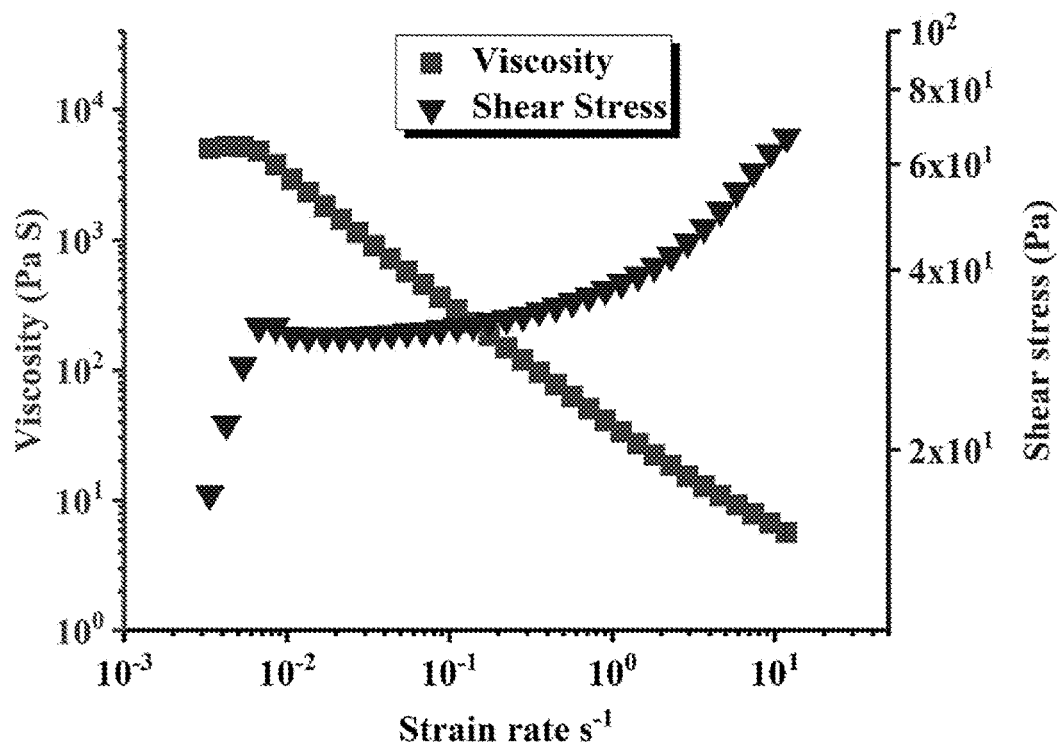
FIG. 8 shows shear-thinning behavior of a graphene suspension in N-methyl-2-pyrrolidone (NMP).
Figure 9:
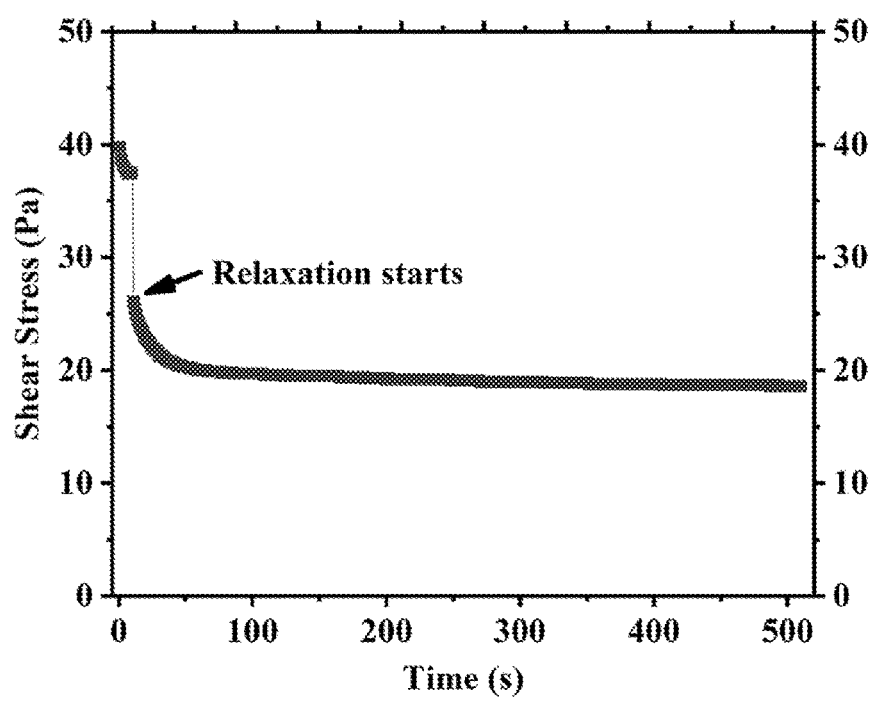
FIG. 9 shows relaxation behavior of a graphene suspension after shearing in N-methyl-2-pyrrolidone.

Creating a macroscopic material in which the basal plane of graphene is parallel to an electrode surface is not straightforward. A fluid-based route for creating aligned graphene coatings was designed. The method takes advantage of the ease with which high-aspect-ratio graphene flakes in a slurry are aligned by shear flow. FIG. 2A reports the rheological properties of the graphene suspensions. The initially elastic slurry (G'>10*G") yields at a low shear strain (□≈0.05) and transitions to a liquid-like state at high strain in which G">G'. Correlations between graphene sheets are evidently broken in a modest shear flow. FIG. 8 shows that in continuous shear, the suspensions are shear-thinning at low rates $\dot{\gamma}$ (~$10^{-2}$ s$^{-1}$) and relaxation following cessation of shear is a two-step process (FIG. 9), with the slower step lasting several hundreds of seconds. Subjecting a graphene suspension to a moderate shear rate for even a short period of time could therefore produce relatively long-lived orientation parallel to the shear plane.

Figure 10:
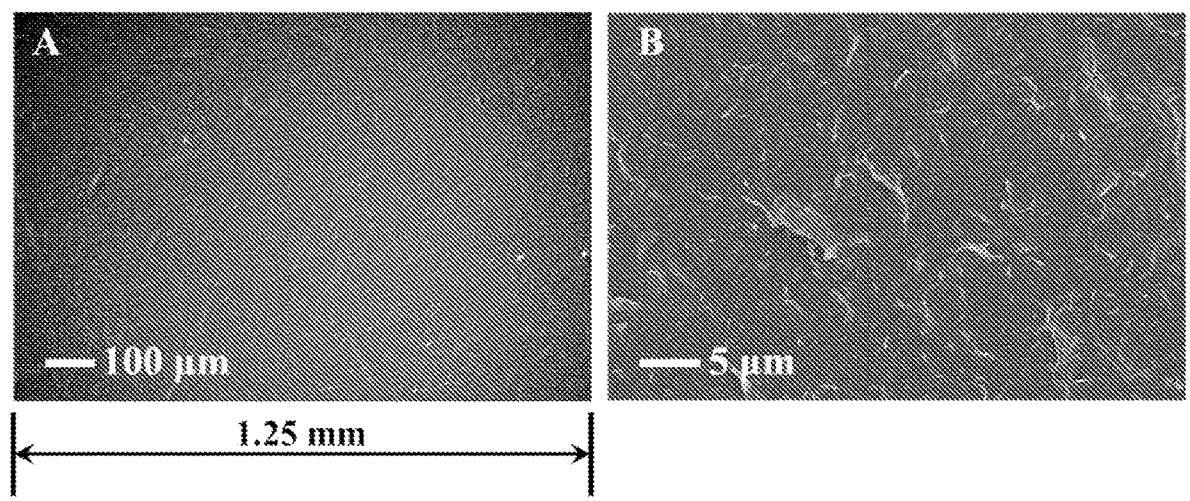
FIG. 10 shows scanning electron microscopy (SEM) images of a graphene coated stainless steel via the shearing method.
Figure 11:
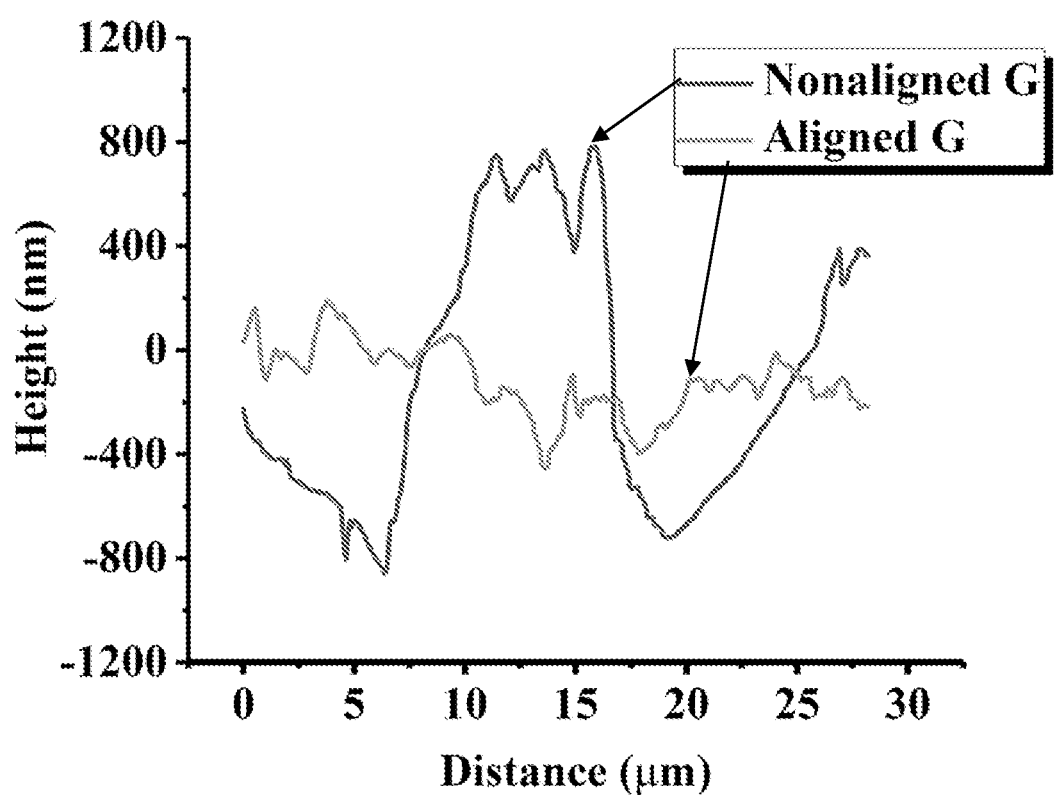
FIG. 11 shows an atomic force microscopy (AFM) height line scan of nonaligned and aligned graphene substrate.

A doctor-blade type apparatus was designed to implement this process using suspensions composed of graphene flakes in N-methyl-2-pyrrolidone. To lock-in the alignment, the sheared coatings were immediately transferred to a vacuum chamber where the NMP solvent was removed. The effectiveness of the method can be seen by comparing morphologies and near edge X-ray absorption fine structure spectra of the graphene coating prepared with (FIG. 2B) and without (FIG. 2C) shearing (see also FIG. 10~113). The approach provides a simple, scalable route towards planar interphases composed of well aligned graphene sheets with their $[0001]_{graphene}$ perpendicular to the substrate.

Figure 3:
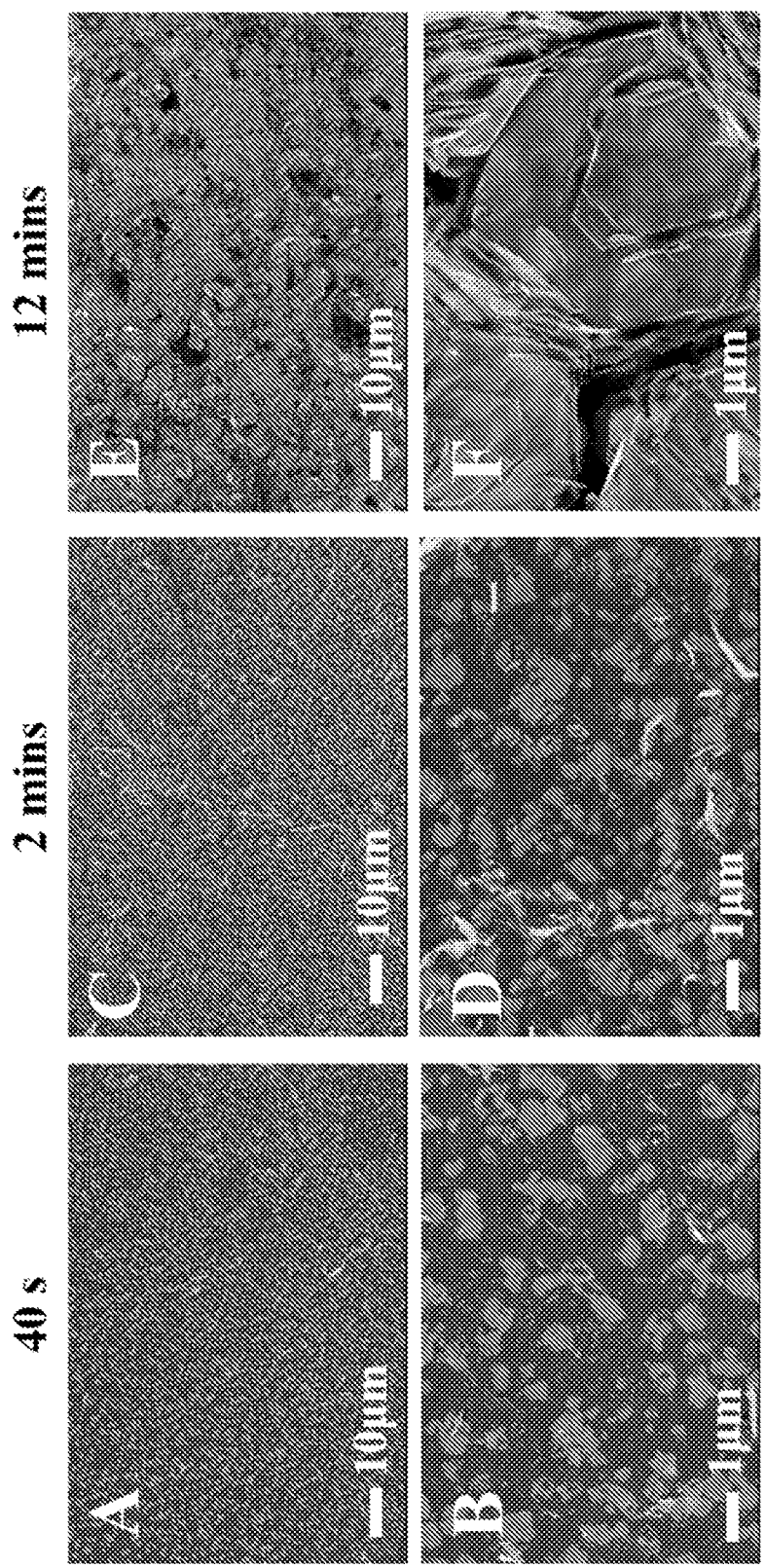
FIG. 3 shows an SEM of Zn deposits on graphene-coated stainless steel. SEM: Deposition time: (A~B) 40 seconds, (C~D) 2 minutes and (E~F) 12 minutes. Current density J=4 mA/cm$^2$.
Figure 14:
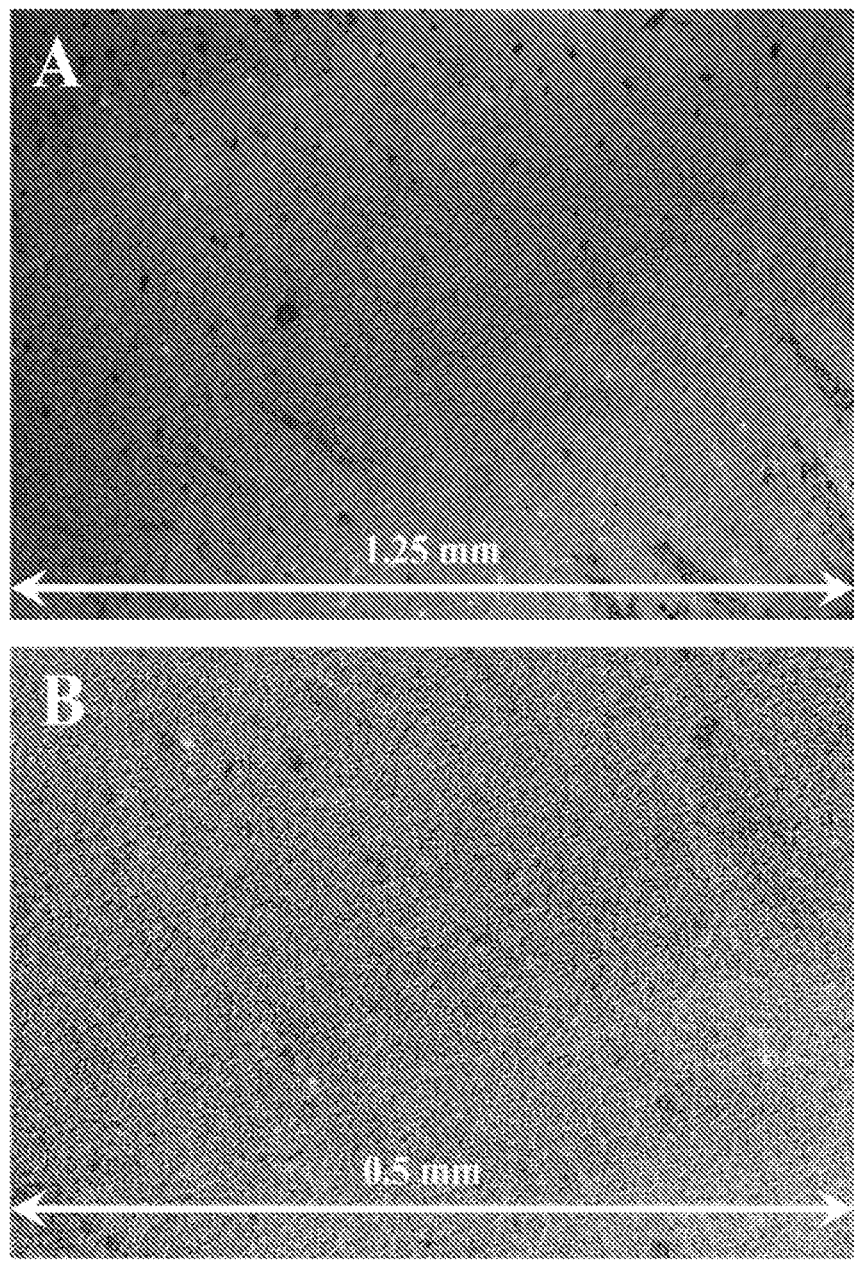
FIG. 14 shows low-magnification (A), (B) SEM images of Zn deposits on graphene substrate. J=4 mA/cm$^2$, 2 minutes.
Figure 15:
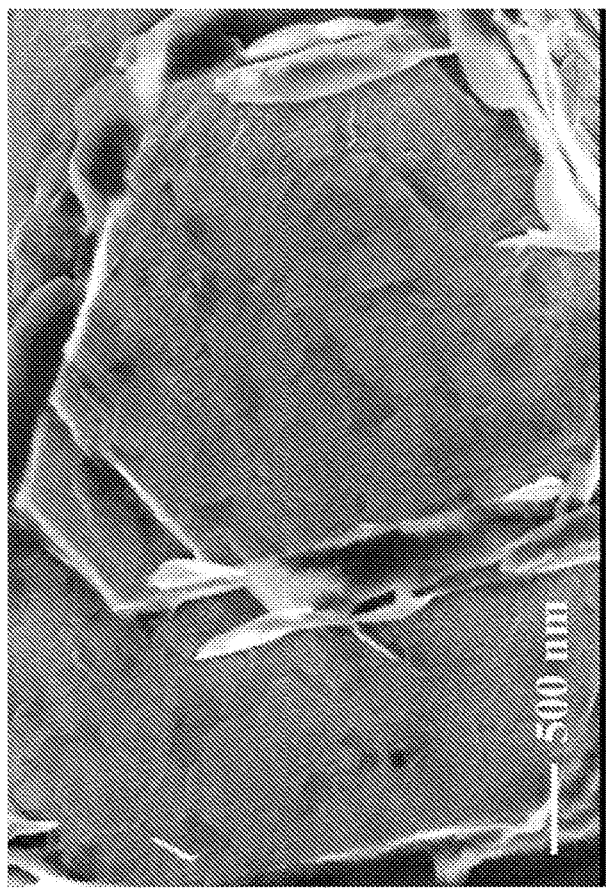
FIG. 15 shows SEM image of a layered, homoepitaxially-templated Zn deposits on graphene (12 minutes, J=4 mA/cm$^2$).
Figure 16:
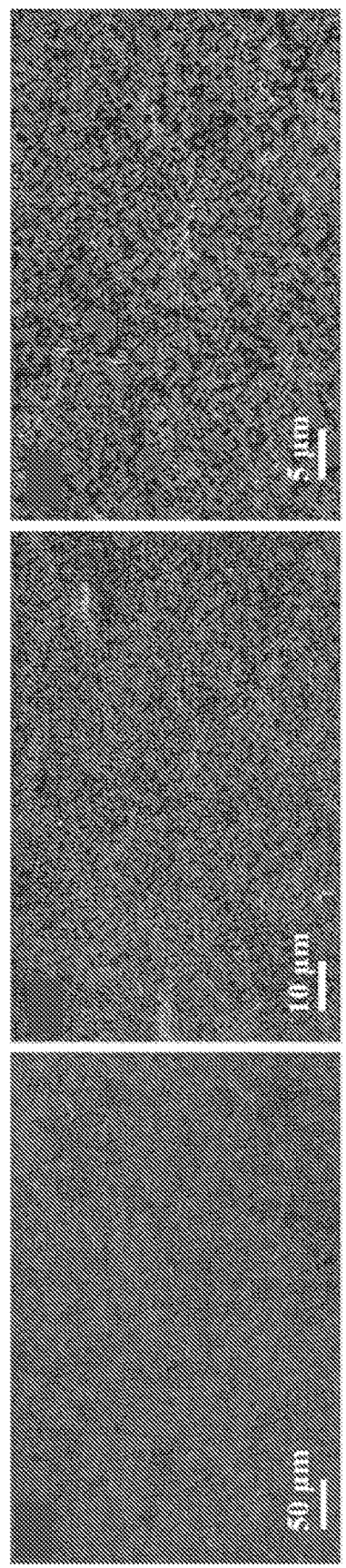
FIG. 16 shows SEM images of Zn deposits on graphene at high current density (12 s, J=40 mA/cm$^2$).
Figure 20:
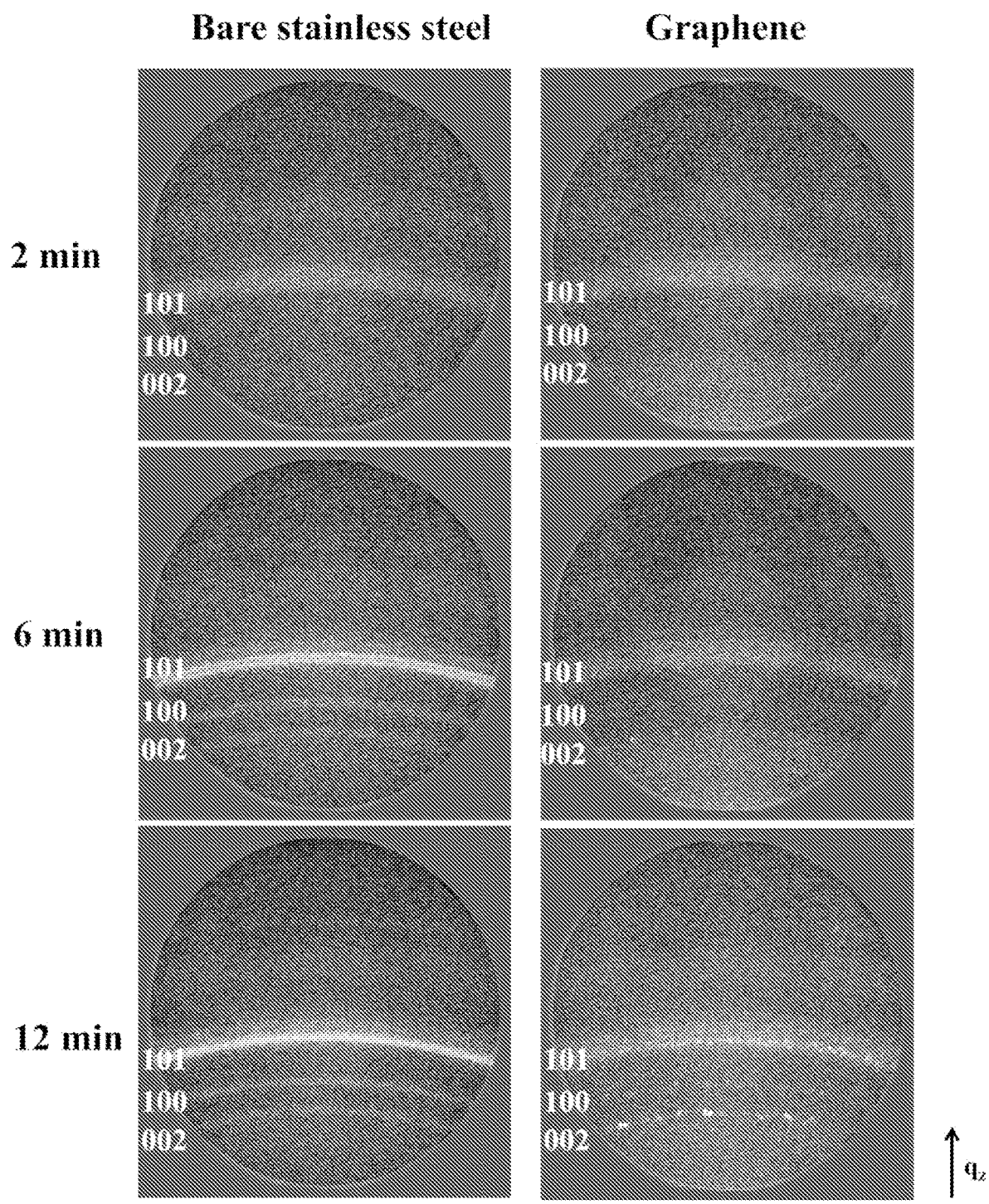
FIG. 20 shows two-dimensional grazing incident X-ray diffraction patterns of Zn electrodeposits.
Figure 21:
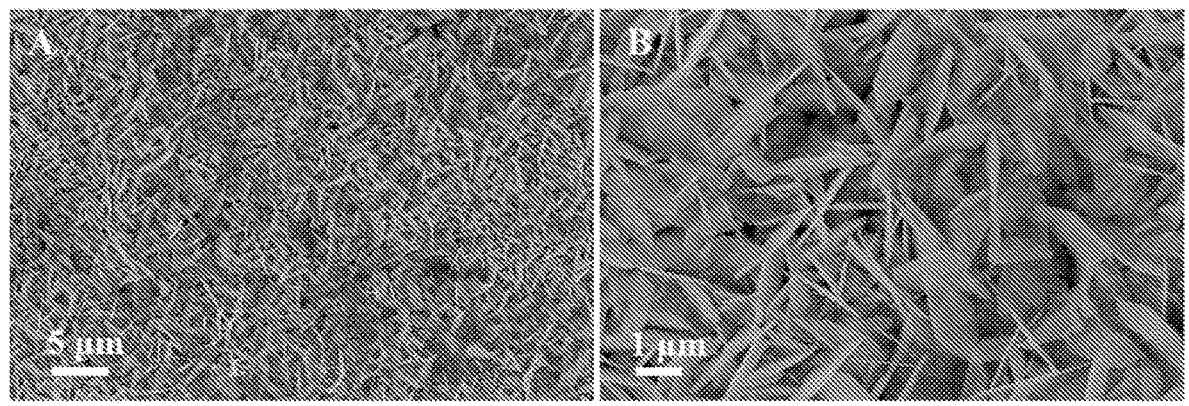
FIG. 21 shows SEM images of Zn deposits on Ketjen-Black coated stainless steel (40 s, J=4 mA/cm$^2$).

In contrast to the deposition morphology on stainless steel shown in FIG. 1B~C, where Zn platelets are randomly oriented, Zn deposits formed on graphene are well directed, showing a locked orientation relation with the graphene substrate (FIG. 3 and FIG. 14). Further analysis reveals that there are two stages in the epitaxial electrodeposition— Stage I: heteroepitaxy between Zn and graphene (FIG. 3A~D) and Stage II: homoepitaxy of Zn after the graphene surface has been fully occupied (FIG. 3E~F). FIG. 3F (also FIG. 15) shows that small newly-deposited Zn layers are attached to the surface of the Zn formed in stage I. The Zn deposition rate on graphene appears lower than that on a bare stainless-steel substrate because the epitaxial regulation produces thin plates that are parallel to the substrate, and as a result the deposit are more uniform and compact, as schematically illustrated in FIG. 1A. This highly ordered growth is sustained at the high current density of 40 mA/cm$^2$ (see FIG. 16). Atomic force microscopy (FIG. 17) and X-ray diffraction (FIG. 18~20) results confirm the epitaxial regulation of Zn deposition. As a comparison, no epitaxial growth is observed on Ketjen black (an isotropic carbon) coated stainless steel (FIG. 21). The plating and stripping of Zn was studied by cyclic voltammetry (CV) (FIG. 22), the results show no obvious impact of the deposition process on the electrochemical reaction mechanism.

Figure 23:
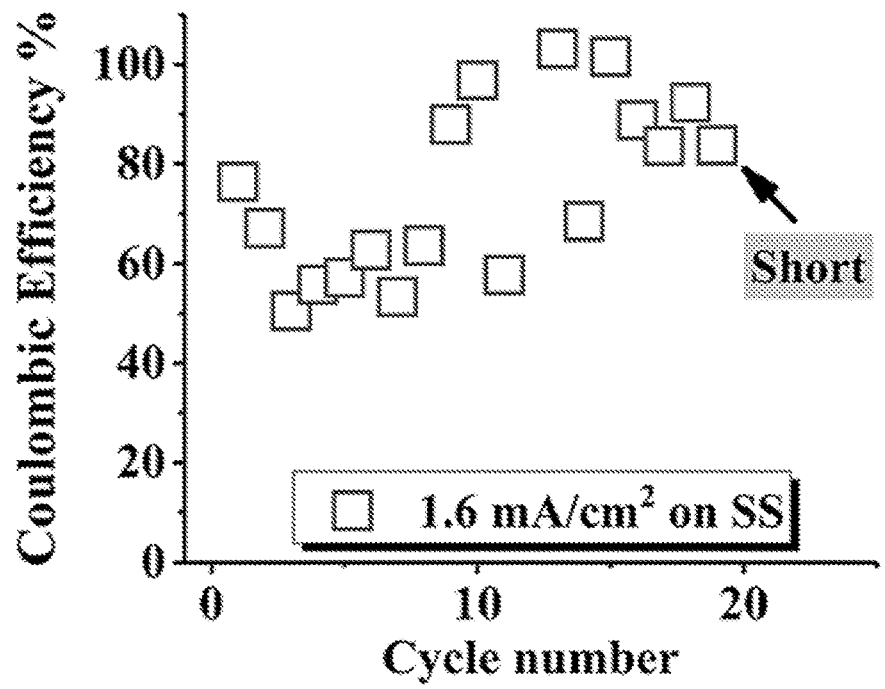
FIG. 23 shows coulombic efficiency of Zn plating stripping on bare stainless steel (A) and (B) corresponding voltage profile. J=1.6 mA/cm$^2$, capacity=0.8 mAh/cm$^2$.
Figure 23:
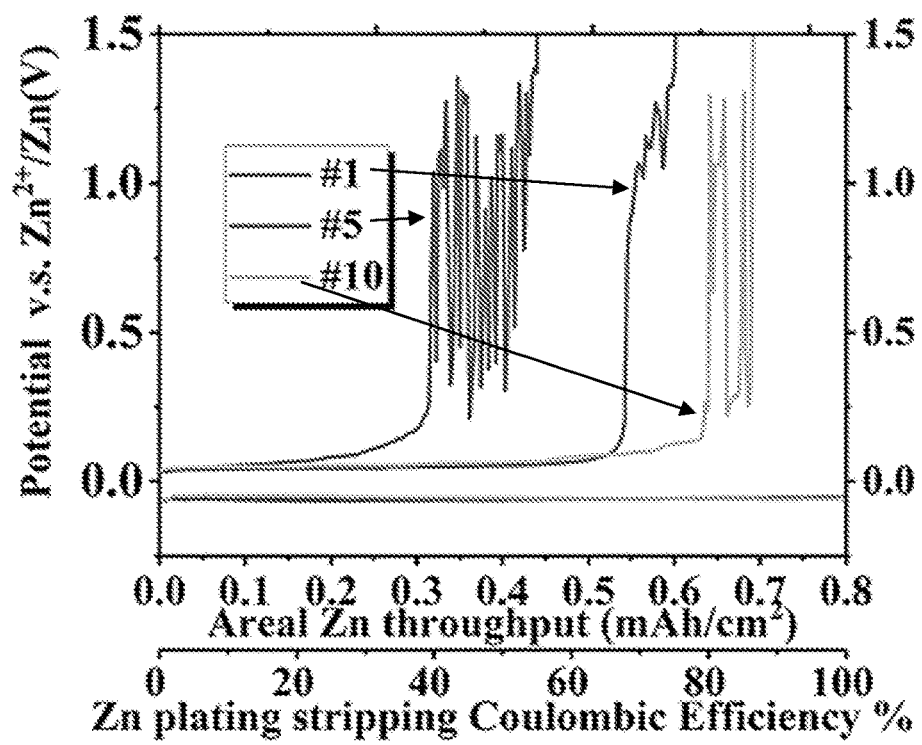
Figure 24:
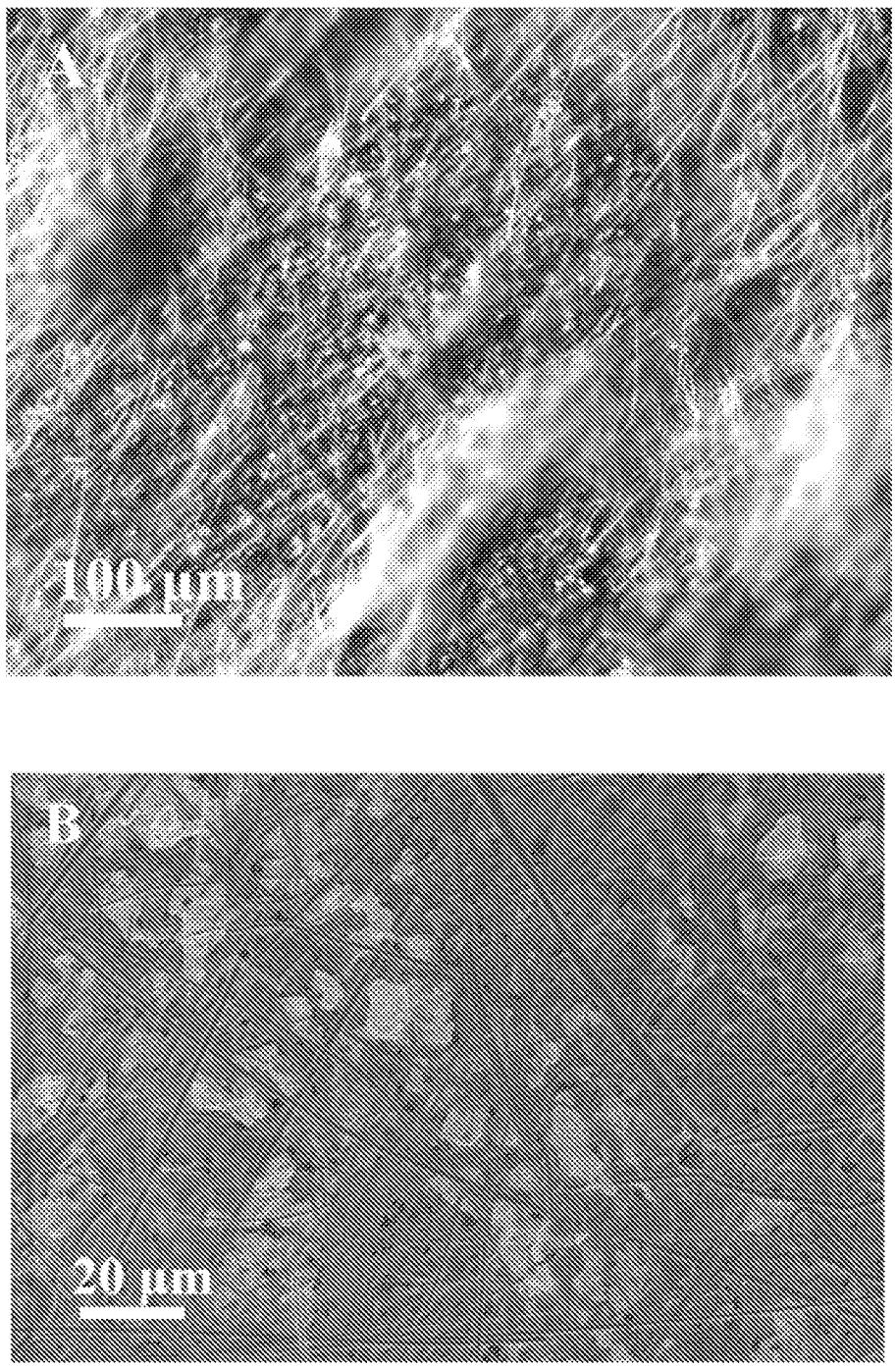
FIG. 24 shows optical microscopy (A) and scanning transmission electron microscopy (B) images of dead Zn in glass fiber separator when a bare stainless-steel substrate is used. J=1.6 mA/cm$^2$, capacity=0.8 mAh/cm$^2$, after 5 plating stripping cycles.
Figure 25:
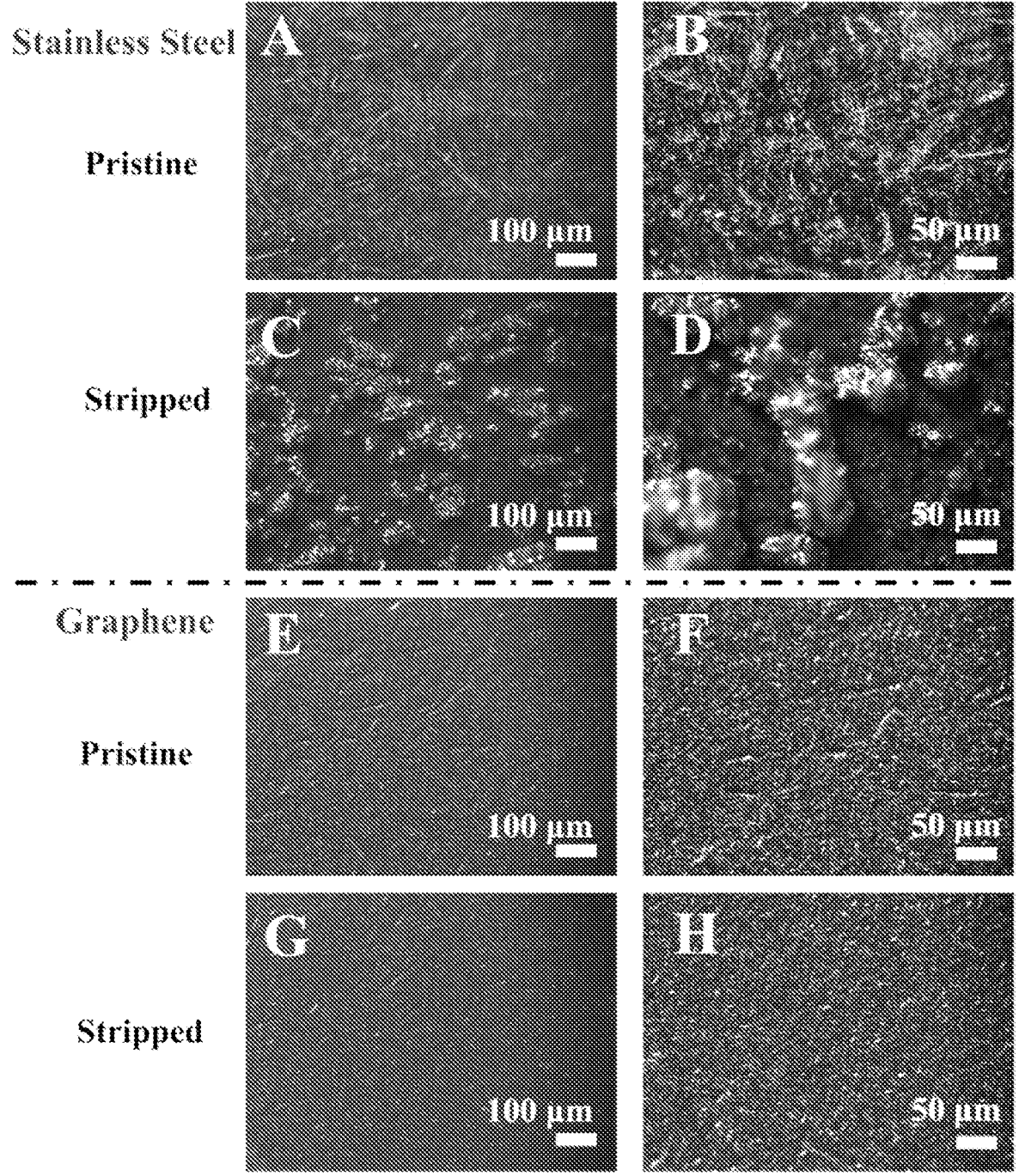
FIG. 25 shows optical microscopy images of stainless-steel substrate under (A)(B) pristine and (C)(D) after 5 plating/stripping cycle conditions, and of graphene substrate under (E)(F) pristine and (G)(H) after 5 plating/stripping cycle conditions. J=4 mA/cm$^2$, capacity=0.8 mAh/cm$^2$.

When used as a battery anode, a successful metal electrode must be reversibly plated and stripped over hundreds/thousands of charge-discharge cycles. The Coulombic efficiency (CE) is a measure of this reversibility. The CE for epitaxial and non-epitaxially deposited Zn was quantified using a procedure in which a certain amount of metal is plated on the substrate and then stripped away, and measure the ratio of charge passed in each segment of the cycle. The reversible Zn plating and stripping on an electrochemically inert substrate, e.g. stainless steel, shows CE values around 80% (see FIG. 23). These cells fail after only 20 plate-strip cycles by shorting. The observed voltage fluctuations are consistent with failure either as a result of localized short circuiting or by reconnection of fragmentary Zn deposits that broke away from the electrode ("orphaned" Zn) (FIG. 24~25) (21). In contrast, epitaxial deposition of Zn yields quite noticeable improvements in reversibility (CE >99% over 1,000 cycles, FIG. 4A).

We measured the CE at higher current densities of 16 and 40 mA/cm$^2$. (Table 2). As reported in FIG. 4B, high CE values (CE=99.9% over 10,000 cycles) are observed.

Figure 26:
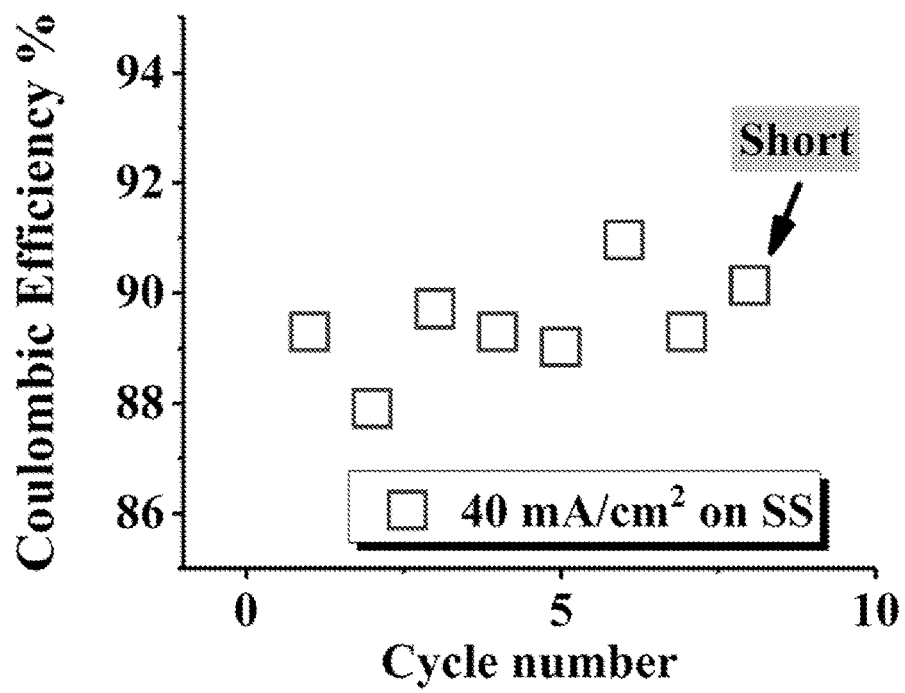
FIG. 26 shows coulombic efficiency of Zn plating stripping on bare stainless-steel. J=40 mA/cm$^2$, capacity=0.8 mAh/cm$^2$.
Figure 27:
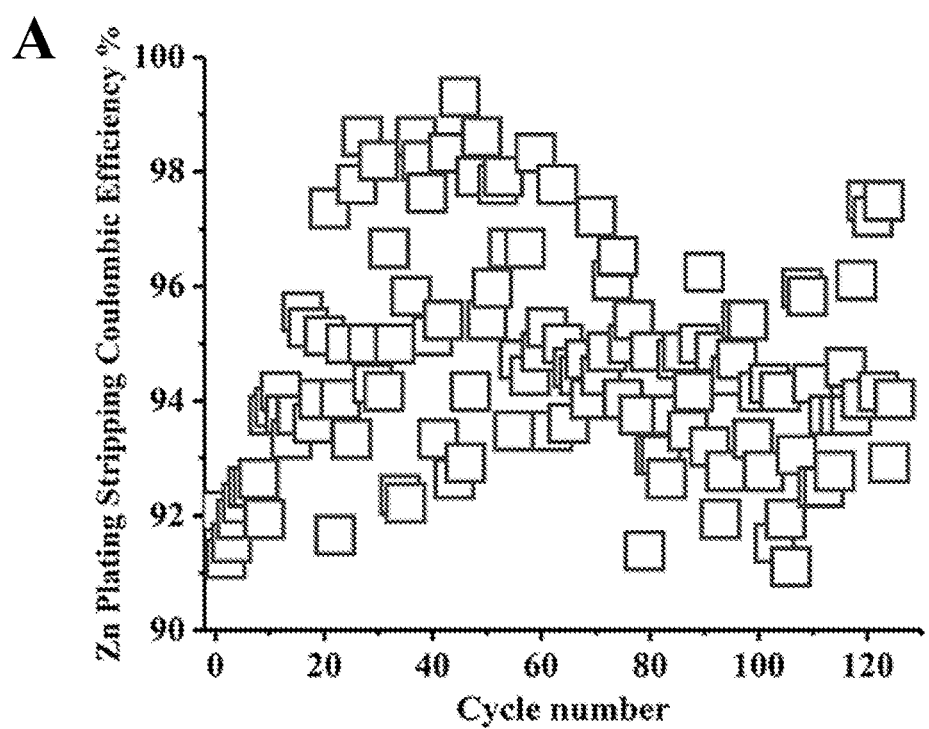
FIG. 27 shows coulombic efficiency of Zn plating stripping on unaligned graphene substrate (A) and (B) corresponding voltage profile. J=40 mA/cm$^2$, capacity=0.8 mAh/cm$^2$. (C) and (D), SEM images of Zn deposition morphology on unaligned graphene. J=4 mA/cm$^2$, 2 minutes.
Figure 27:
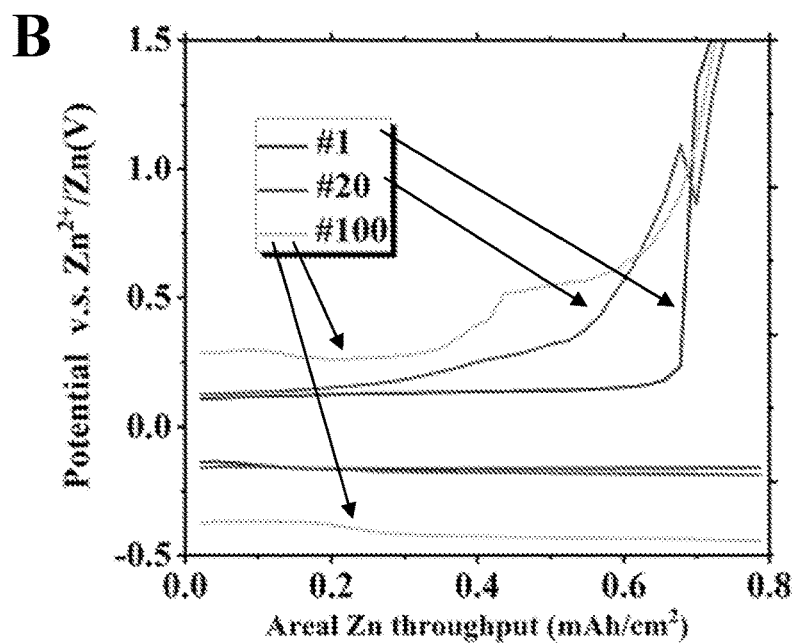
Figure 27:
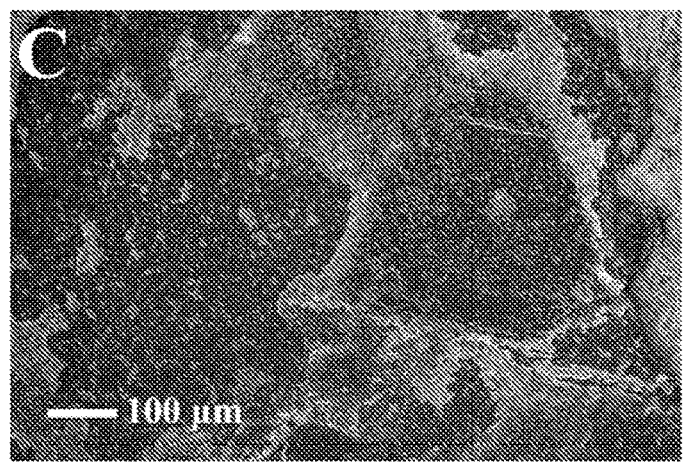
Figure 27:
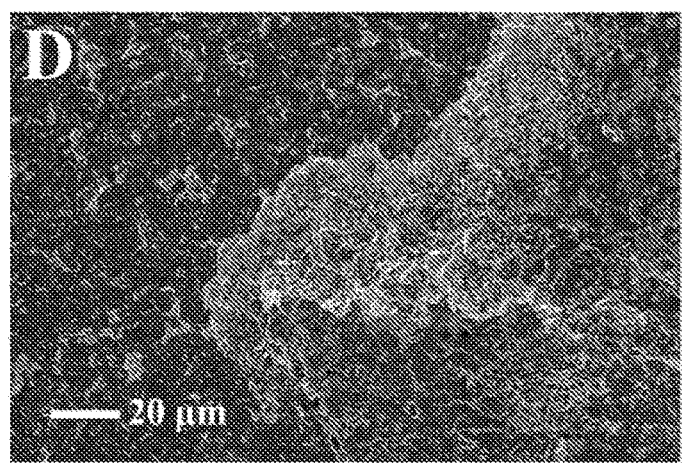

In contrast, electrodes without the graphene coating fail after 8 cycles (FIG. 26). The performance of unaligned graphene substrates, created without the shearing procedure, was also evaluated. With erratic voltage behavior, the measured average CE is 94% and the cells fail by 125 cycles, which is attributable to the uneven Zn deposition morphology (FIG. 27).

TABLE 2

Summary of electrochemical performance of metallic Zn anode reported in literature.

| | Current Density (mA/cm$^2$) | Cycle number | Coulombic Efficiency of Zn Plating/Stripping |
|---|---|---|---|
| Previous work | 0.5 | 1000 | 99.68% |
| Previous work | 0.2 | 50 | 99% |
| Previous work | 1 | 200 | 99.5% |
| Previous work | 10 | 5 | 88%~99% |
| Previous work | 1 | 150 | ~96.5% |
| Previous work | 0.5 | 12 | ~96% |
| Present work | 40 | 10000 | 99.9% |

Figure 4:
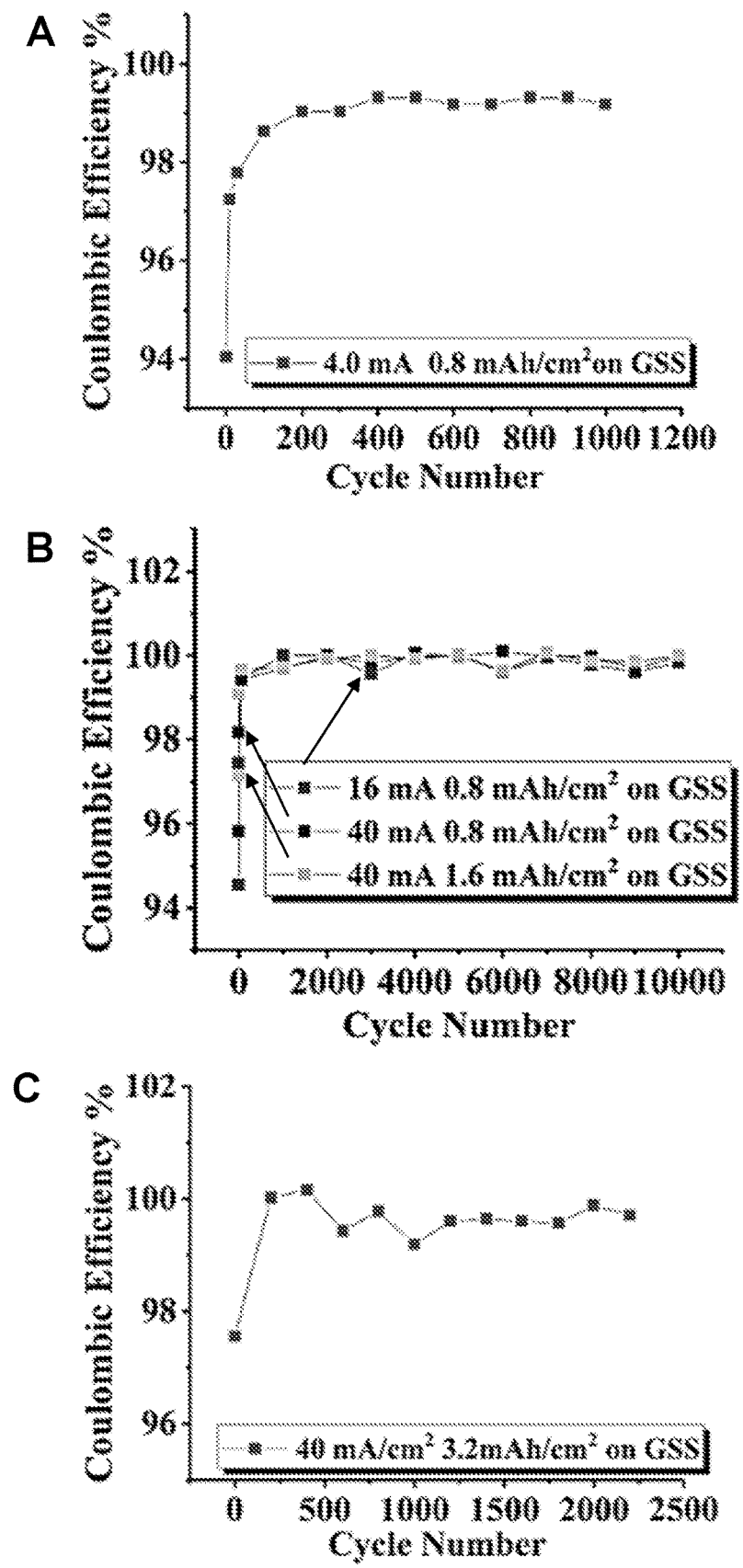
FIG. 4 shows electrochemical performance of epitaxial Zn metal anodes. (A) CE at 4 mA/cm$^2$ on graphene coated stainless steel (GSS) substrate. (B) Coulombic efficiency (CE) at high current densities on GSS. (C) CE under high current and high areal capacity condition on GSS and (D) the corresponding voltage profile. (E) Cycling performance of Zn∥α-MnO$_2$ full cells with and without graphene, with controlled Negative:Positive (N:P) electrode capacity ratios.
Figure 4:
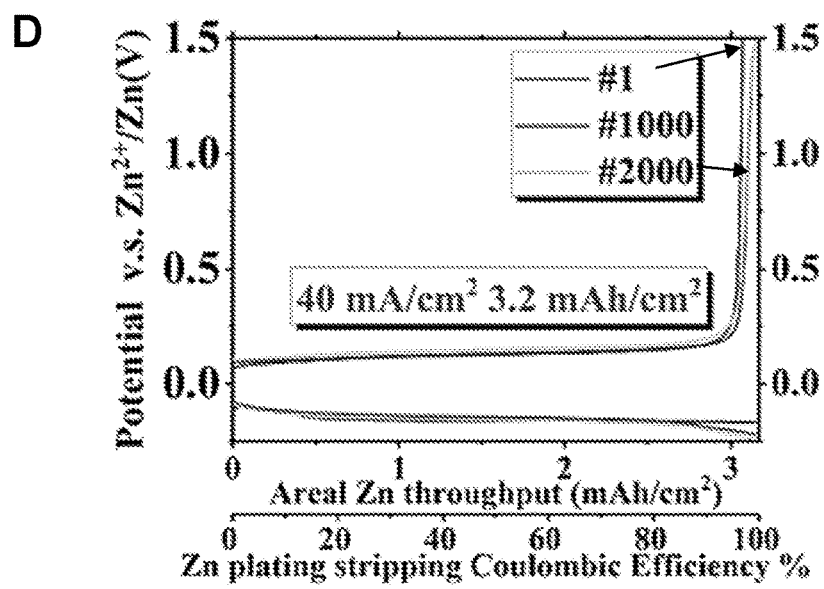
Figure 4:
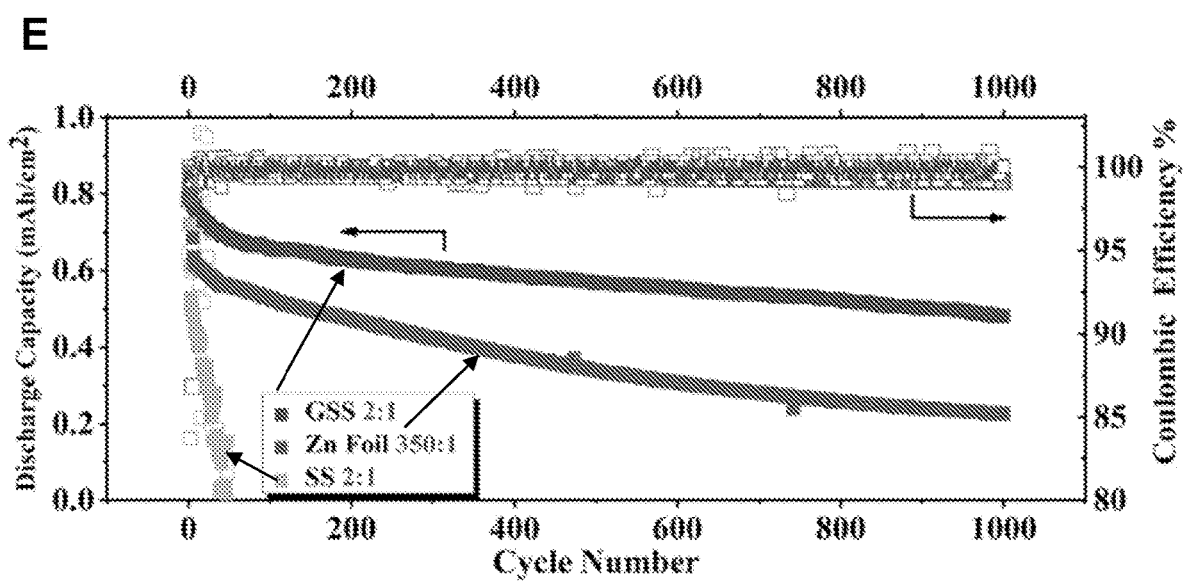
Figure 28:
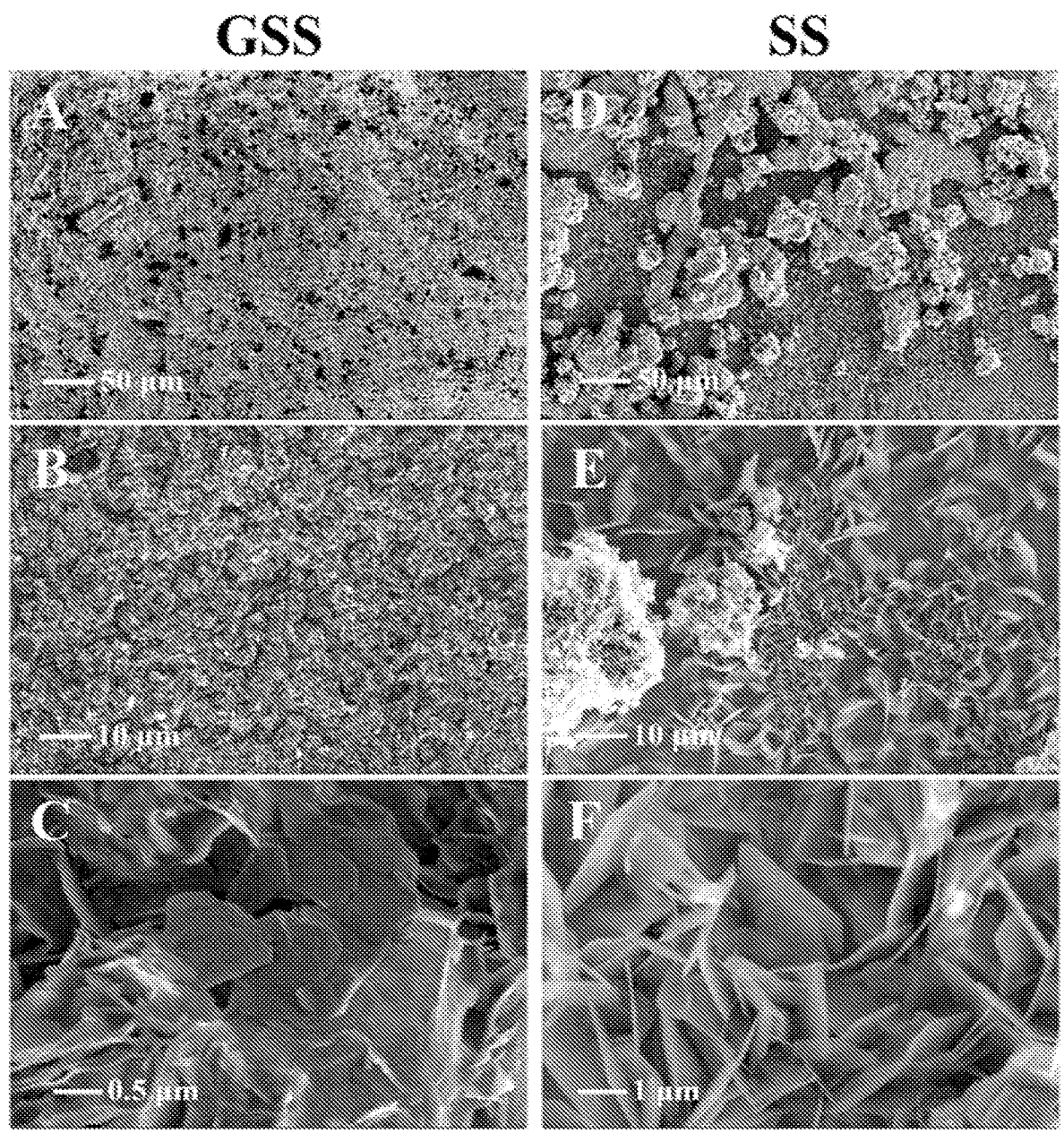
FIG. 28 shows SEM images of Zn deposits on (A)(B)(C) graphene and on (D)(E)(F) bare stainless steel. J=4mA/cm$^2$, 48 minutes.

We increased the areal Zn throughput to 3.2 mAh/cm$^2$ to assess the stability of the homoepitaxy component of the deposition. FIG. 4C~D reports high electrode reversibility (CE≈99.7% over 2,000 cycles), stable voltage profiles and homoepitaxial regulation of deposition morphology (FIG. 28). In contrast, the unmodified electrode fails after just one charge-discharge cycle.

Figure 29:
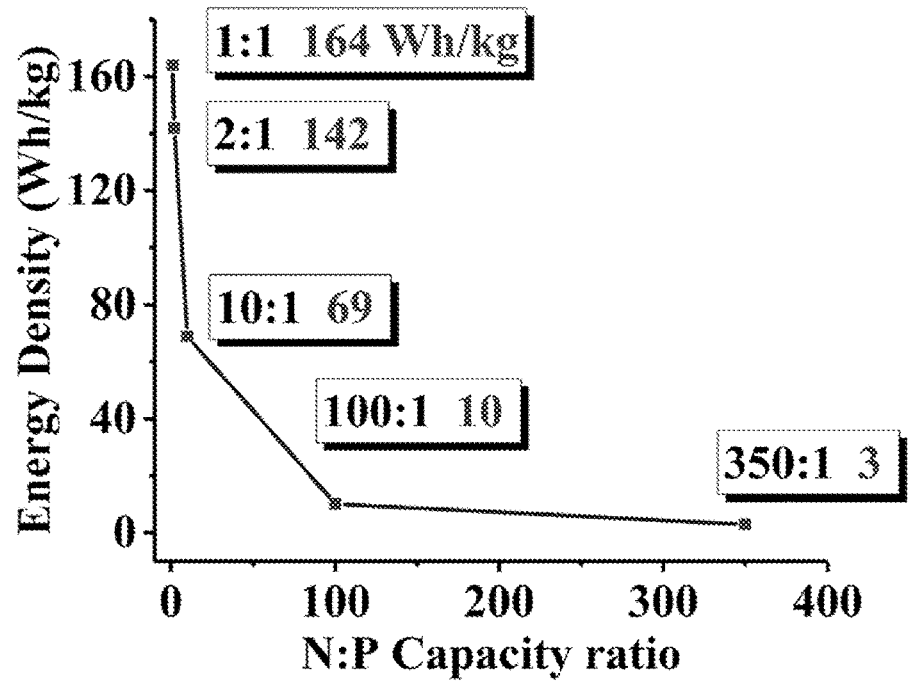
FIG. 29 shows dependence of cell-level energy density on N:P ratio in a Zn∥α-MnO$_2$ full cell.
Figure 30:
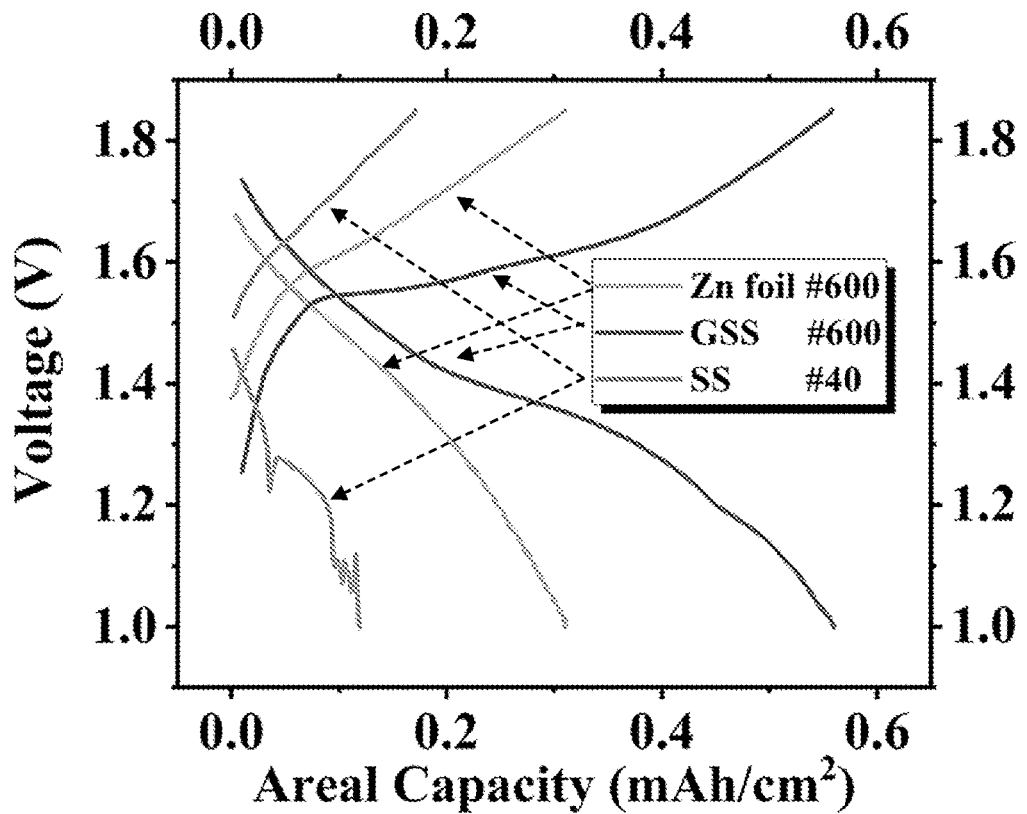
FIG. 30 shows voltage profiles of the Zn∥α-MnO$_2$ full cells.

The high reversibility of the epitaxial anode allows us to study rechargeable batteries with low Negative to Positive electrode capacity (N:P) ratio. A low N:P ratio is required for high overall energy density of a battery (FIG. 29). Electrochemical cells in which the epitaxial Zn anode is paired with a conventional α-MnO$_2$ cathode with a N:P ratio of 2:1 were created. FIG. 4E and FIG. 30 show that the cell with the epitaxial Zn anode maintains excellent capacity retention over 1,000 cycles at 8 mA/cm$^2$. Analogous Zn||MnO$_2$ cell cycling results at the same current density, but using anodes composed, respectively, of a Zn coating on stainless steel (N:P=2:1) and a 620 μm thick Zn foil (N:P~350:1) are provided in FIG. 4E.

Figure 31:
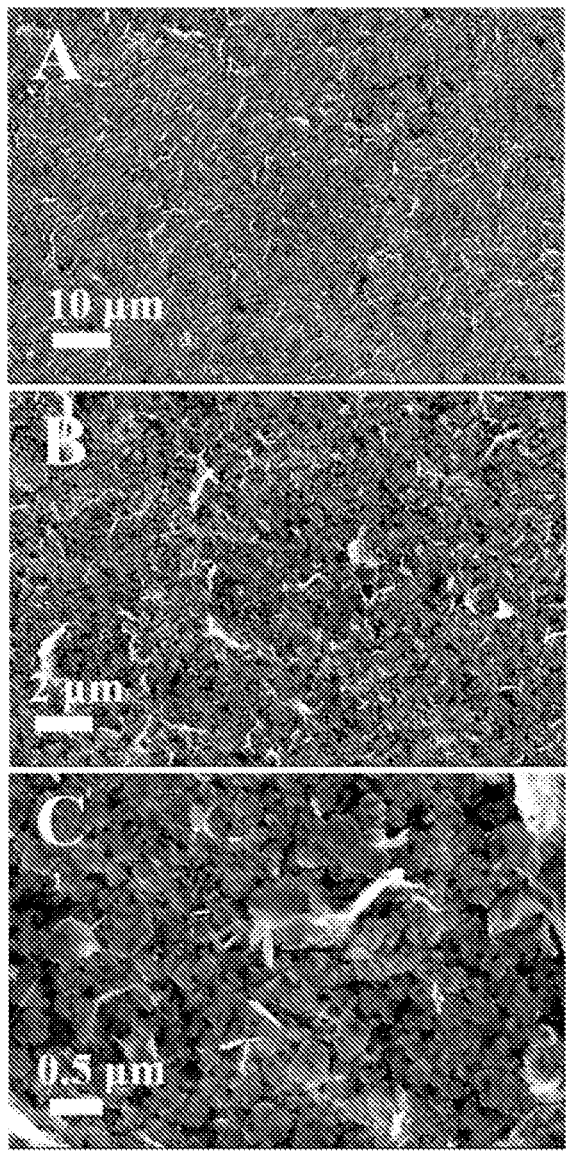
FIG. 31 shows SEM images of Zn deposits on (A)(B)(C) graphene substrate and (D)(E)(F) bare stainless-steel substrate from 0.2 M Zn(CF$_3$SO$_3$)$_2$ in dimethylether.
Figure 31:
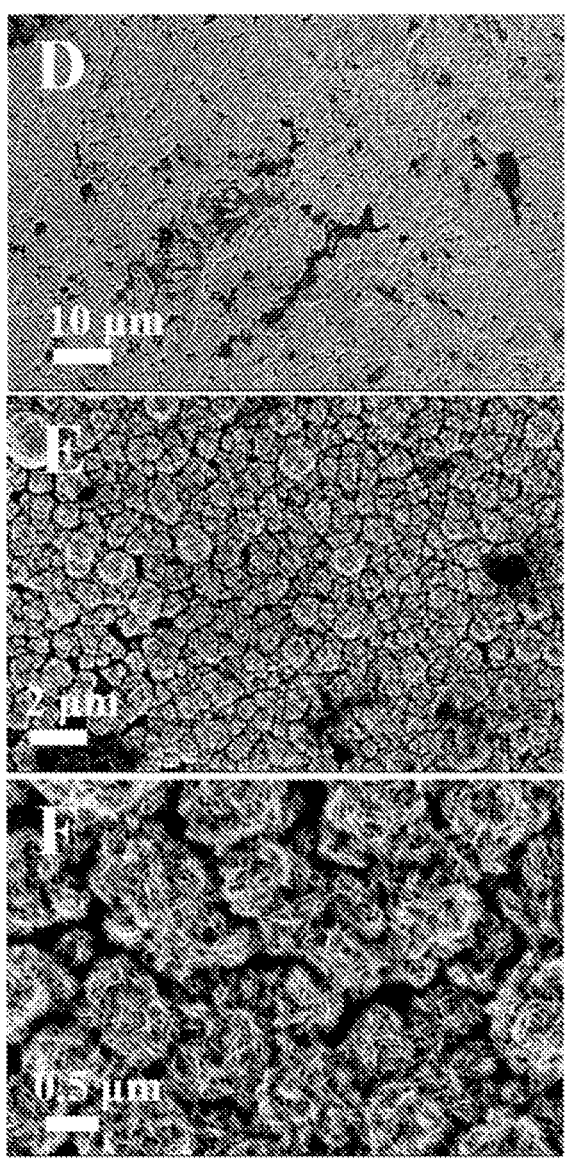
Figure 32:
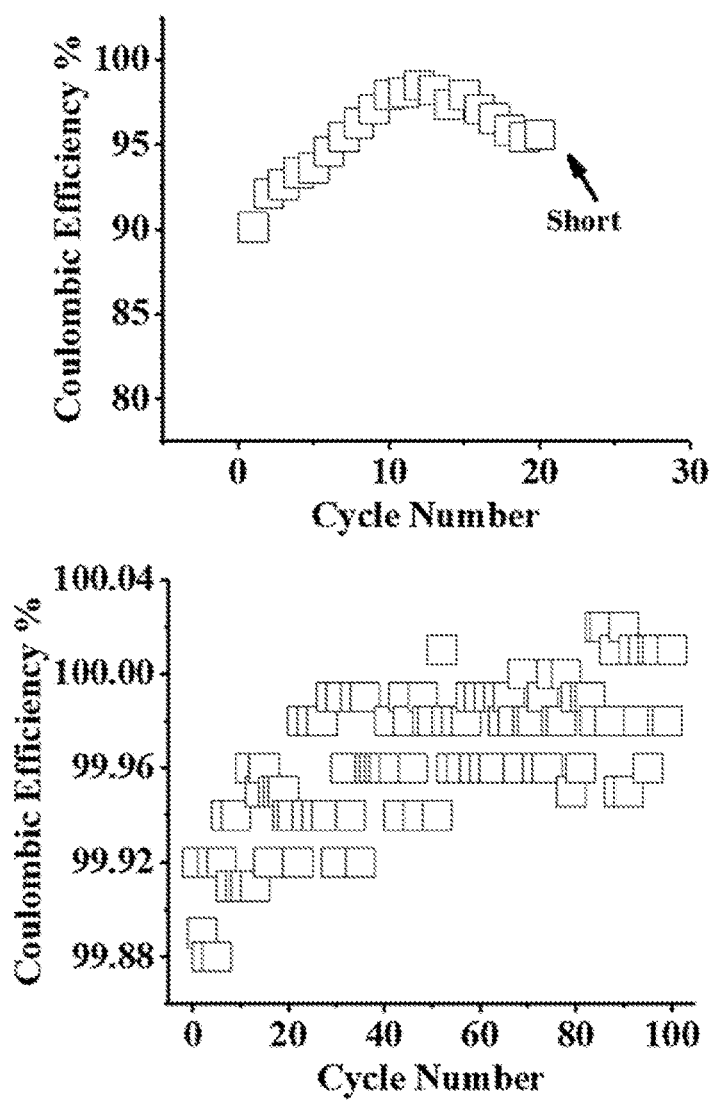
FIG. 32 shows coulombic efficiency of Zn plating stripping in 0.2M Zn(CF$_3$SO$_3$)$_2$ dimethylether and corresponding voltage profiles without and with graphene. J=4 mA/cm$^2$; Capacity=0.8 mAh/cm$^2$.
Figure 33:
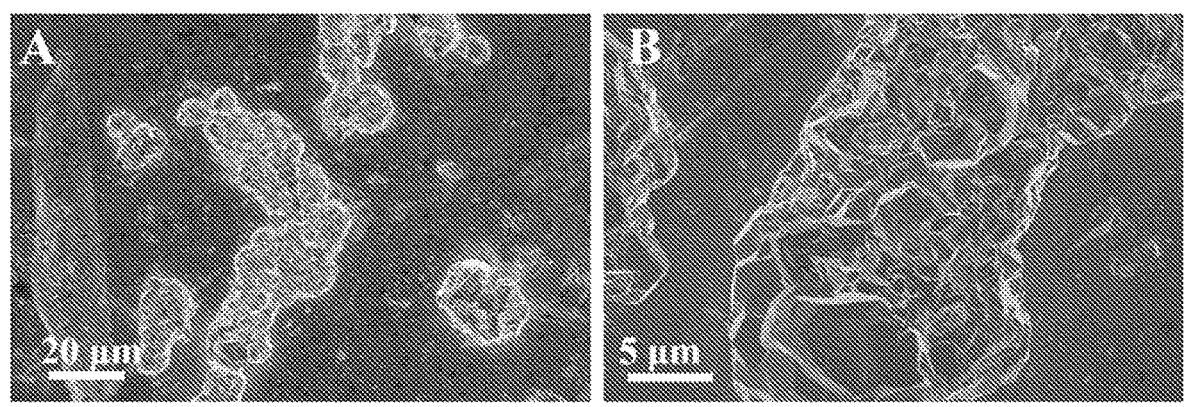
FIG. 33 shows SEM images (A)(B) of Al deposits on bare stainless-steel.

In addition to aqueous electrolytes, the results in FIG. 31-33 reveal that the epitaxial approach can be readily extended to other electrolytes of interest, e.g. 0.2M Zn(CF$_3$SO$_3$)$_2$ in dimethylether. In this non-aqueous electrolyte, a 99.97% CE is achieved The improvement could stem from the suppression of hydrogen evolution and other side reactions.

Figure 34:
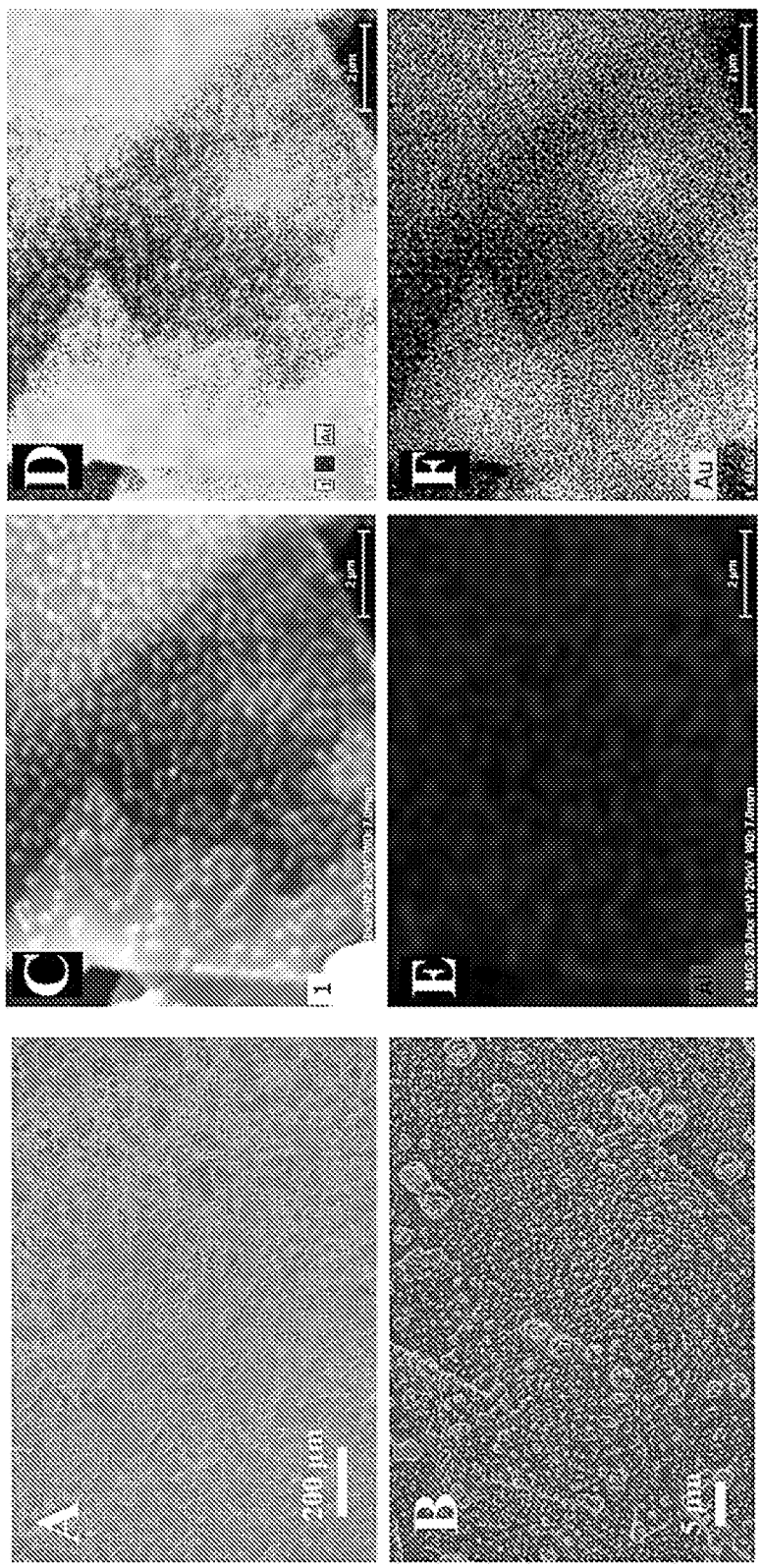
FIG. 34 shows SEM images of Al deposits on Au coated stainless steel (A)(B). EDS: (C) SEM image, (D) combined mapping, (E) Al mapping and (F) Au mapping.
Figure 35:
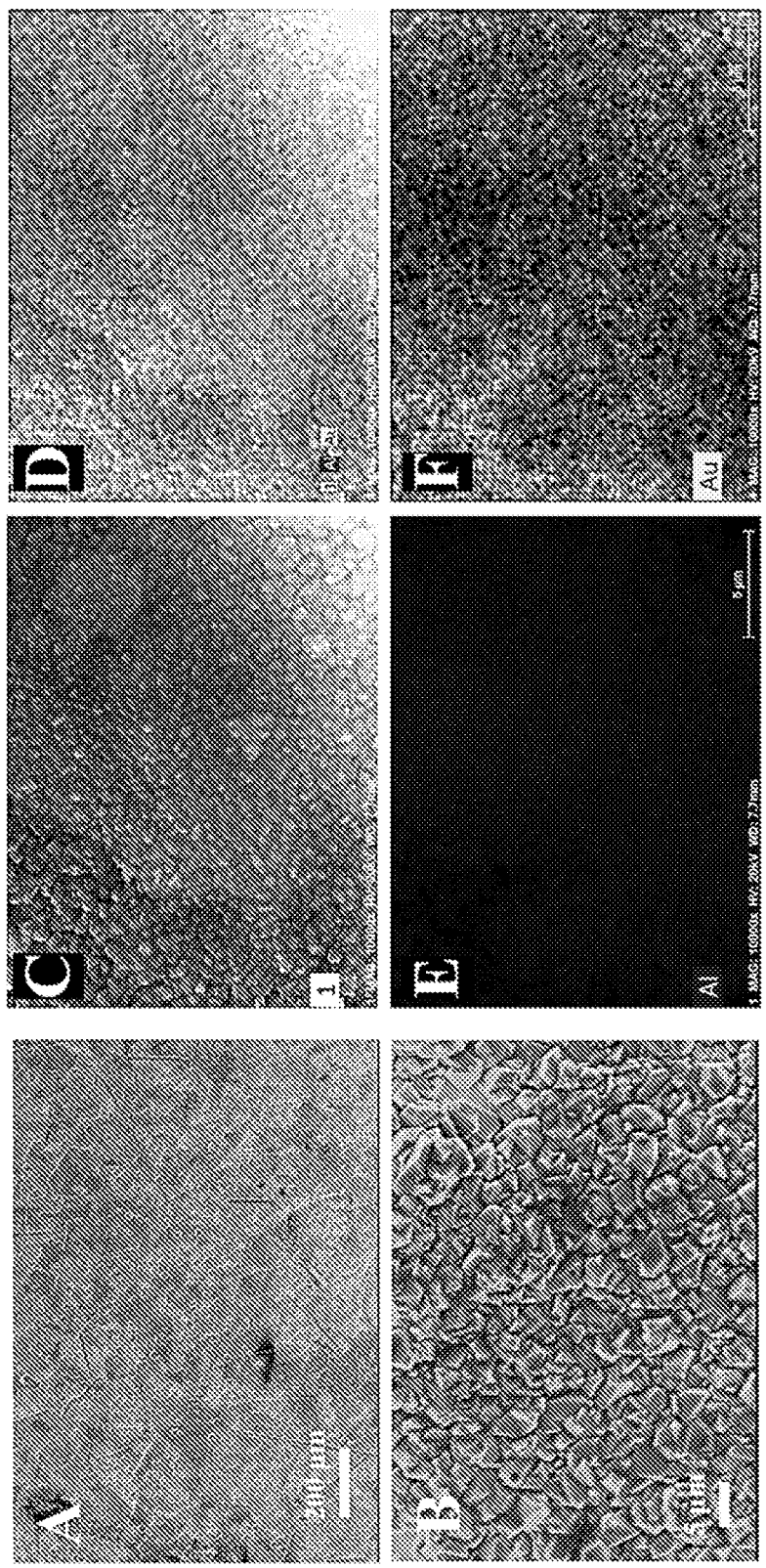
FIG. 35 shows SEM images of Al deposits on Au coated stainless steel (A)(B). EDS: (C) SEM image, (D) combined mapping, (E) Al mapping and (F) Au mapping.

Epitaxial electrodeposition as a strategy for creating highly reversible metal anodes is relevant for other electrode chemistries of contemporary interest. For FCC metals (Al, Ca), BCC metals (Li, Na, K), and HCP metals (Mg), the screening for potential substrates can be performed based on the atomic arrangements of their close packed planes. Previously, epitaxial electrodeposition of various metals has been demonstrated. Though none of these efforts have considered reversibility of the process, they indicate that the concept is broadly useful. In line with the criteria used to screen epitaxial substrates for Zn, a screening for potential substrates for FCC, HCP and BCC metals (Table 1 and Tables 3-5) was performed. As a demonstration, the morphology of Al on (111)-textured Au nanosheets was studied. This pairing stands out for the small lattice misfit $\delta_{Au-Al}$=0.7% and chemical inertness of the Au. Electrodeposition was also performed in a lewis-acidic electrolyte that can dissolve surface oxide layer that prevents the direct contact between the metals and the substrate. The results reported in FIG. 34~35 show the Au sheets facilitate formation of evenly-distributed, nanosized Al electrodeposits, in contrast to the uneven, coarse particulate Al morphologies formed in the absence of epitaxial regulation.

TABLE 3

Lattice parameters of FCC metals.

| Face-Centered Cubic (FCC) | Lattice Parameter a = b = c |
|---|---|
| z | 3.54 |
| Cu | 3.61 |
| Rh | 3.80 |
| Ir | 3.83 |
| Pd | 3.88 |
| Pt | 3.91 |
| Al | 4.04 |
| Au | 4.07 |
| Ag | 4.07 |
| Pb | 4.93 |
| Ca | 5.56 |
| Sr | 6.05 |
| Ce | 6.9 |

TABLE 4

Lattice parameters of HCP metals.

| Hexagonal Closed Packed (HCP) | Lattice Parameter a = b |
|---|---|
| Be | 2.28 |
| Co | 2.51 |
| Zn | 2.67 |
| Ti | 2.95 |
| Mg | 3.20 |
| Zr | 3.23 |
| Sc | 3.30 |
| Gd | 3.62 |
| Y | 3.67 |

TABLE 5

Lattice parameters of BCC metals.

| Body-Centered Cubic (BCC) | Lattice Parameter a = b = c |
|---|---|
| Fe | 2.86 |
| Cr | 2.90 |
| V | 3.04 |
| Mo | 3.14 |
| W | 3.16 |
| Nb | 3.30 |
| Ta | 3.30 |
| Li | 3.50 |
| Na | 4.20 |
| Eu | 4.58 |
| Ba | 5.01 |
| K | 5.20 |

TABLE 1

Potential epitaxial substrates for anode metals.

| Anode Metal | Potential Epitaxial Substrate | Lattice Misfit δ % |
|---|---|---|
| Al | Au/Ag | 0.7/0.7 |
| Ca | Sr/Pb | 8/11 |
| Zn | Co/Ti | 6/9 |
| Mg | Zr/Ti | 0.9/8 |
| Li | Ta | 6 |
| Na | Eu | 8 |
| K | Ba | 4 |

It was shown that reversible epitaxial electrodeposition at a metal electrode can be achieved using textured electronically conducting electrode coatings with low lattice mismatch with the metal of interest. An epitaxial aqueous-Zn anode is reported to achieve high reversibility (CE>99.7%) at moderate and high current densities. The epitaxy regulation concept can be extended to achieve reversible cycling in nonaqueous-Zn electrochemical cells, as well as in other rechargeable batteries that utilize metals as anode.

Materials and Methods. Materials. $ZnSO_4 \cdot 7H_2O$, Zn foil, 1-ethyl-3-methylimidazolium chloride and $AlCl_3$ were purchased from Sigma Aldrich. Deionized water was obtained from Milli-Q water purification system. The resistivity of the deionized water is 18.2 MΩcm at room temperature. $ZnSO_4 \cdot 7H_2O$ was dissolved into the deionized water to prepare the 2M $ZnSO_4$ electrolyte for Zn electrodeposition. Graphene dispersion in N-methyl-2-pyrrolidone (4 wt %) was purchased from ACS Material. The flake diameter is 1~3 μm; the thickness is 3~5 nm. The graphene dispersion was sheared by doctor blade with a shear strain of 0.5 and a shear rate of 1 $s^{-1}$ on stainless steel substrate. Immediately after the shearing, the graphene coated stainless steel was transferred into vacuum for drying at room temperature. The areal mass loading of graphene is ~0.2 mg/cm². Ketjen Black (KB) carbon was purchased from AkzoNobel.

α-$MnO_2$ was synthesized via a conventional hydrothermal route, in which a solution that contains 5 mM $KMnO_4$ and 0.3M HCl was kept at 140° C. for 18 hours. The Au nanosheets were synthesized using the method reported in Ref (32).

Characterization of materials. Transmission electron microscopy (TEM) and scanning transmission electron microscopy (STEM) were performed on FEI F20 to identify the crystallographic features of Zn deposits. Field-emission scanning electron microscopy (FESEM) was carried out on Zeiss Gemini 500 Scanning Electron Microscope equipped with Bruker energy dispersive spectroscopy (EDS) detector to study the electrodeposition morphology of Zn under multiple conditions. Shear rheology measurement was performed using Anton Paar MCR 501 at room temperature. Atomic force microscopy (AFM) was performed on Cypher ES (Asylum Research Inc.). Cyclic voltammetry (CV) was performed on a CH 600E electrochemical workstation.

Carbon K-edge near-edge X-ray absorption fine structure (NEXAFS) measurements were carried out at the National Institute of Standards and Technology (NIST) SST-1 beamline at the National Synchrotron Light Source II at Brookhaven National Laboratory. NEXAFS spectra were obtained using a horizontally polarized X-ray beam incident at 20°, 40°, 55°, 70°, and 90° with a spot size of 10 μm. The entrance grid bias was set to −150 V to enhance surface sensitivity and reduce the low-energy electron background. A toroidal spherical grating monochromator, possessing grating of 1200 lines/mm was used to acquire the C K-edge data. Slit openings of 30 μm×30 μm along the beamline provided an energy resolution of ~0.1 eV for all spectra. The partial electron yield signals were normalized to the incident beam intensity using the photoemission signal from a freshly evaporated Au mesh located along the incident beam path. The spectra were energy-calibrated with an amorphous carbon mesh located along the path of the incident beam using π* transition of graphite at 285.1 eV. Spectra were calibrated and normalized using standard routines from the Athena software.

Grazing incidence X-ray diffraction (GIXRD) was performed on a Rigaku SmartLab X-ray diffractometer with a Cu Kα X-ray source and a 0D scintillation detector. The instrument was operated in parallel beam geometry and measurements were collected with a 2θ scan axis. GIXRD patterns were collected from 35-47° 2θ, with a step size of 0.05°, and a scan speed of 0.1°/min. To ensure high electrodeposited zinc intensity while minimizing substrate signal, omega values of 1.0 and 0.8° were used for the bare stainless steel and graphene coated steel samples respectively. 2D-GIXRD was performed on Bruker D8 General Area Detector Diffraction System. XRD simulations were performed in GSAS-II using a step size of 0.05° and instrument parameters consistent with the Rigaku SmartLab used for the GIXRD measurements.

Electrochemical measurements. Galvanostatic charge/discharge performance of coin cells were tested on Neware battery test systems at room temperature. Electrochemical studies were performed using CR2032 coin cells. The area of electrodes in this study is 1.27 cm$^2$. Electrodes are separated by glass fiber (GF/A, Whatman). Stainless steel and carbon cloth were washed by ultrasonication in deionized water and acetone. In each coin cell, ~100 μL electrolyte was added by pipette. The electrodeposition of Al was performed in a mixture of aluminum chloride and 1-ethyl-3-methylimidazolium chloride (1.5:1, weight ratio).

In the Zn∥α-MnO$_2$ full cell experiment, the electrolyte was 2M ZnSO$_4$+0.2 M MnSO$_4$. Except the cell that used zinc foil, the zinc anodes are prepared by electrodeposition to precisely control the amount of Zn and therefore the N:P ratio. The electrodeposition was done at 4 mA/cm$^2$.

In a Zn plating/stripping Coulombic efficiency measurement (Zn∥stainless steel or graphene coated Zn∥graphene coated stainless steel), a certain amount of Zn is plated on the substrate of interest, and a reverse potential is applied to strip the deposited Zn metal. Coulombic efficiency $$(CE) = \frac{\text{stripping capacy}}{\text{plating capacity}} \times 100\%,$$

which quantifies the reversibility of the metal anode. For example, CE=100% means all the plated Zn can be stripped; while CE=80% means that 80% of plated Zn can be stripped and 20% Zn is electrochemically inactive.

As revealed by the 2D-GIXRD, the presence of the graphene substrate leads to fundamental changes in the Zn crystallography. In the 2D diffraction pattern of Zn deposition on graphene substrates, the strong, discrete diffraction spots on the (002) ring confirms the existence of the (002)-textured, large single-crystalline Zn deposits. Of particular note is that, the presence of the single-crystalline deposits also confirms the homo-epitaxy process, in which the initial small Zn platelets continuously grow without breaking the original orientation relation set by the graphene sheet (Φ=3~4 μm) beneath as an epitaxial substrate (e.g. the one shown in FIG. 14).

By stark contrast, in the diffraction patterns of Zn on bare stainless steel, the diffraction rings are continuous, dispersive, which confirms that the Zn platelets are polycrystalline and are randomly oriented. The diffraction of the stainless steel is close to the (101)$_{Zn}$ diffraction ring, for both bare stainless steel substrate and graphene-coated stainless steel substrate.

Figure 12:
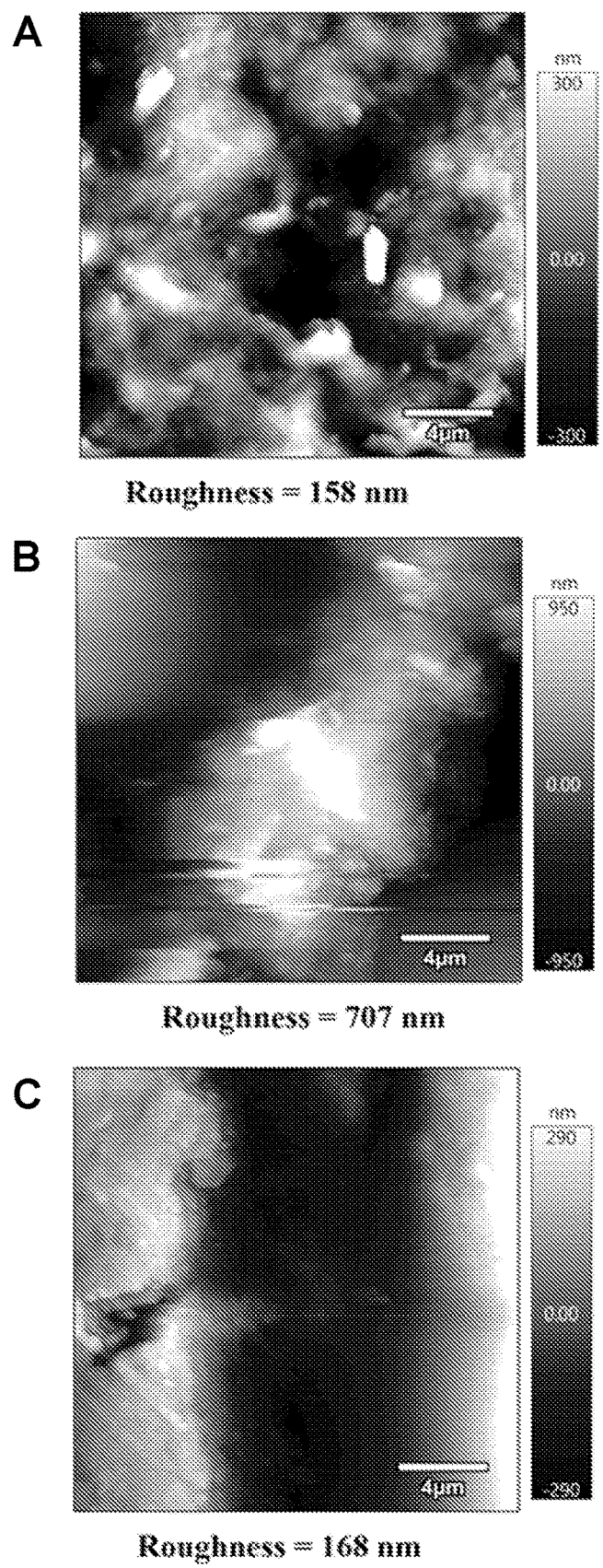
FIG. 12 shows AFM height mapping of a graphene substrate (A) with and (B) without shearing, and (C) bare stainless-steel substrate.

FIG. 12 shows AFM height mapping of graphene substrate (A) with and (B) without shearing, and (C) bare stainless-steel substrate. The results mean that aligned graphene will not add roughness to the hard stainless-steel substrate on the back; whereas the unaligned graphene substrate without the shearing procedure will significantly increase the surface roughness.

Figure 13:
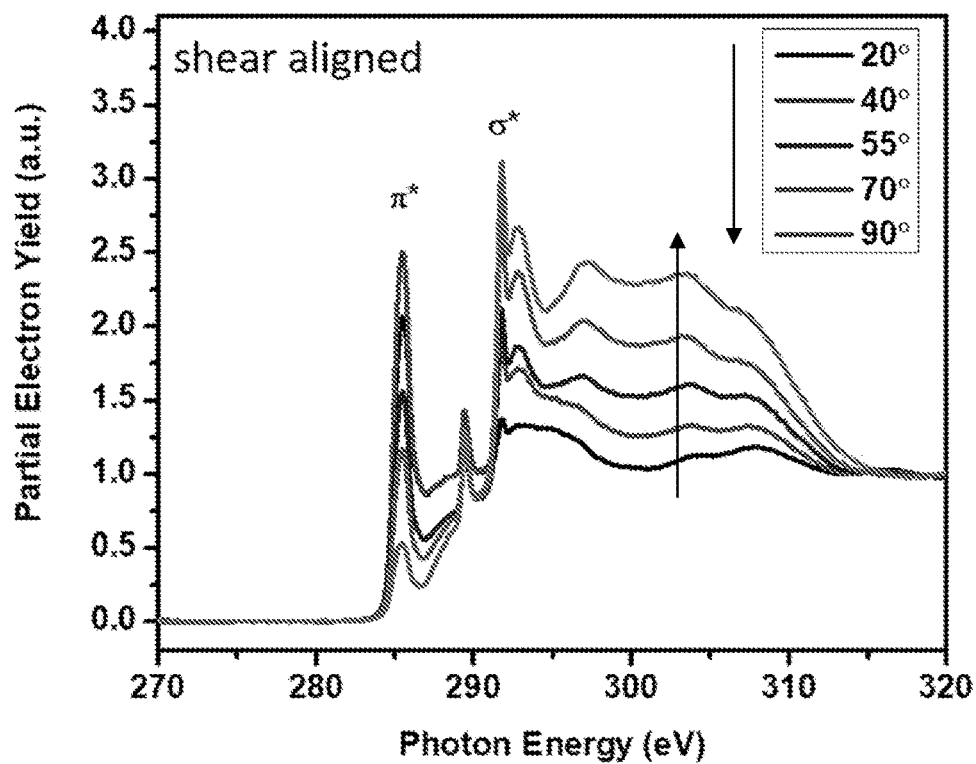
FIG. 13 shows polarized C K-edge spectra of (A) shear aligned graphene and (B) non-aligned graphene prepared without shearing; all spectra have been pre- and post-edge normalized; (C) integrated intensity of the π* resonance versus the angle of incidence; the dash line shows the fitted cos$^2$θ dependence of the π* intensities.
Figure 13:
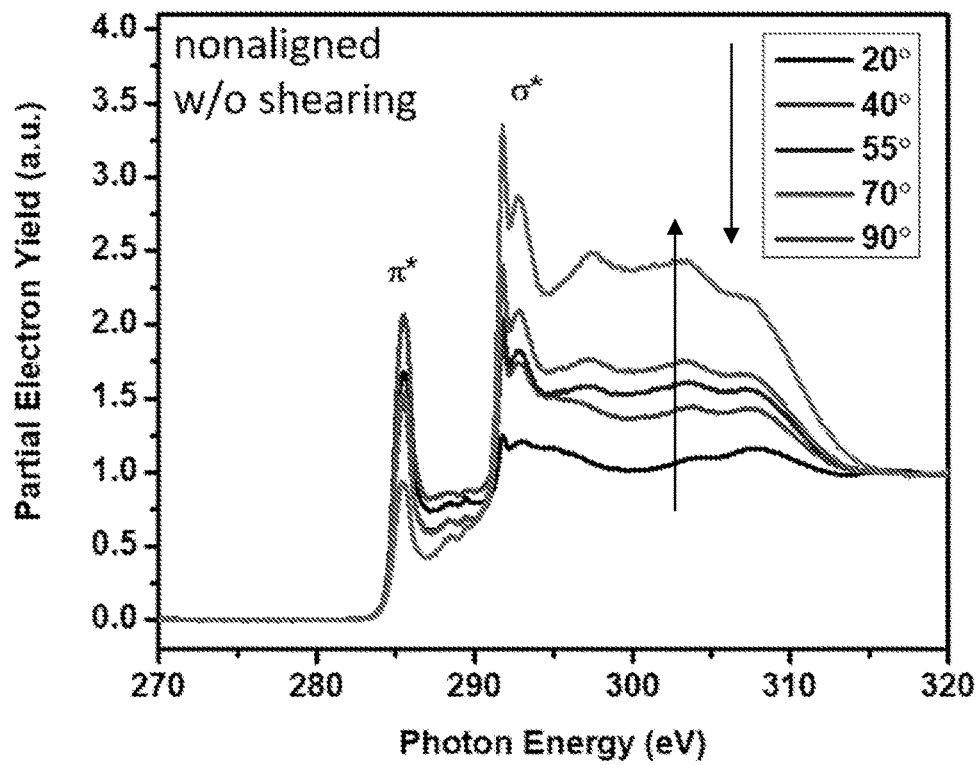
Figure 13:
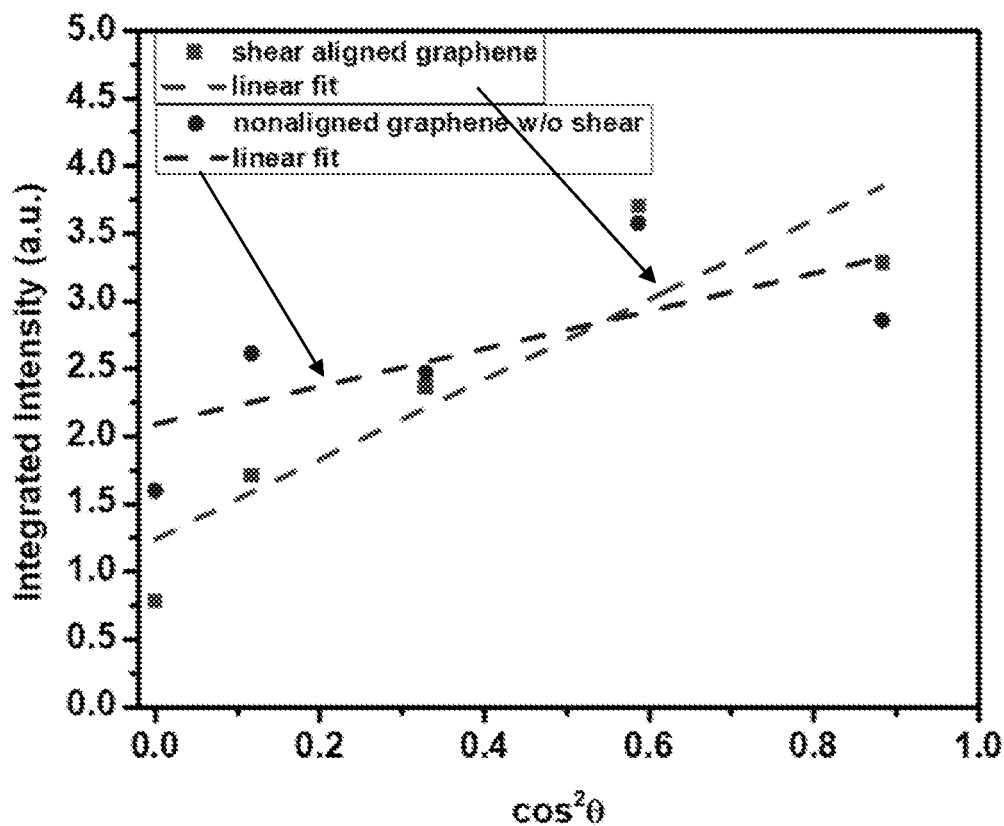

FIG. 13 shows polarized C K-edge spectra of (A) shear aligned graphene and (B) non-aligned graphene prepared without shearing; all spectra have been pre- and post-edge normalized; (C) integrated intensity of the π8 resonance versus the angle of incidence; the dash line shows the fitted cos$^2$θ dependence of the π* intensities.

Carbon K-edge NEXAFS spectrum arises from the transition of C 1 s core states to 2p-derived partially filled and unoccupied states and is thus a powerful local probe of the electronic structure above the Fermi level. The sharp peak at around 285.5 eV represents the C 1 s to the C=C 2p π* transition and the broad peak at 292-294 eV is composed of three C 1 s to C—C σ* transitions. NEXAFS spectra are sensitive to the polarization of the incident X-rays. In the case of graphene, when the electric-field vector E lies along the basal plane, transitions to orbital states of σ symmetry are enhanced, whereas when E is perpendicular to the basal plane, transitions to the out-of-plane π-network increases in intensity. The strong orientation dependence of transition probabilities thus renders NEXAFS a sensitive probe of the alignment and orientation of graphene samples.

FIG. 13 depicts polarized C K-edge NEXAFS spectra acquired for the shear aligned graphene and non-aligned control samples prepared without shearing. The π* resonance of the shear aligned sample displayed in FIG. 13A clearly showed extensive dichroism. The intensity of the π* peak decreased along with the increasing angle of incidence, while less pronounced dichroism was observed for the nonaligned sample (FIG. 13B). Notably, a pronounced peak located at 289.3 eV between the π* and σ* resonances was only observed in the shear aligned graphene sample, which can be attributed to transitions originated from π* C=O states derived from edge carboxylic acid groups formed during sample preparation processes.

The extent of alignment was further quantified by a dichroic ratio (DR):

$$DR = \frac{I_\perp - I_\parallel}{I_\perp + I_\parallel} \qquad \text{(equation 1)}$$

where $I_\perp$ is the integrated intensity of the π* resonance at θ=90° and $I_\parallel$ is the extrapolate of the integrated intensity at θ=0° obtained from the fitted cosine curves. A DR value of 0 is expected for a sample with completely random alignment while a DR value of −1 is expected for a perfectly aligned sample. The DR values were calculated to be −0.54 and −0.25 for the shear aligned graphene and nonaligned control sample prepared without shearing, respectively.

FIG. 14 shows low-magnification SEM images of Zn deposits on graphene substrate. J=4 mA/cm$^2$, 2 minutes. The SEM results obtained with low magnifications show that, throughout a millimeter-scale area, Zn metal deposits uniformly on the graphene substrate, implying that the epitaxial electrodeposition of Zn is ubiquitous, and is hence scalable for battery anodes.

Figure 17:
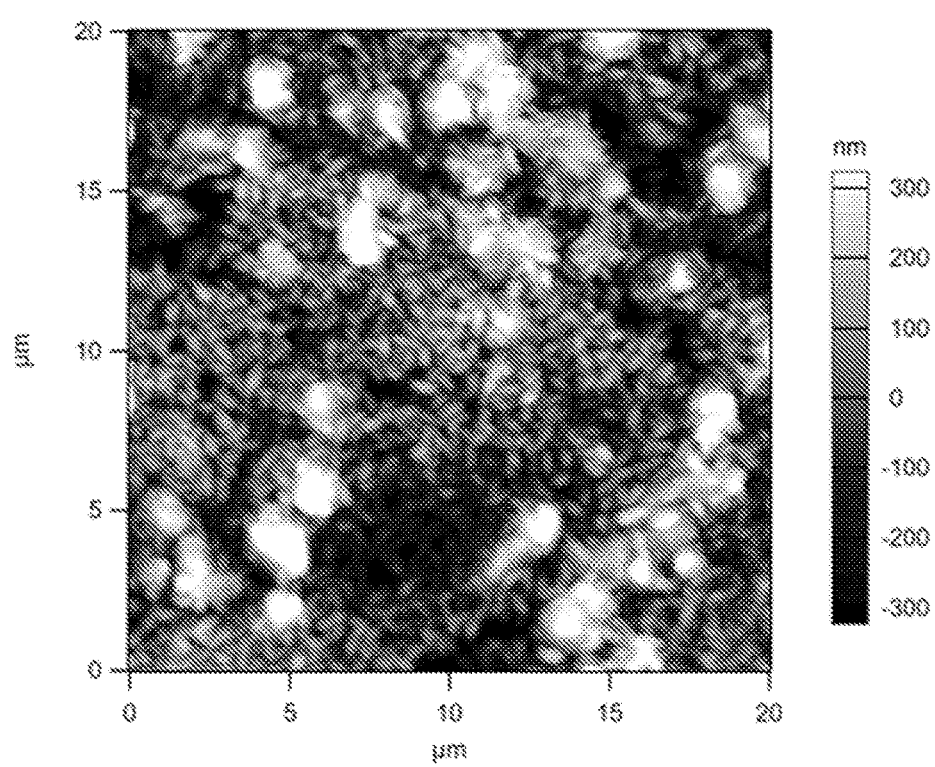
FIG. 17 shows AFM characterization of Zn deposits. (A) Height and (B) phase imaging of Zn on bare stainless steel. (C) Height and (D) phase imaging of Zn on graphene-coated stainless steel. Deposition time: 40 s. Current density J=4 mA/cm$^2$.
Figure 17:
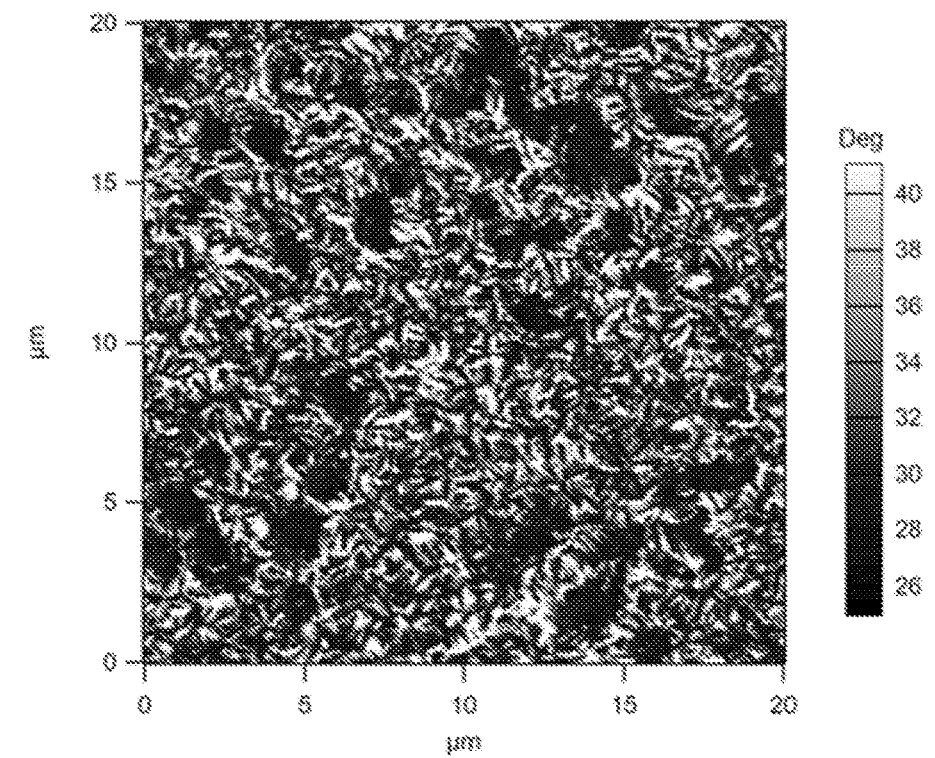
Figure 17:
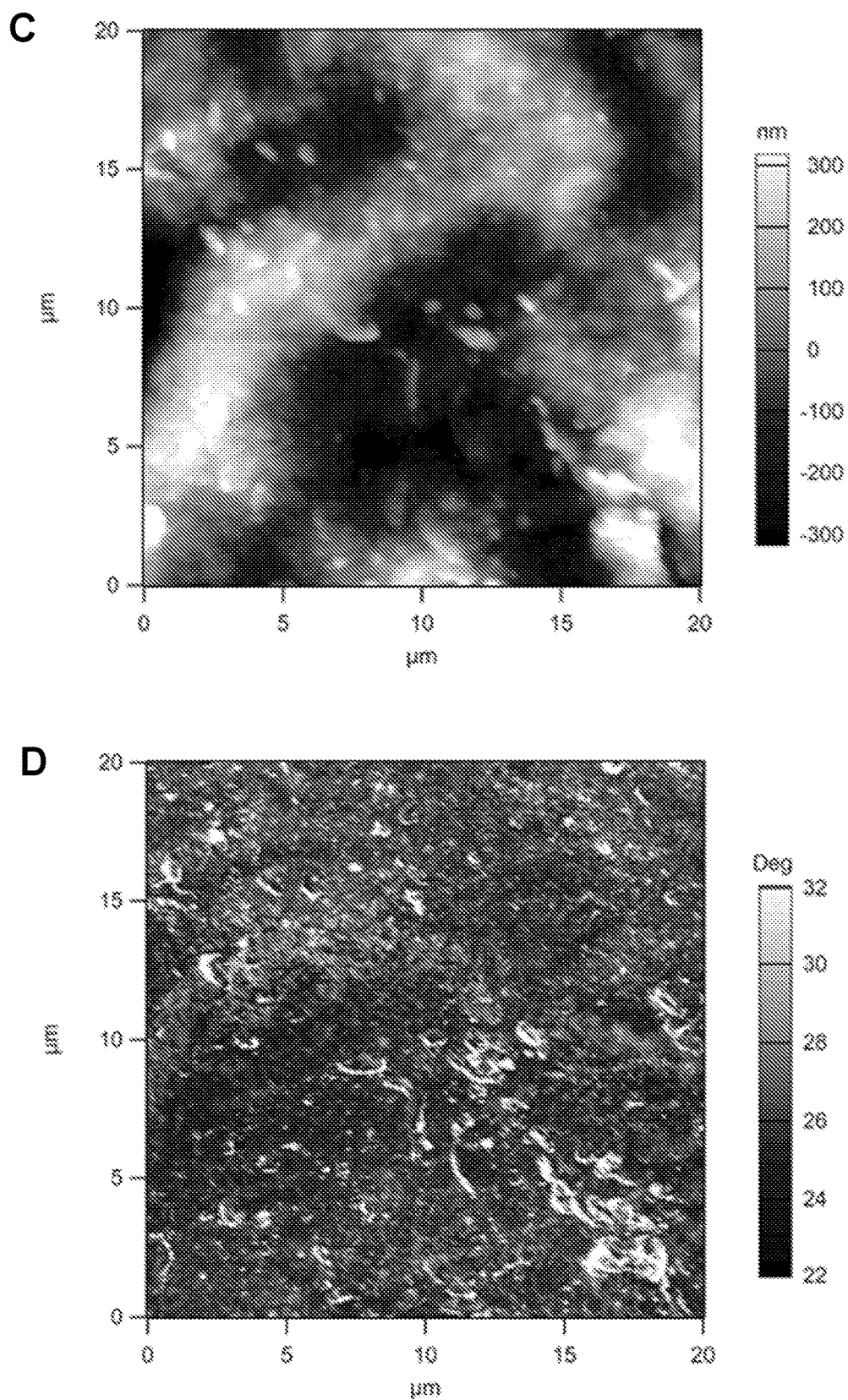
Figure 18:
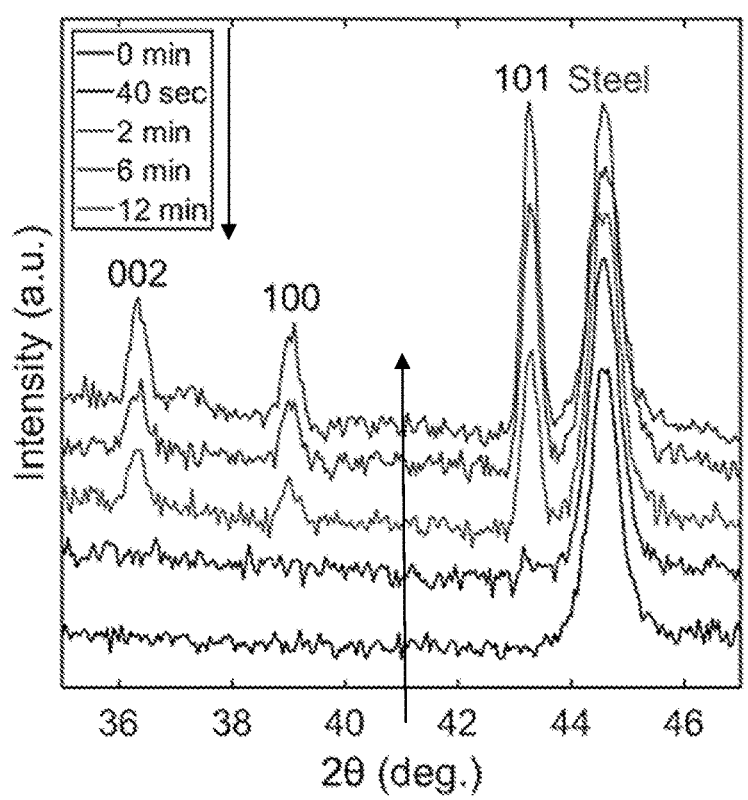
FIG. 18 shows GIXRD characterization of patterns of zinc electrodeposited on (A) bare stainless steel and (B) graphene coated stainless steel.
Figure 18:
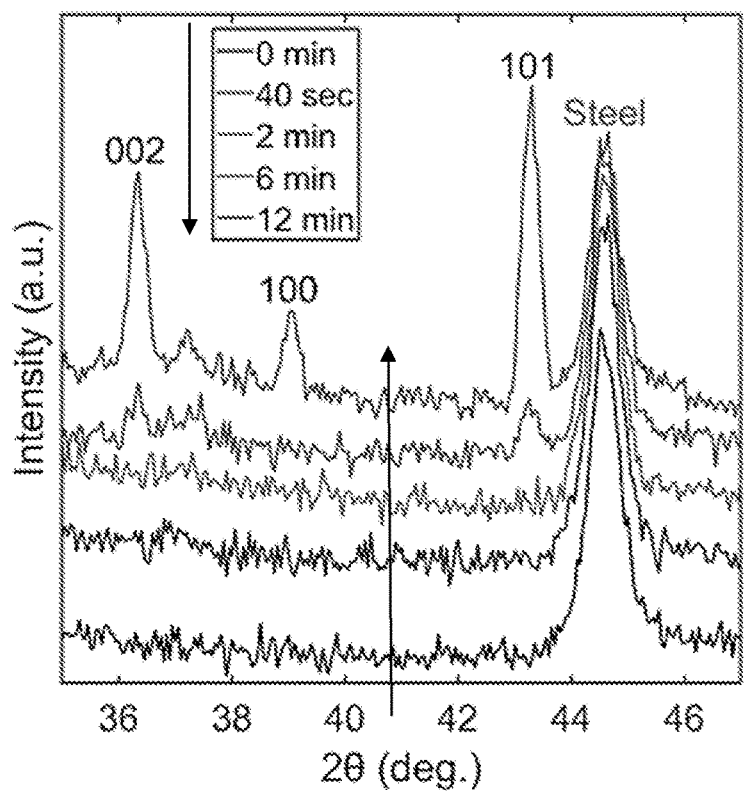

FIG. 17 shows AFM characterization of Zn deposits. (A) Height and (B) phase imaging of Zn on bare stainless steel. (C) Height and (D) phase imaging of Zn on graphene-coated stainless steel. Deposition time: 40 s. Current density J=4 mA/cm$^2$. Atomic force microscopy (AFM) analysis was performed to further interrogate the epitaxial deposition of Zn on the textured graphene interphase. On a bare substrate without the graphene coating, both the height- (FIG. 17A) and phase-contrast image (FIG. 17B) confirm the plate-like deposition pattern of Zn, and that the plates do not orient parallel to the substrate. In contrast, on a graphene-coated substrate, the plate features are no longer detected (FIG.

17C~D), confirming that the Zn layers are completely parallel to the substrate. AFM Phase imaging provides a map of areal variations in the coating stiffness—higher stiffness is associated with larger positive phase shift and brighter contrast, which is therefore a more sensitive detection of different phases that exclude the surface roughness. Of note is that the phase imaging of Zn deposition on graphene (FIG. 17D) confirms that there is uniform nucleation and growth of Zn as a result of the precisely controlled epitaxial process.

Figure 19:
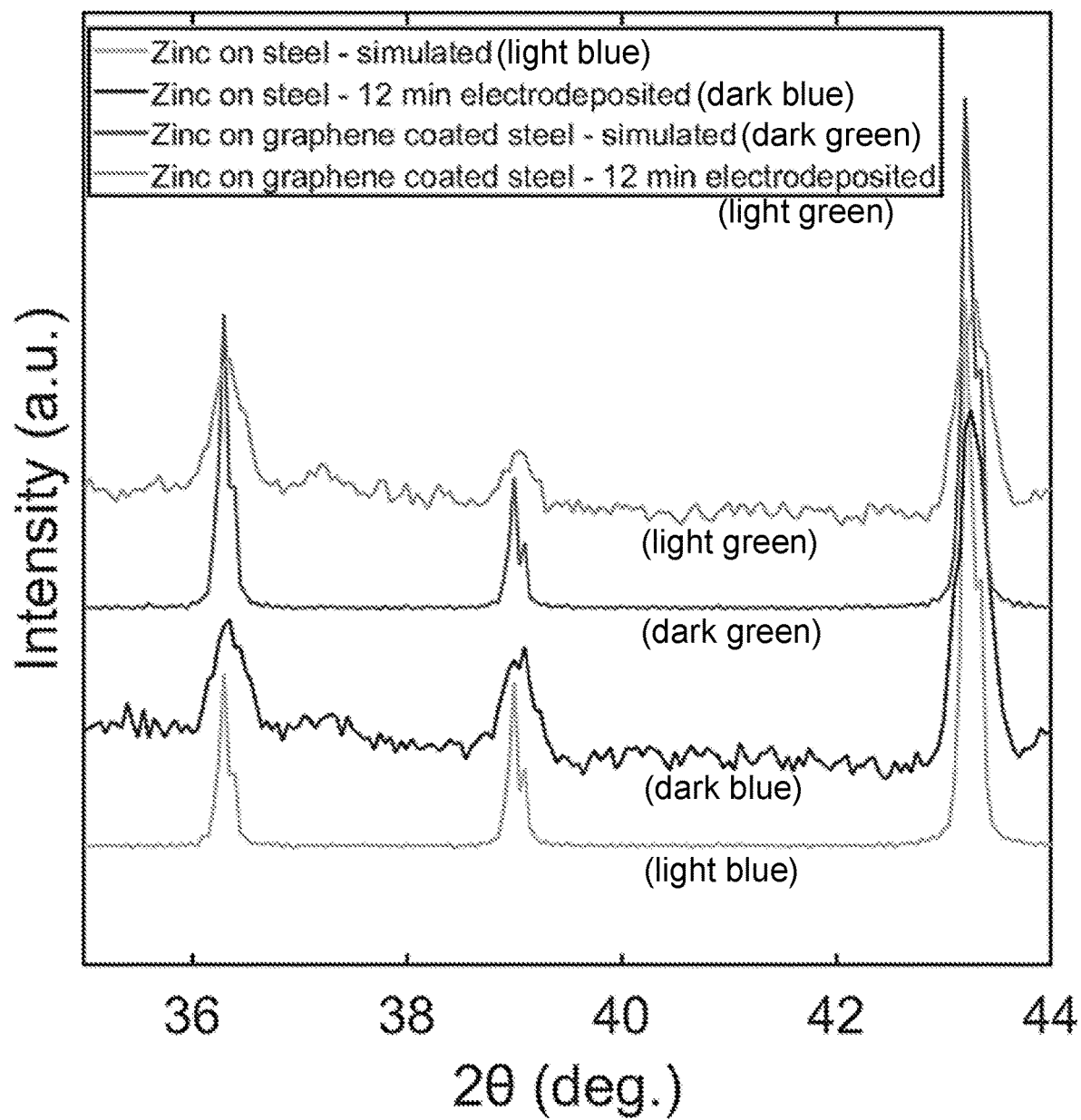
FIG. 19 shows XRD patterns of simulated zinc with a March-Dollase ratio (0001) of 1.10 (light blue), 12 minute electrodeposited zinc on steel (dark blue), simulated zinc with a March-Dollase ratio (0001) of 0.926 (dark green), and 12 minute electrodeposited zinc on graphene coated steel (light green).

FIG. 19 shows XRD patterns of simulated zinc with a March-Dollase ratio (0001) of 1.10 (light blue), 12 minute electrodeposited zinc on steel (dark blue), simulated zinc with a March-Dollase ratio (0001) of 0.926 (dark green), and 12 minute electrodeposited zinc on graphene coated steel (light green). To gain more quantitative information about the observed preferred orientation, theoretical XRD patterns were generated. The XRD patterns were simulated with various March-Dollase ratios along the (0001) axis to determine the level of preferred orientation in both of the 12 minute electrodeposits. March-Dollase ratios along a certain axis of less than 1.0 imply that the crystallites are stacking along that axis, while values greater than 1.0 imply that the crystallites are oriented away from that axis. This preferred orientation can be observed in the XRD patterns by changes in the relative intensities in the peaks; specifically stacking along the (0001) axis should lead to a higher (0002)/(1000) intensity ratio while orienting away from that axis should result in a lower ratio. The 12 minute electrodeposit XRD patterns along with the XRD simulations are shown in FIG. 19. The simulated XRD pattern for zinc on steel had a March-Dollase ratio of 1.10 while the simulated pattern for zinc on graphene coated steel had a ratio of 0.926. The simulated intensity ratios of the three peaks are consistent with the observed ratios suggesting the simulated level of preferred orientation is accurate. The lower March-Dollase ratio determined for the zinc on graphene coated steel material is consistent with an epitaxial zinc coating where the zinc is aligned along the mutual (0001) axis of the zinc and graphene.

Figure 22:
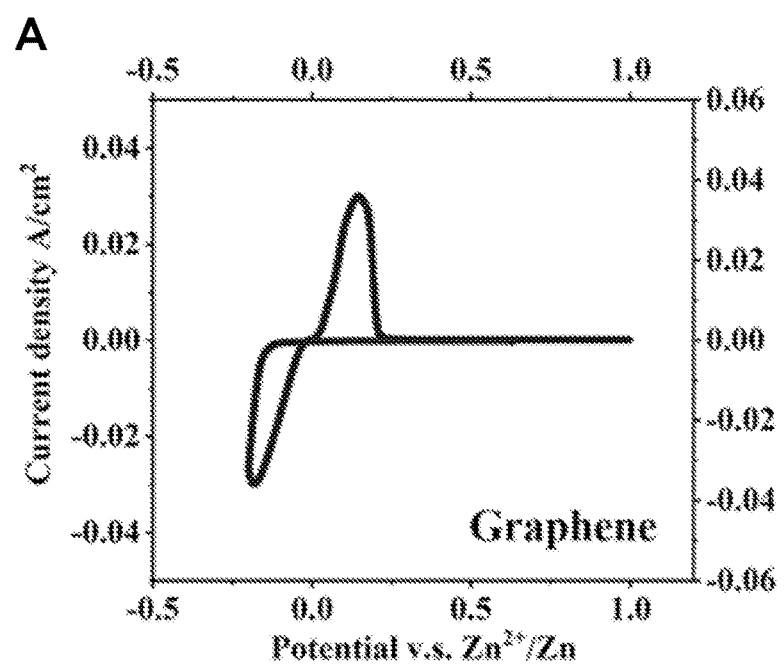
FIG. 22 shows cyclic voltammetry of Zn plating stripping on (A) aligned graphene with shearing, (B) unaligned graphene without shearing and (C) bare stainless steel (scan rate 2 mV/s).
Figure 22:
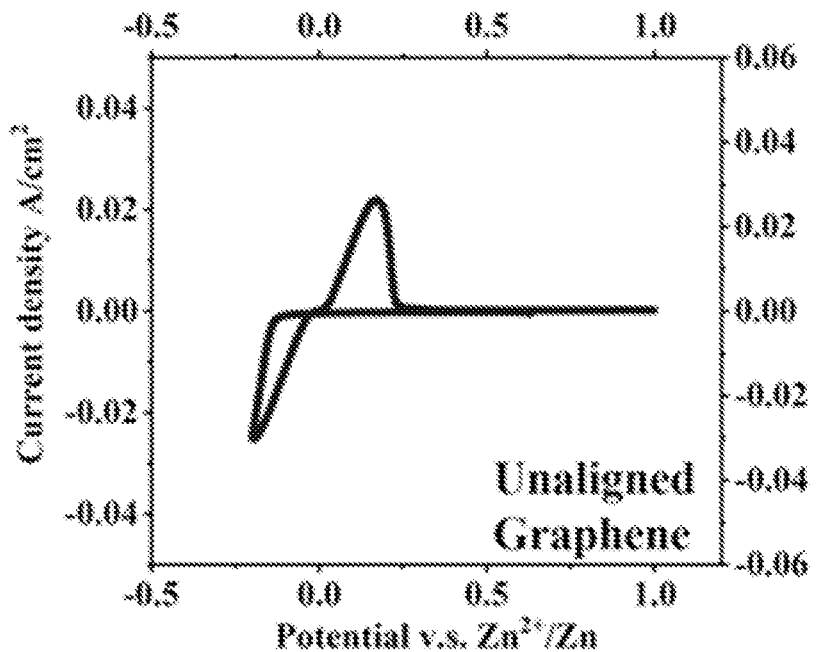
Figure 22:
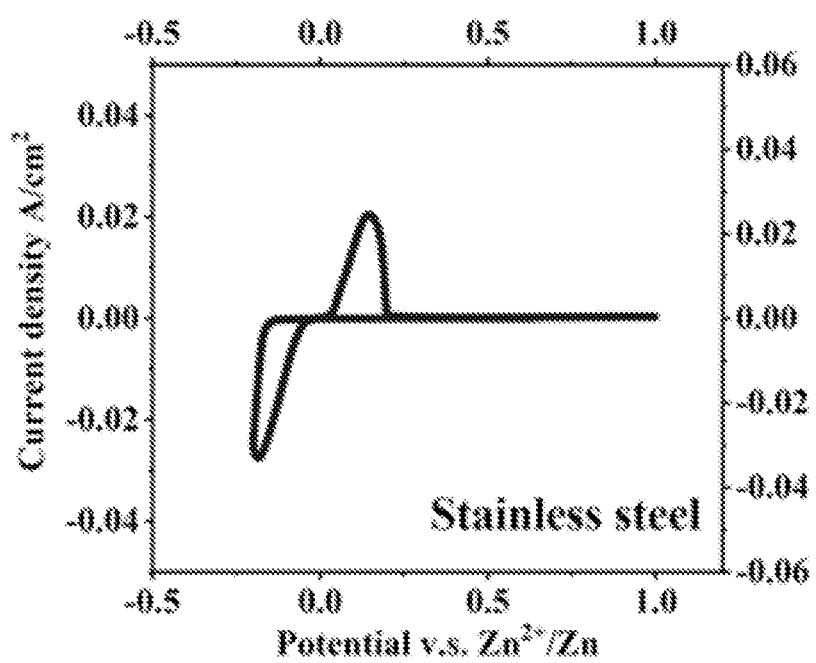

FIG. 22 shows cyclic voltammetry of Zn plating stripping on (A) aligned graphene with shearing, (B) unaligned graphene without shearing and (C) bare stainless steel (scan rate 2 mV/s). The results show that there is not remarkable difference in peak positions, which is consistent with the galvanostatic potential profiles where the overpotentials of the three types of electrodes do not differ much. It means that, the reaction mechanism ($Zn^{2+}+2e^-==Zn$) holds regardless of the choice of substrate; instead, the alignment of the reduced Zn (i.e. metallic Zn plates) is dependent on the substrate as evidenced by comparing FIG. 1B~C and FIG. 3.

FIG. 27 shows (A) Coulombic efficiency of Zn plating stripping on unaligned graphene substrate and (B) corresponding voltage profile. J=40 mA/cm², capacity=0.8 mAh/cm². (C)(D) SEM images of Zn deposition morphology on unaligned graphene. J=4 mA/cm², 2 minutes. The deficiencies of unaligned graphene in terms of regulating Zn deposition can be attributed to the following factors. (1) Being unaligned necessarily means that the substrate is rougher than a well aligned substrate (see FIG. 12; the roughness is doubled when the graphene is unaligned). Surface roughness creates local concentrated electric field in the vicinity of regions whose curvature is larger, leading to preferred electrodeposition in these areas. (2) Being unaligned necessarily means that the [0002] directions of the graphene sheets are pointing randomly. As a result, the [0002] directions of the hetero- and homo-epitaxy templated Zn deposits are, as a result, pointing randomly, leading to the failure of forming a compact, smooth deposit.

EXAMPLE 2

This example provides a description of conducting coatings, anodes, and devices of the present disclosure.

Epitaxy is a process where the growth of a crystalline phase can be regulated with atomic-level precision. In an epitaxial process, the thin deposit forms a coherent lattice interface with the substrate. And create a uniform deposition layer.

Figure 36:
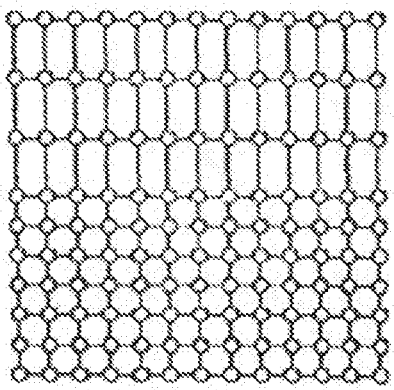
FIG. 36 shows a conceptual design: epitaxy theories.
Figure 36:
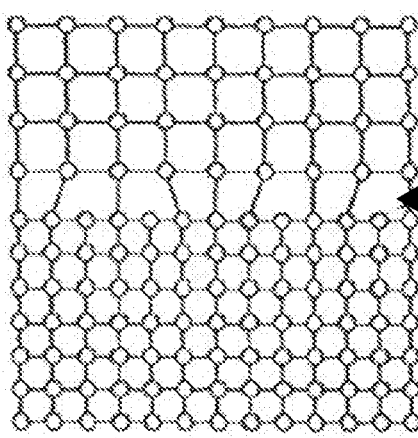
Figure 37:
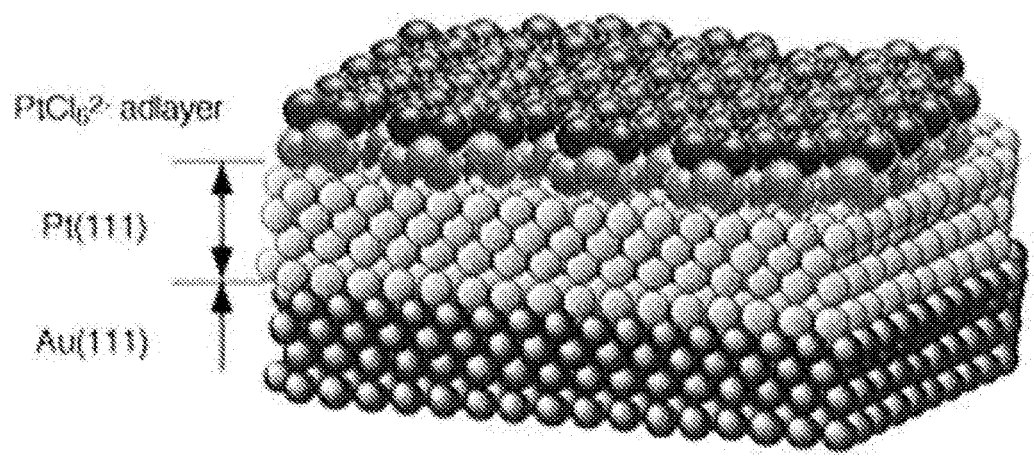
FIG. 37 shows an illustration showing the epitaxial growth of Pt (111) on Au(111).

The epitaxial relation is achieved through the formation of the coherent interface (FIG. 36 and FIG. 37). In this case, the extra interfacial energy and strain energy can be minimized. As an empirical rule, the lattice misfit should be smaller than 15%. Otherwise, the interface could be semi-coherent with defects incorporated, or even totally incoherent. Which are undesirable in this case.

Figure 38:
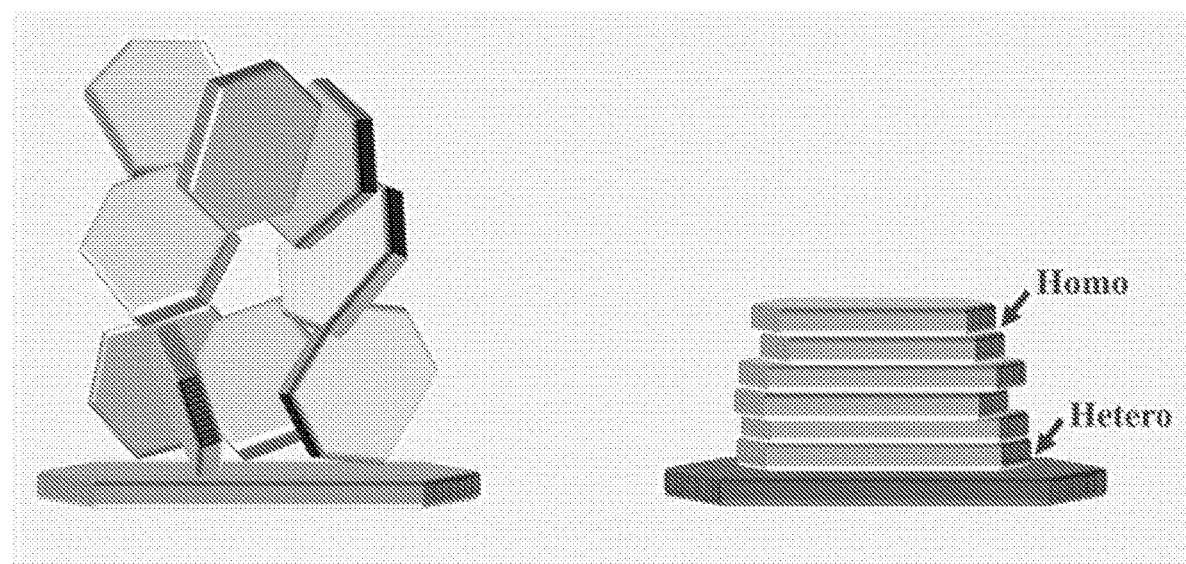
FIG. 38 shows an epitaxial substrate.

In this example, it was determined that a substrate can heteroepitaxially template the first layer of the metal deposition. And this initial metal layer can homoepitaxially regulate the subsequent growth, as shown in FIG. 38.

Figure 39:
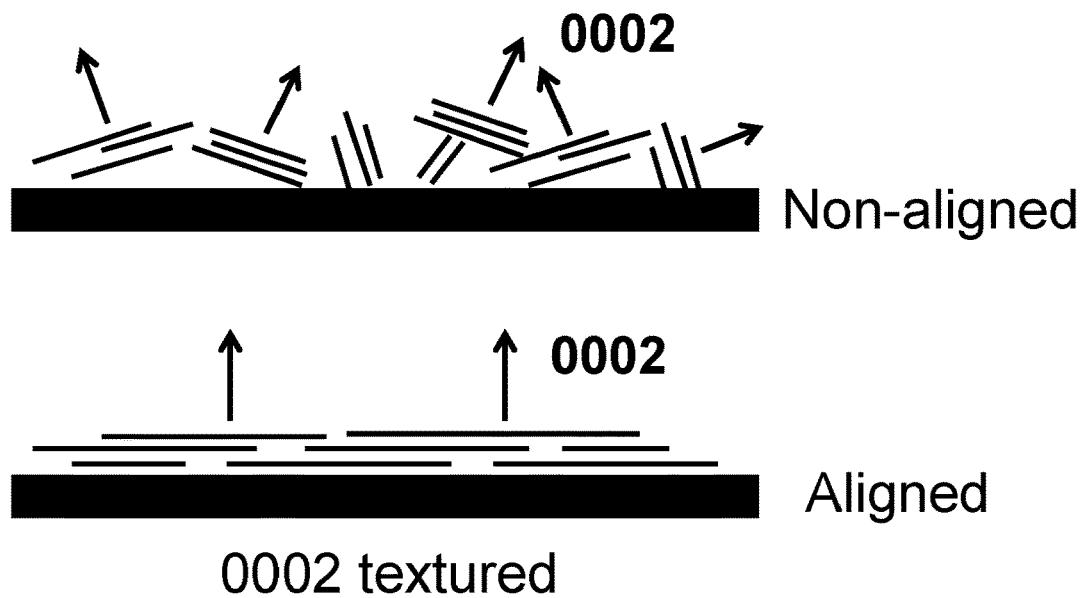
FIG. 39 shows a (0002)-textured graphene substrate.

Graphene was identified as a candidate material. It was determined that a graphene substrate that was horizontally aligned with the substrate as shown in the lower representation, as opposed to the randomly oriented, non-aligned graphene domains shown in the upper representation of FIG. 39.

Figure 40:
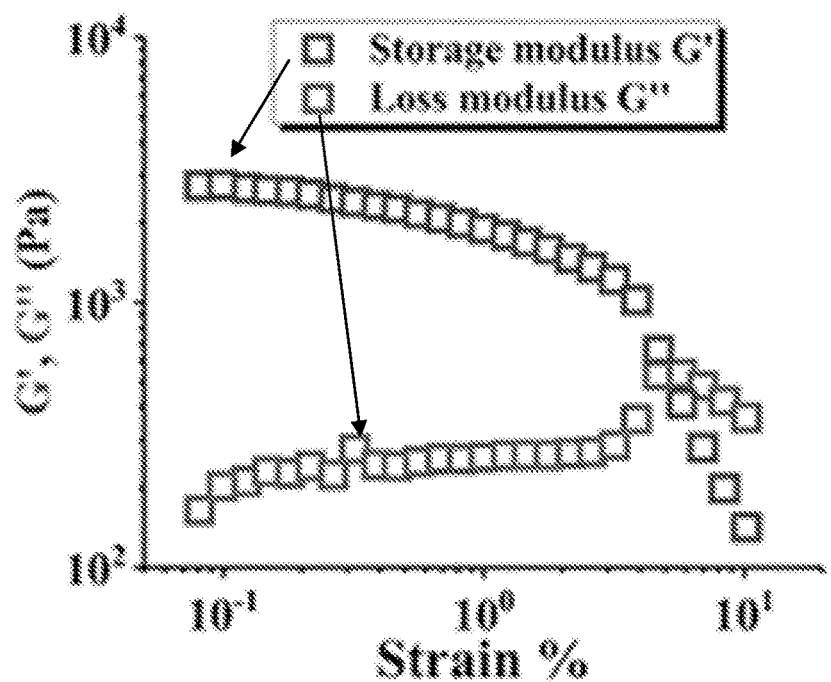
FIG. 40 shows rheological properties of 4 wt % graphene-NMP suspension.
Figure 41:
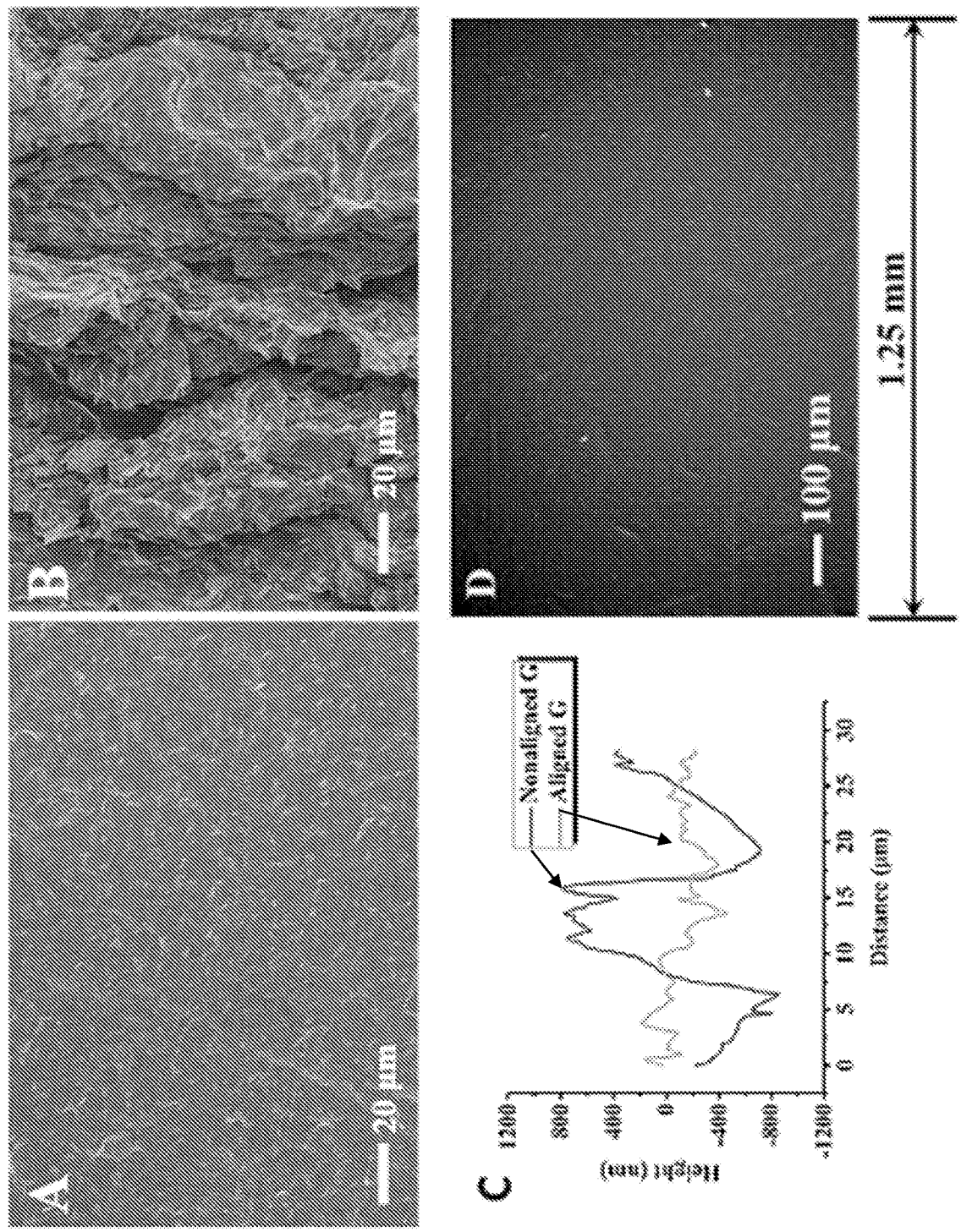
FIG. 41 shows (A), (B), (C), and (D) microstructure characterization of graphene substrates.

The graphene layer was formed based on the methods used in Example 1. Graphene was dispersed in an organic solvent, NMP. Then, the rheological properties of the graphene dispersion were measured. As shown in (FIG. 40), the graphene suspension exhibits an obvious strain softening behavior—the storage modulus decays quickly as a greater strain is applied. The quick drop at around 10% indicates the collapse of the original random percolation network, and the re-alignment of the anisotropic graphene domains. FIG. 41A shows the microstructure of a graphene substrate prepared via this doctor blade-based method. It is smoother than a graphene substrate prepared without the shearing process, as shown in FIG. 41B. This difference can be detected by AFM height profiling (FIG. 41C). The doctor blade-based method is scalable, and can be used to fabricate large-area graphene substrate as shown in FIG. 41D.

Figure 42:
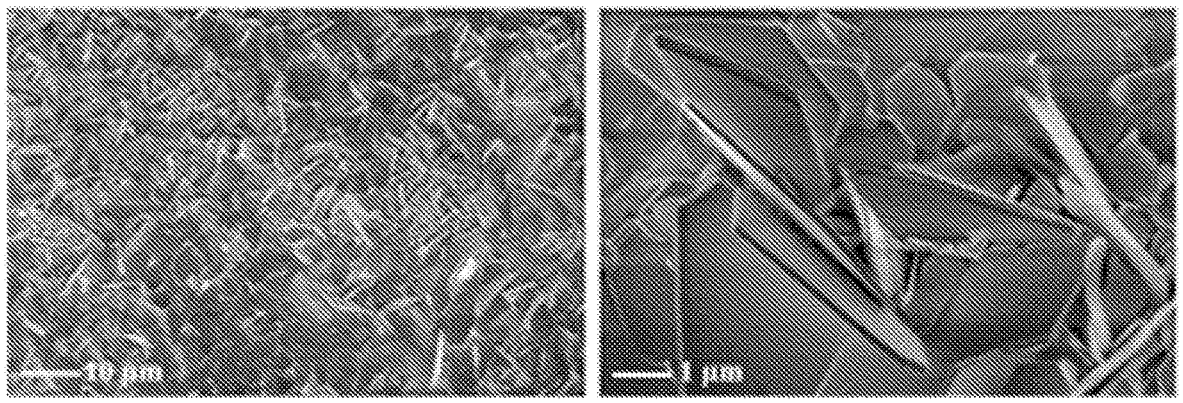
FIG. 42 shows an SEM micrograph of Zn deposition on stainless steel.
Figure 43:
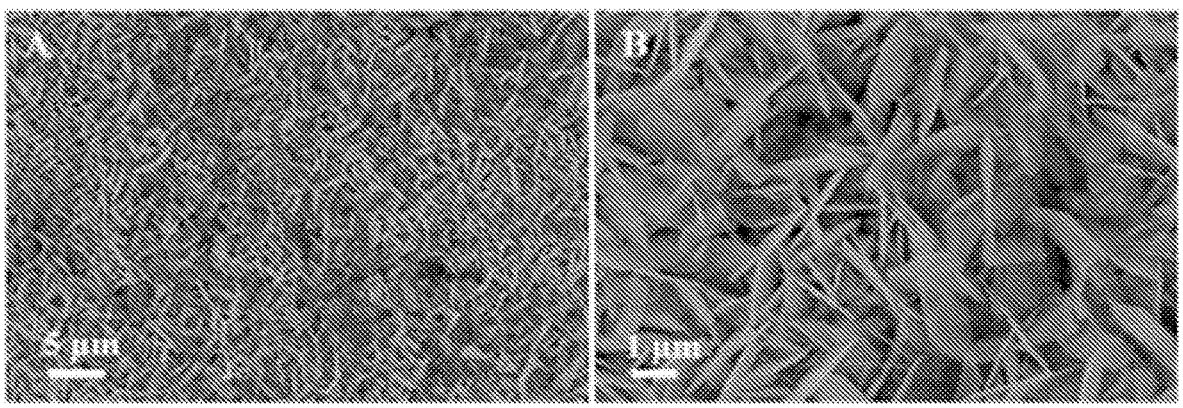
FIG. 43 shows an SEM micrograph of Zn deposited on Ketjen-black coated stainless steel.

FIG. 42 reports Zn electrodeposition morphology on bare stainless steel. The plate-like Zn deposits are randomly-oriented, showing a porous morphology. FIG. 43 reports Zn electrodeposition morphology on ketjen-black carbon coated stainless steel. Similarly, the Zn shows a porous structure with randomly-oriented plate-like structures.

Figure 44:
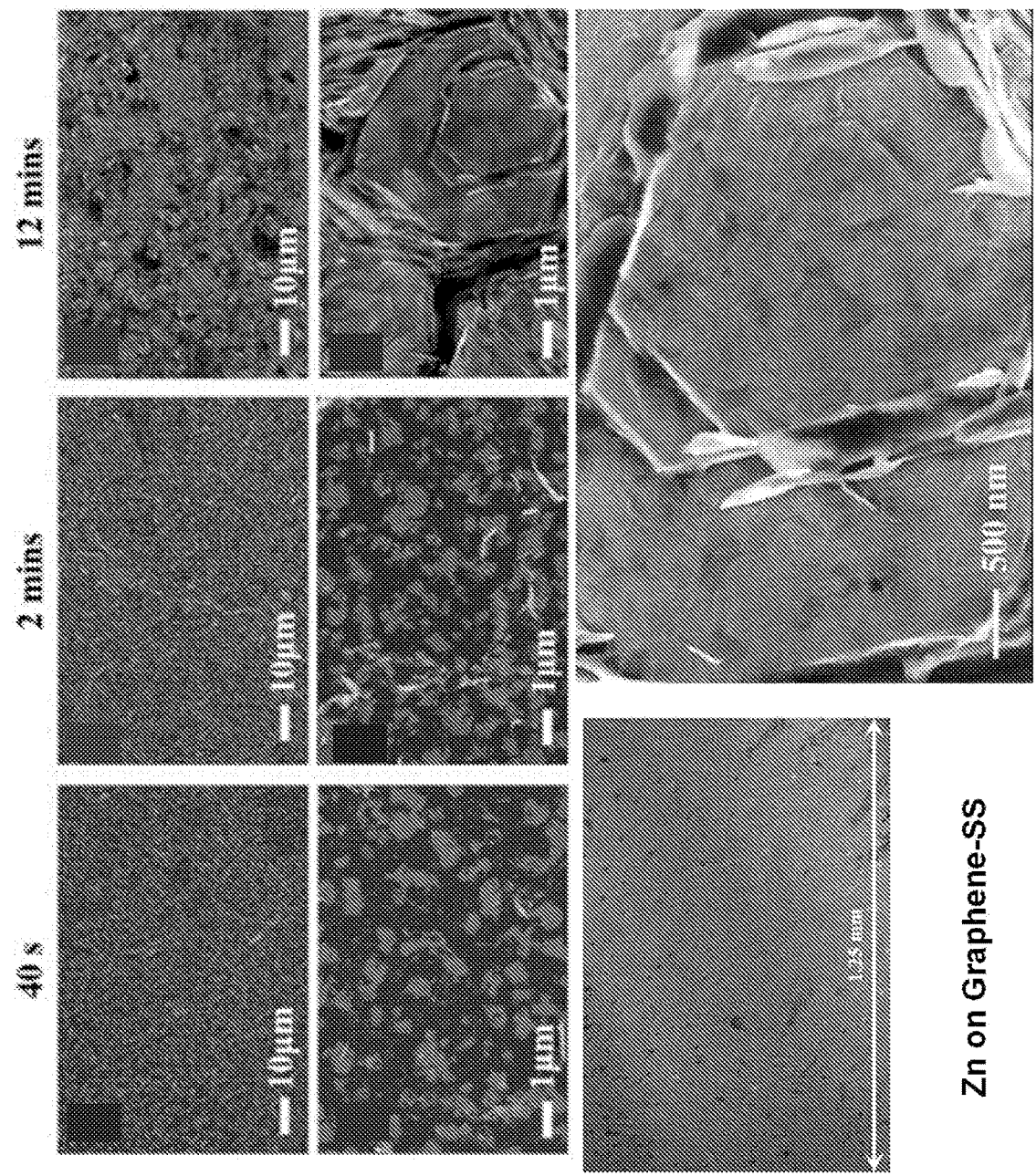
FIG. 44 shows an SEM micrograph of Zn deposited on graphene coated stainless steel.

As shown in FIG. 44, the Zn electrodeposits are turned over, to be horizontally aligned with the graphene substrate. The 40 second and 2 minute samples show mainly a hetero-epitaxy process, in which Zn is gradually covering the surface of graphene, by a layered growth mode. Later, as the graphene surface is fully occupied, the Zn plates start to stack on the Zn plates, in a homoepitaxial manner. This is shown in the layer-by-layer stacking in the enlarged SEM picture shown on the lower right.

Figure 45:
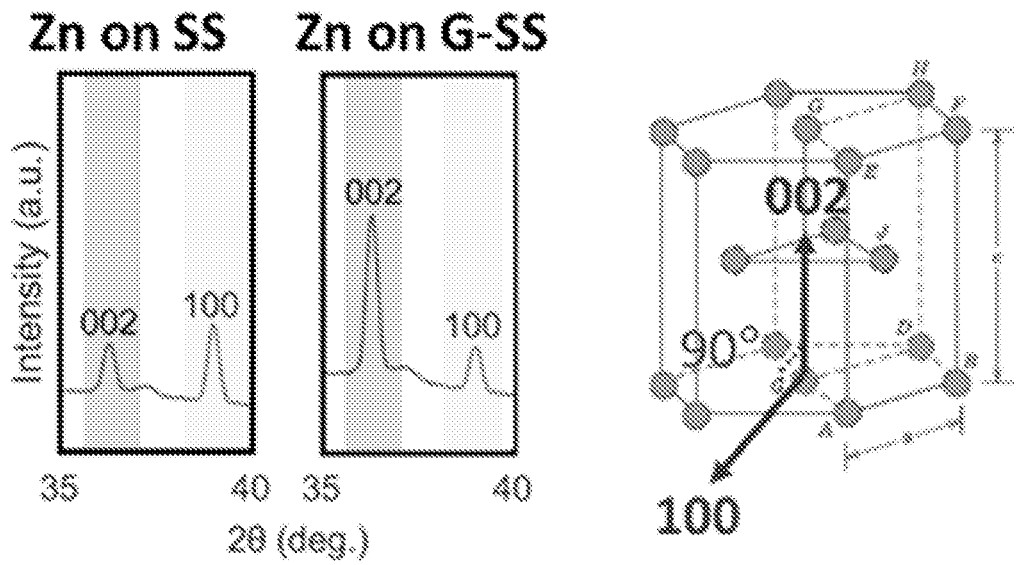
FIG. 45 shows an X ray diffraction analysis of a Zn deposition.
Figure 45:
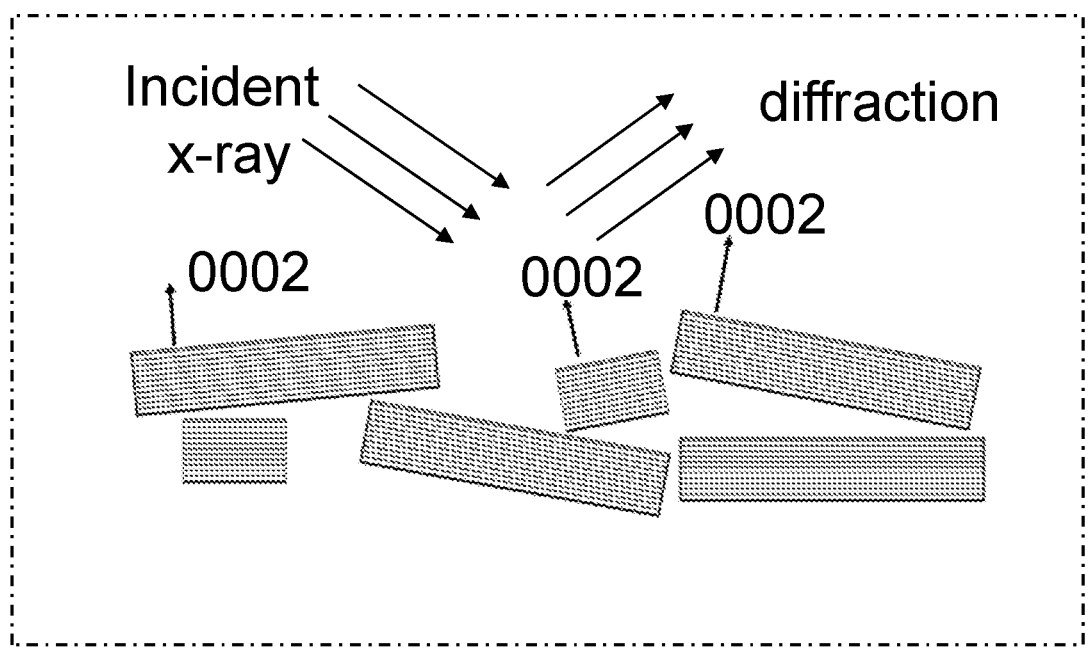
Figure 46:
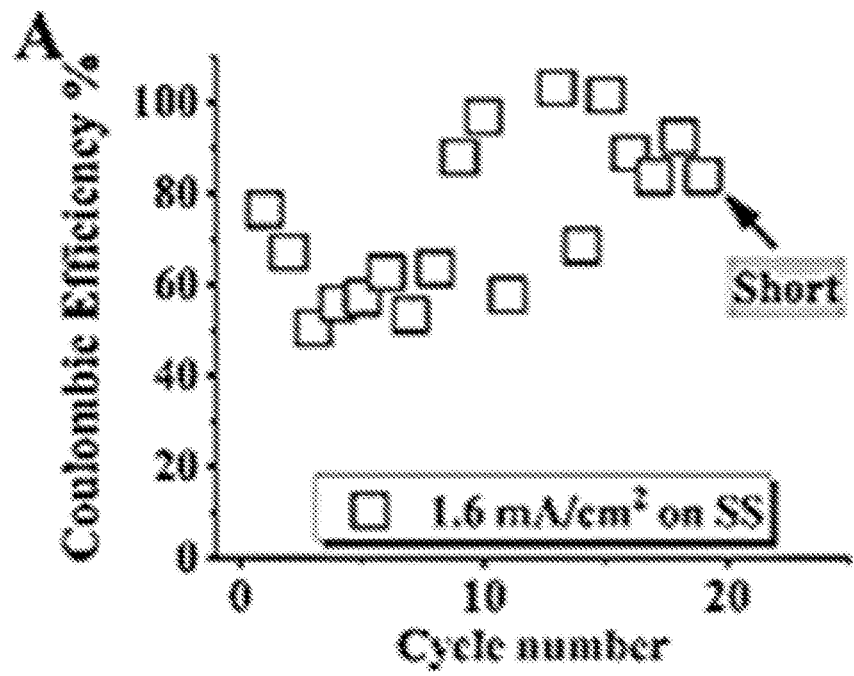
FIG. 46 shows (A) and (B) Zn plating/stripping CE on stainless steel.
Figure 46:
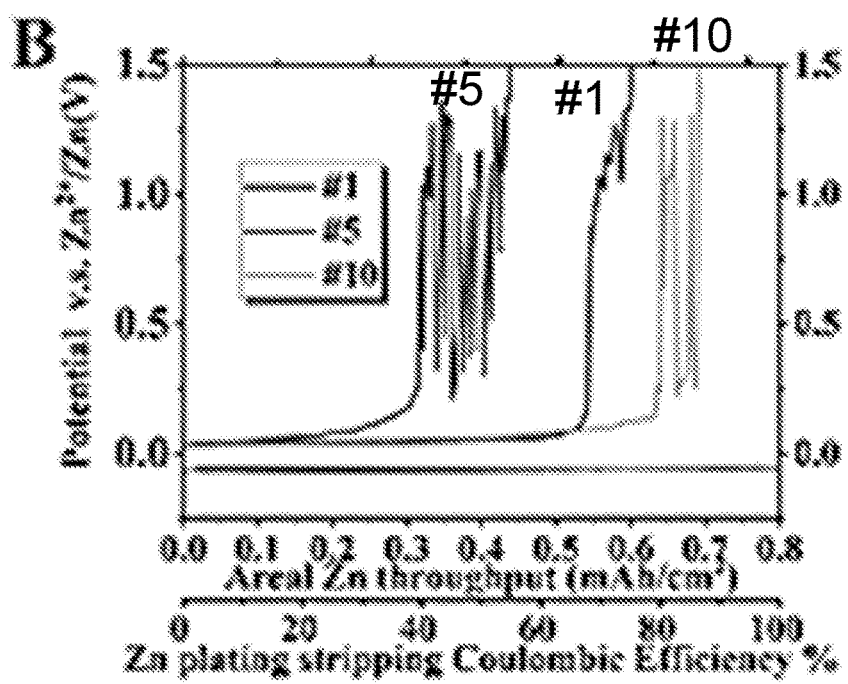
Figure 47:
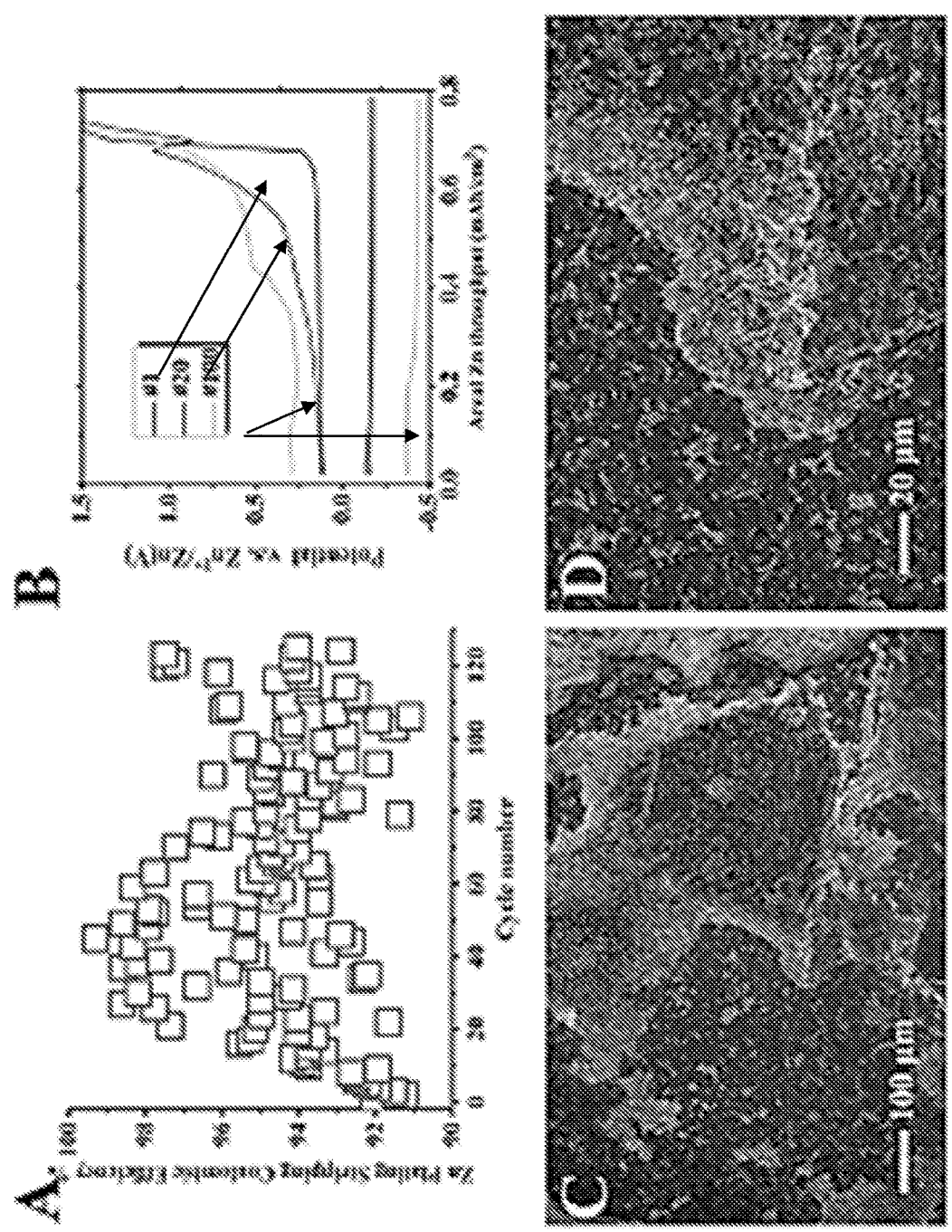
FIG. 47 shows (A), (B), (C), (D) Zn plating/stripping CE and deposition morphology on un-aligned graphene.
Figure 48:
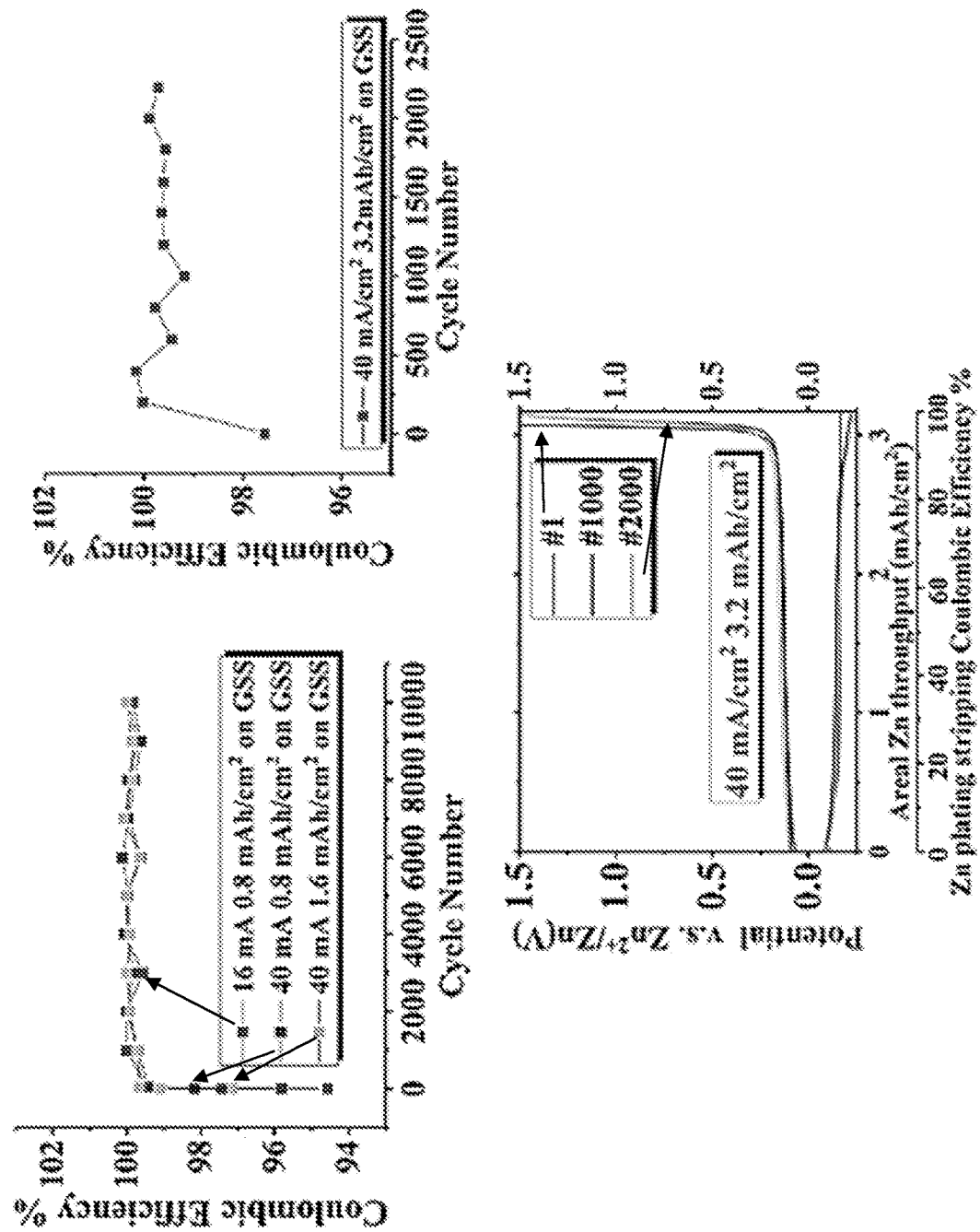
FIG. 48 shows Zn plating/stripping CE on graphene coated stainless steel.

This crystallographic re-alignment can also be shown by X-ray diffraction (FIG. 45). A significantly intensified 0002 diffraction peak, which is the basal plane, was observed. This intensification of the basal plane is indicative of horizontally aligned basal planes, more of planes can satisfy Bragg's law in the 2θ scan and generate more diffracted X-ray.

Figure 50:
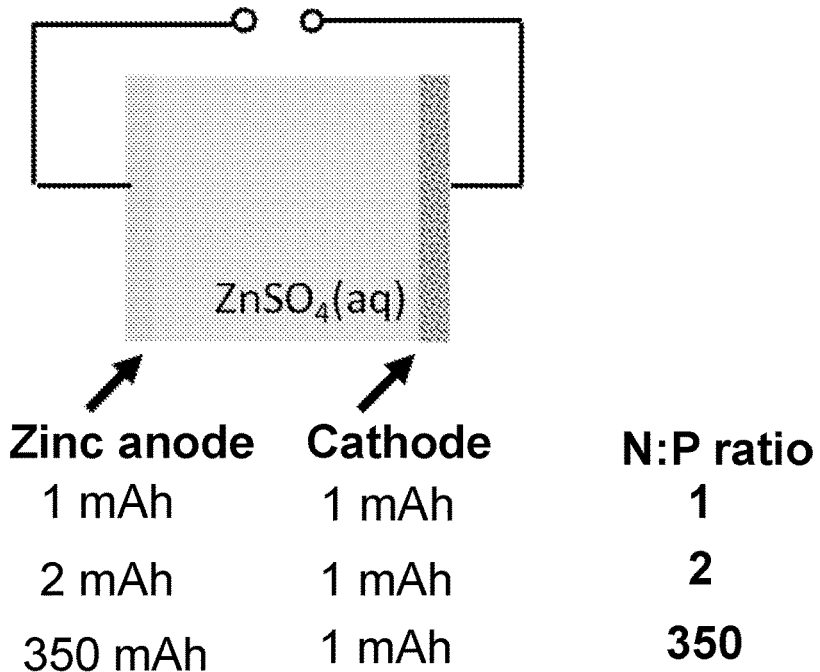
FIG. 50 shows significance of N:P ratio.
Figure 51:
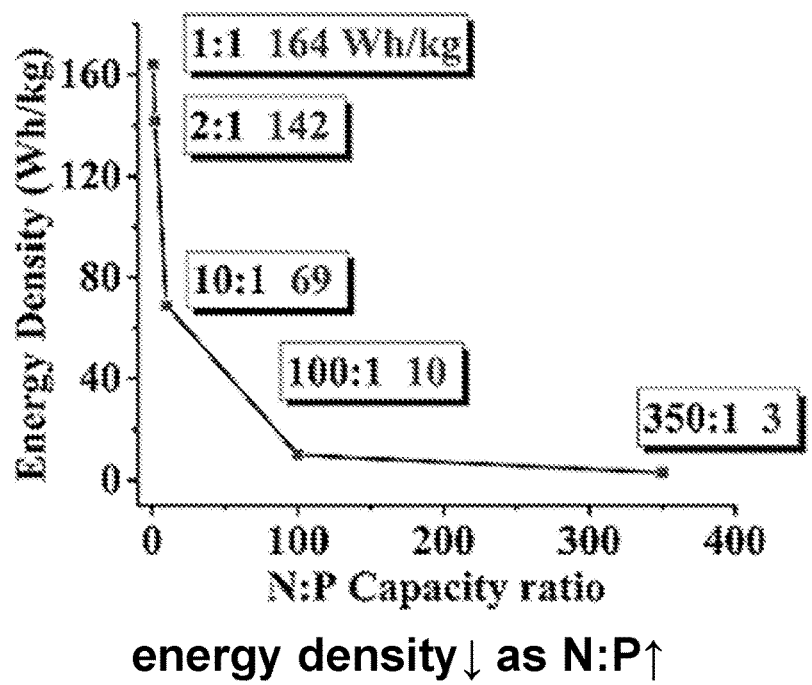
FIG. 51 shows dependence of energy density on N:P ratio
Figure 52:
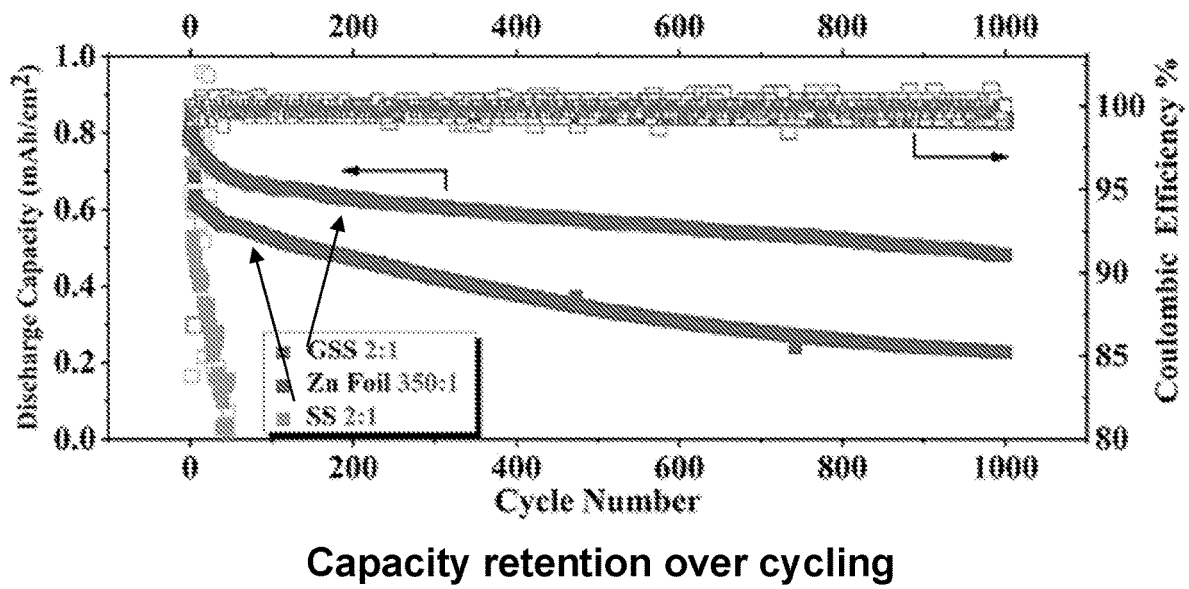
FIG. 52 shows capacity retention of Zn anodes and voltage profile.
Figure 52:
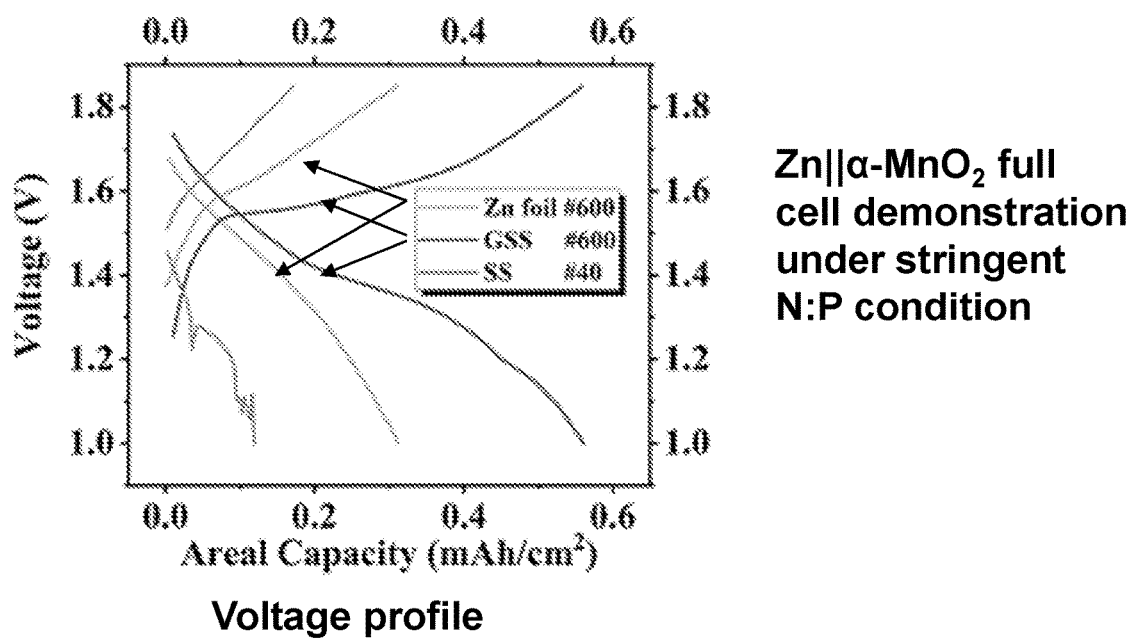

Motivated by the high degree of reversibility (FIGS. 46-49) achieved in the epitaxial Zn anode, these anodes were evaluated full batteries, i.e., the epitaxial zinc anodes were paired with a cathode (FIGS. 50-52). In constructing the full batteries, specific attention was given to an important, but oftentimes overlooked battery parameter, the N:P ratio. Even if the reversibility of the metal plating/stripping is very low, the large amount of extra Zinc stored in the anode can sustain the long cycling of the battery.

Figure 53:
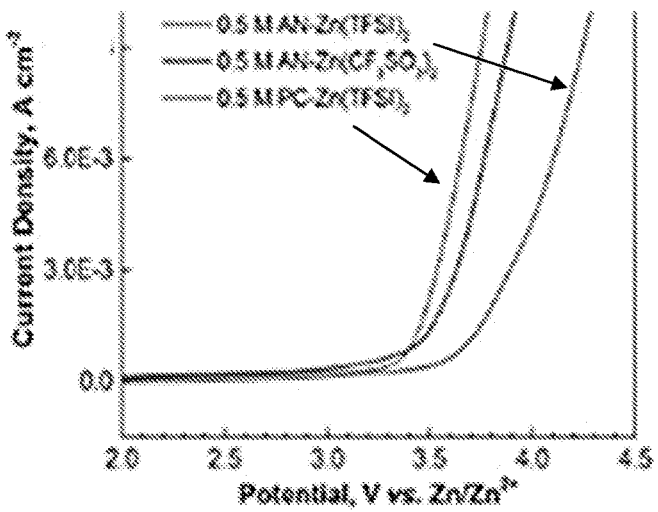
FIG. 53 shows electrochemical stability of Zn electrolytes and Zn plating/stripping Coulombic efficiency in organic electrolyte.
Figure 53:
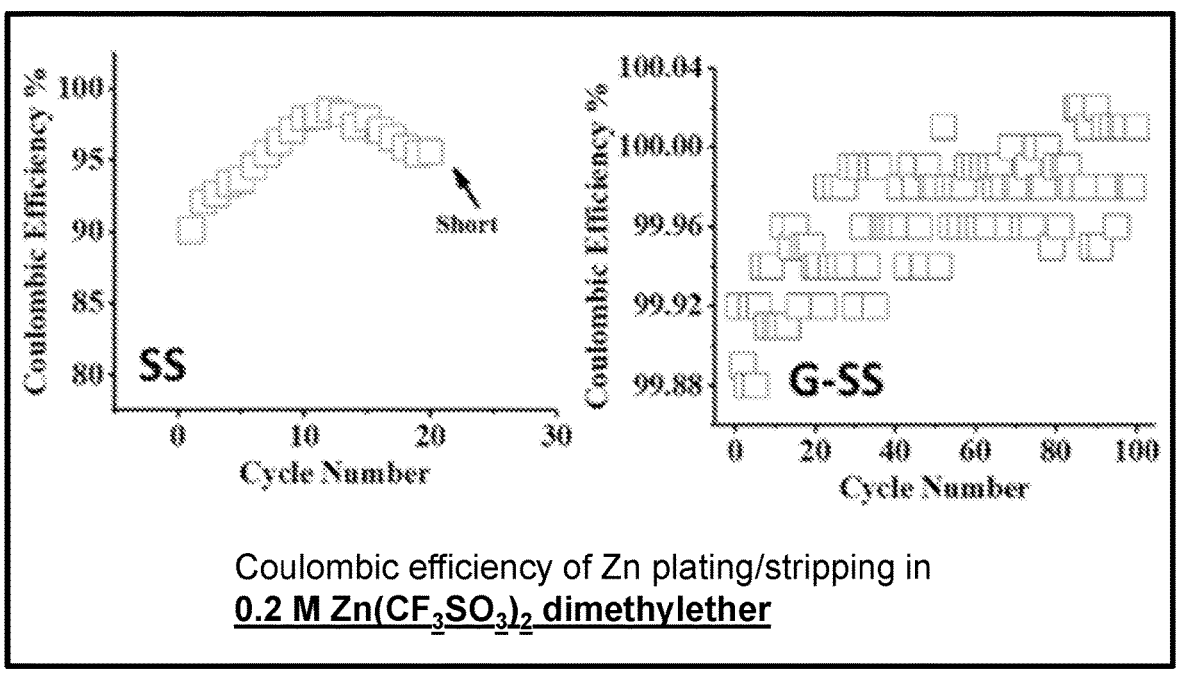
Figure 54:
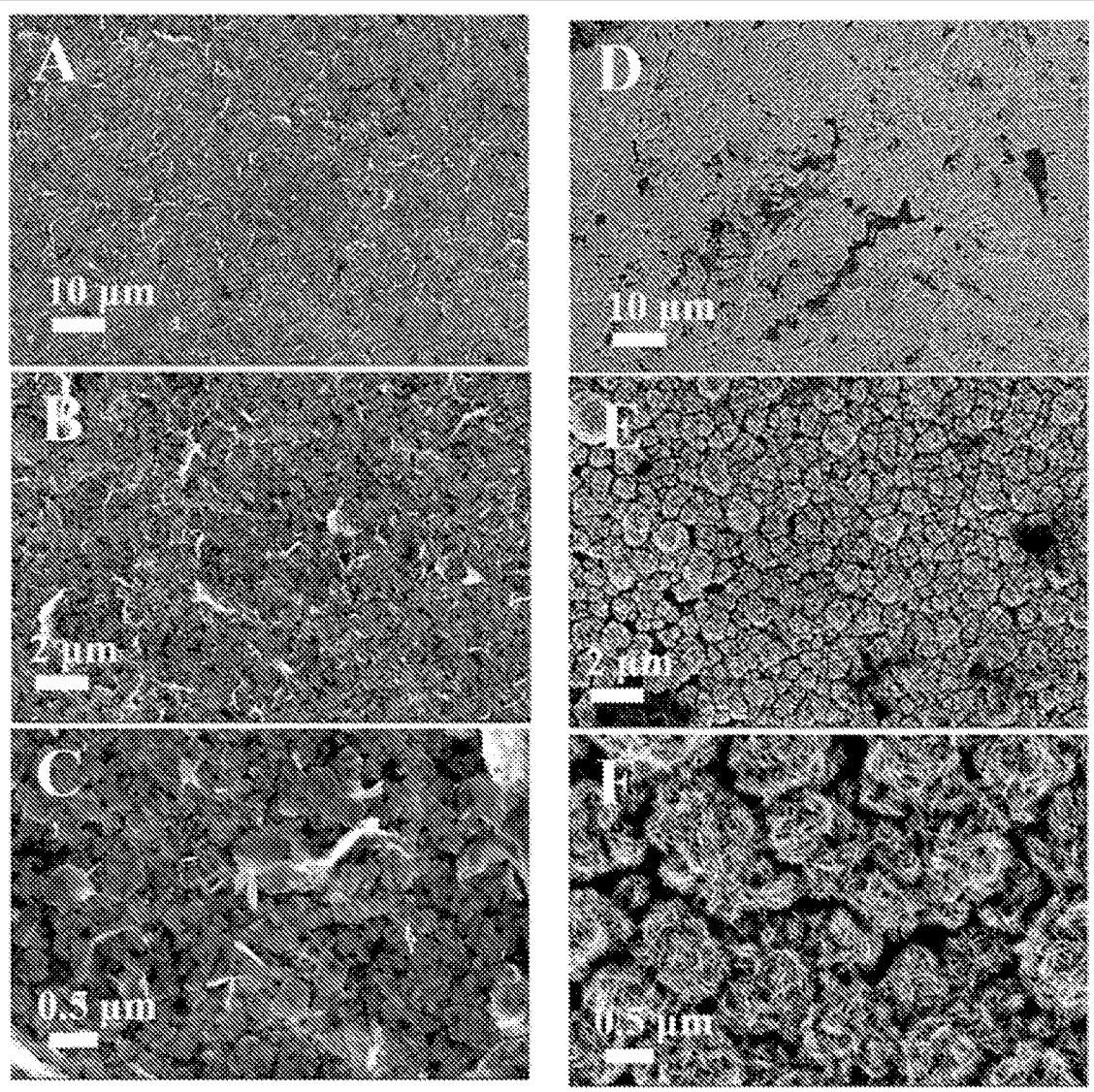
FIG. 54 shows Zn plating/stripping morphology in an organic electrolyte. SEM images of Zn deposits on (A)(B)(C) graphene substrate and (D)(E)(F) bare stainless-steel substrate from 0.2 M $Zn(CF_3SO_3)_2$ in dimethylether.

FIGS. 53-54 report that graphene can epitaxially regulate Zn electrodeposition also in non-aqueous electrolyte for high-voltage Zn batteries.

EXAMPLE 3

This example provides a description of conducting coatings, anodes, and devices of the present disclosure.

Figure 56:
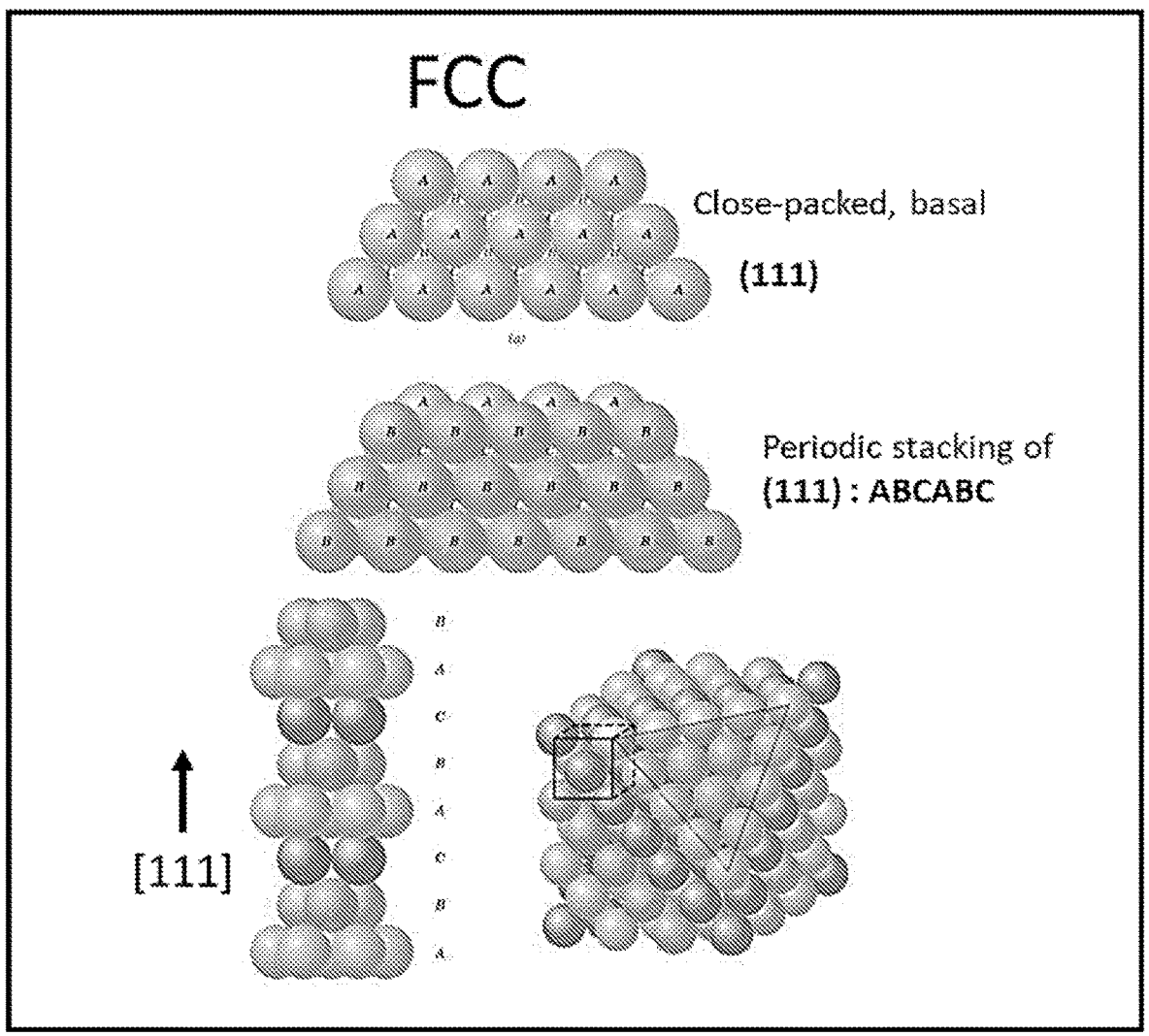
FIG. 56 shows atomic packing of FCC crystals.

(111)-textured Au was identified as an epitaxial substrate for Al metal deposition. Both of the two crystals have a FCC lattice and show small lattice misfit (FIG. 55 and FIG. 56).

Figure 57:
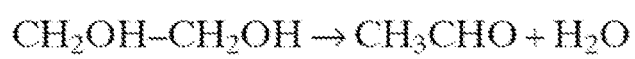
FIG. 57 shows synthesis of a 111-textured Au nanosheet.
Figure 57:
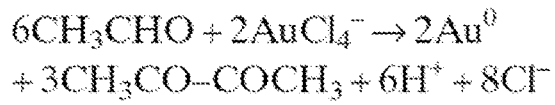
Figure 57:
Figure 57:
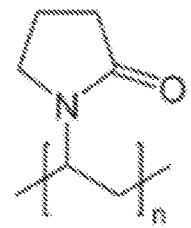
Figure 57:
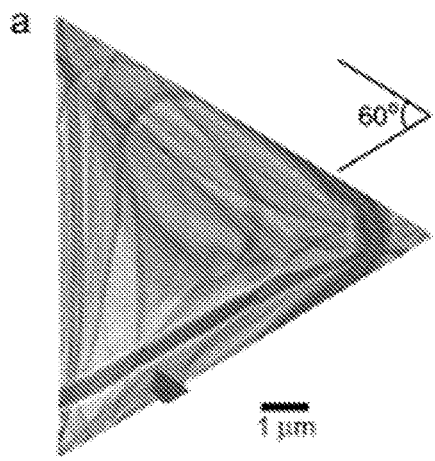
Figure 57:
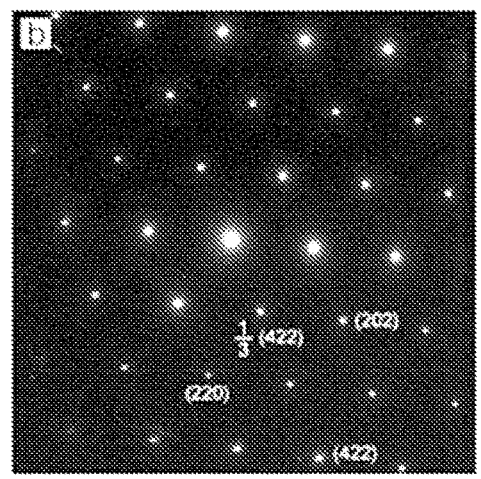
Figure 58:
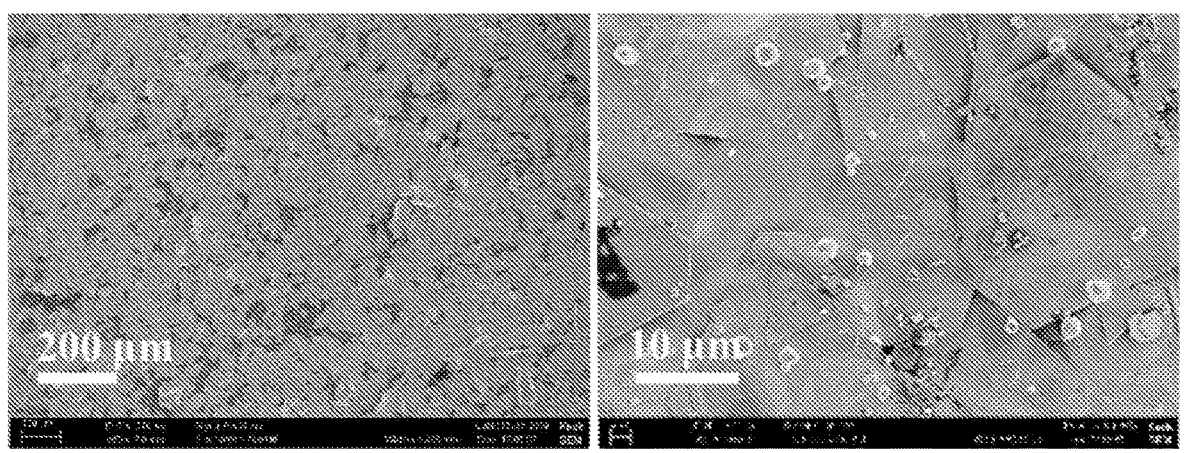
FIG. 58 shows SEM micrographs of 111-textured Au nanosheets.
Figure 59:
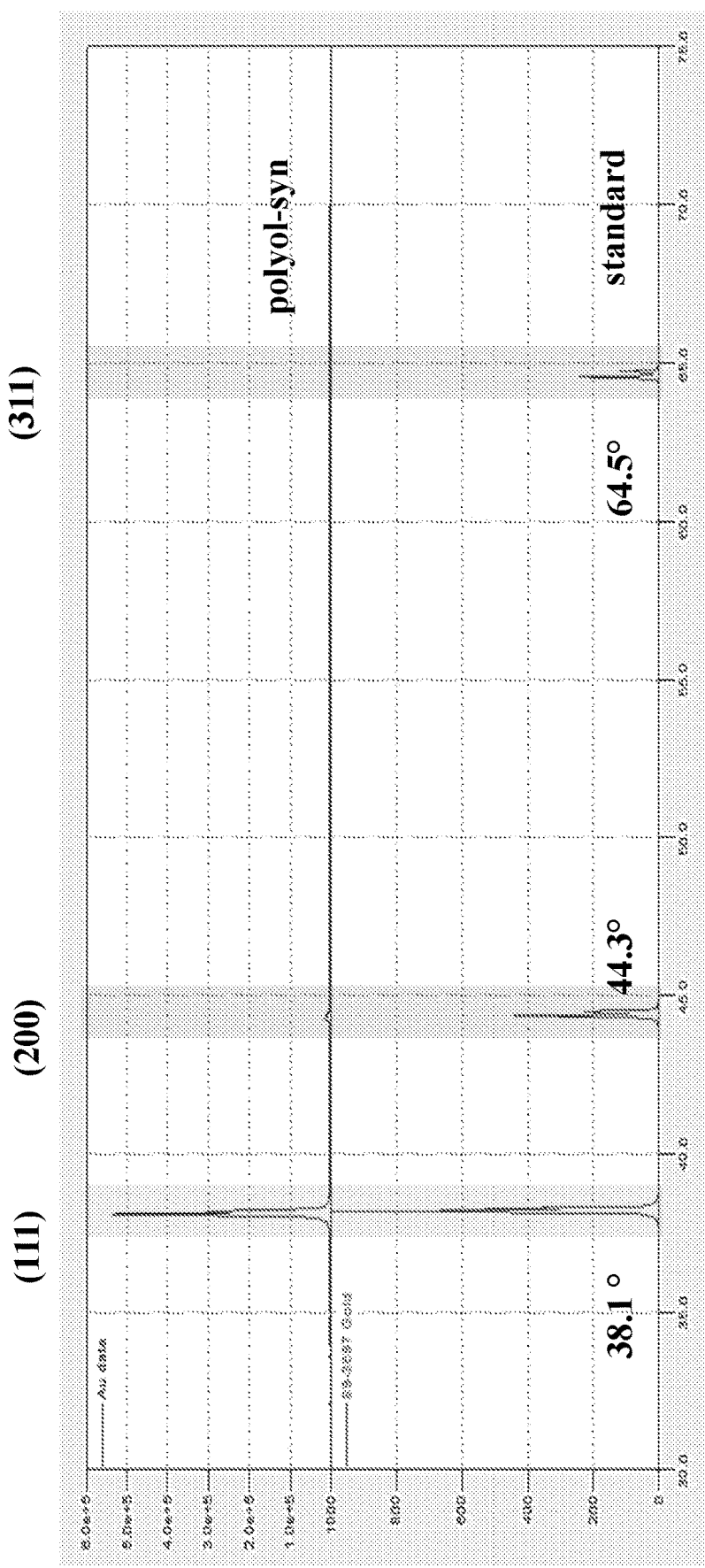
FIG. 59 shows X-ray diffraction of 111-textured Au nanosheets.

Au preparation (FIG. 57, FIG. 58, and FIG. 59). Au template was synthesized by hydrothermal method. 222 mg of PVP with molecular weight of 40K was first dissolved in 20 ml ethylene glycol. Then 0.4 ml aqueous $HAuCl_4$ (250 mM) solution was added. Then solution was then transferred to a 50 ml hydrothermal reactor and heat at 120° C. in oven for 12 hours. After reaction, the products were centrifuged with ethanol three times. 2 ml 1-butanol was then added to the products and ultrasound to generate a well-dispersed solution. The solution was then dipped on the stainless steel (SS) and quickly dried in vacuum oven at 80° C. to fabricate the Au nanosheet coated SS. The loading of Au nanosheet on SS is 1-2 $mg/cm^2$.

Figure 60:
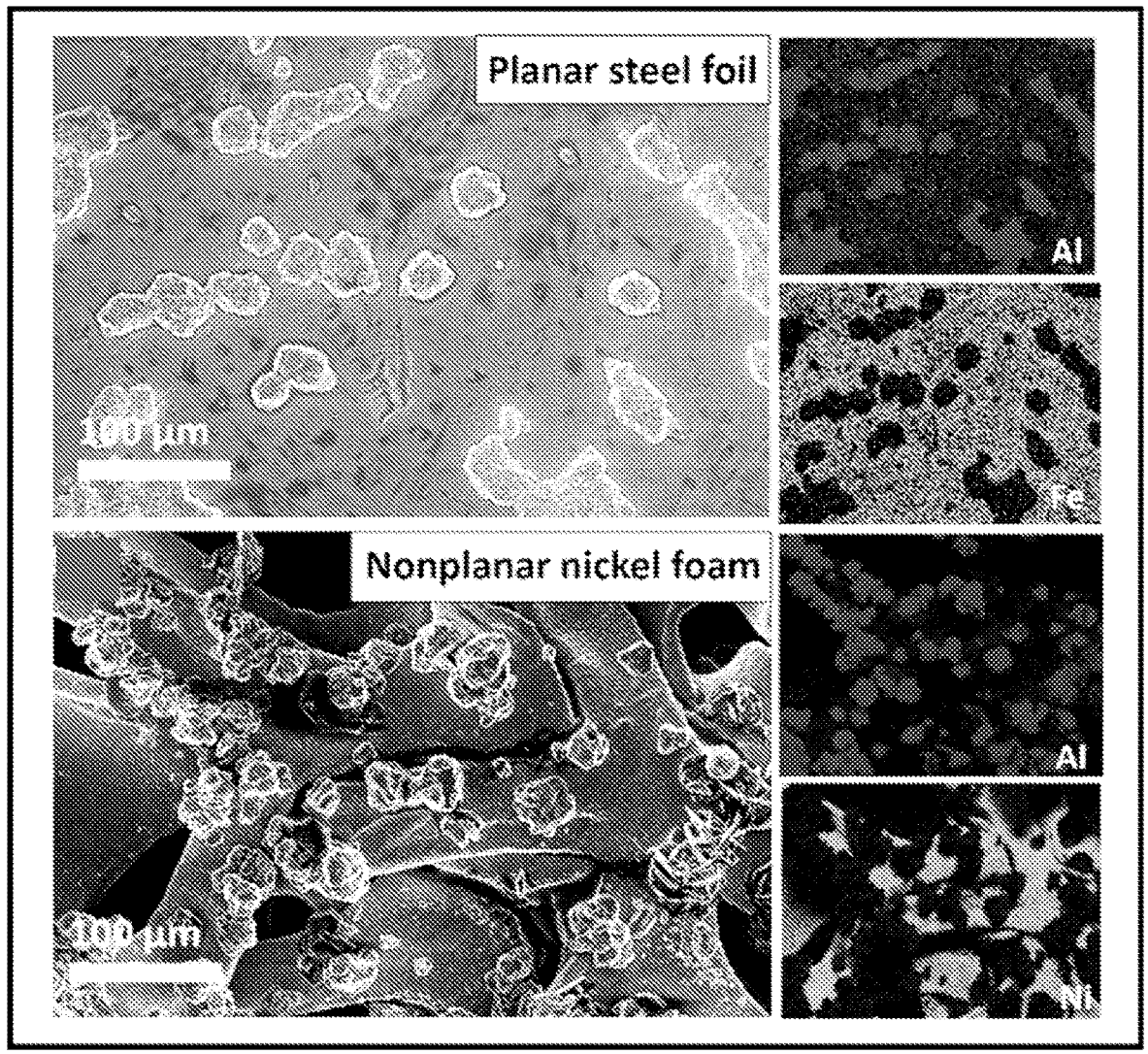
FIG. 60 shows Al metal deposition morphology on stainless steel, and on nickel foam.
Figure 61:
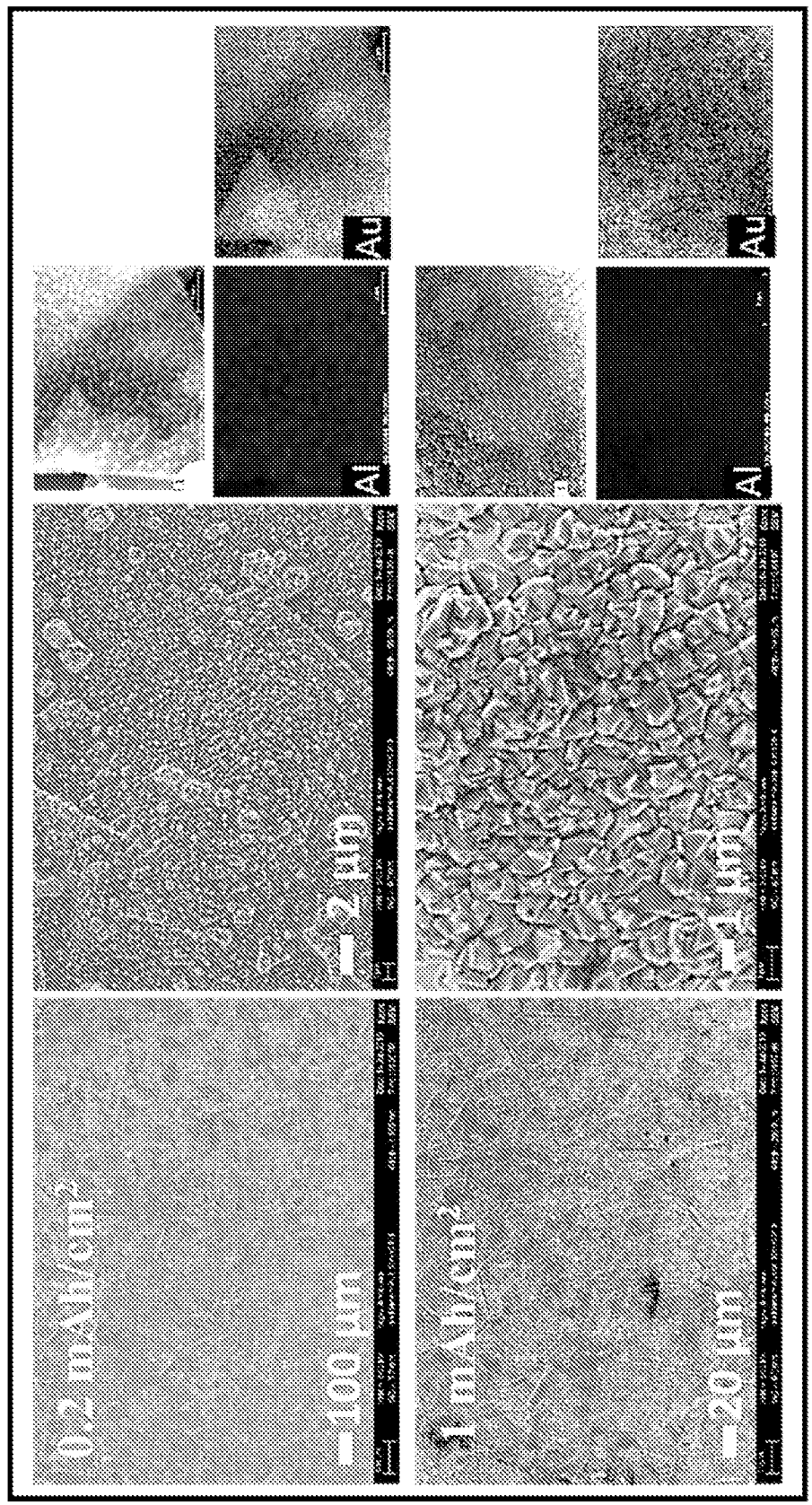
FIG. 61 shows Al metal deposition morphology on 111-Au nanosheets.

Al electrochemical deposition (FIG. 60 and FIG. 61). $AlCl_3$-[EMIm]Cl with molar ratio of 1.5:1 are used for the study of electrochemical deposition. The electrolyte was synthesized by adding $AlCl_3$ into [EMIm]Cl slowly with continuous stirring until forming clear solution. All the experiments were conducted in Ar-filled glove box. In order to obtain the SEM image of Al deposition, coin cells with PTFE O-ring (Thickness 0.78 mm, Diameter 6.35 mm) as separator were assembled. The coin cells were assembled with the order of Al anode, O-ring filled with electrolytes, stainless steel (SS) spacer (or Au-SS spacer), and spring. The assembled electrochemical cells were discharged at designed current density to deposit Al on the SS or Au. The cells were disassembled in glovebox, and the spacers were washed by anhydrous tetrahydrofuran (THF) before SEM test.

EXAMPLE 4

This example provides an example of a conducting coating, anode, and device of the present disclosure.

Figure 62:
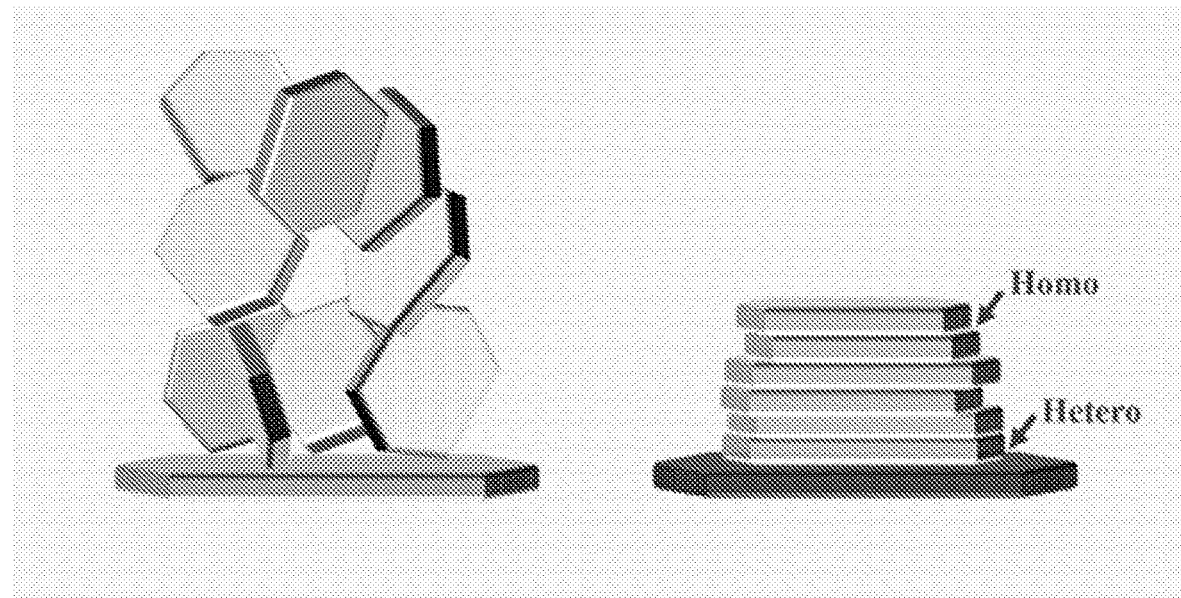
FIG. 62 shows design principles of epitaxial metal electrodeposition.
Figure 62:
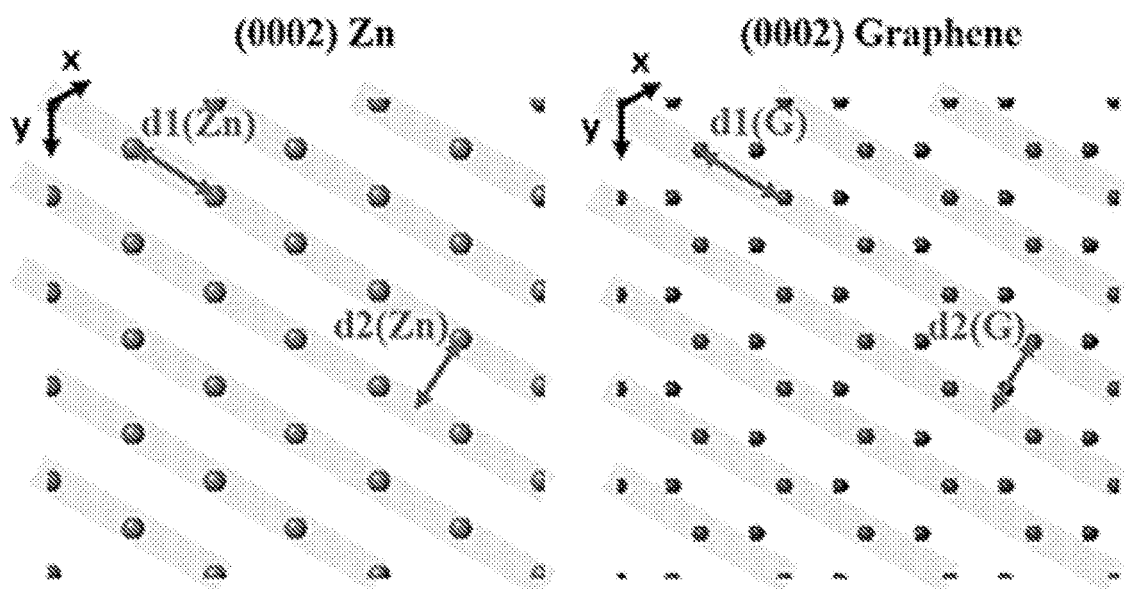
Figure 63:
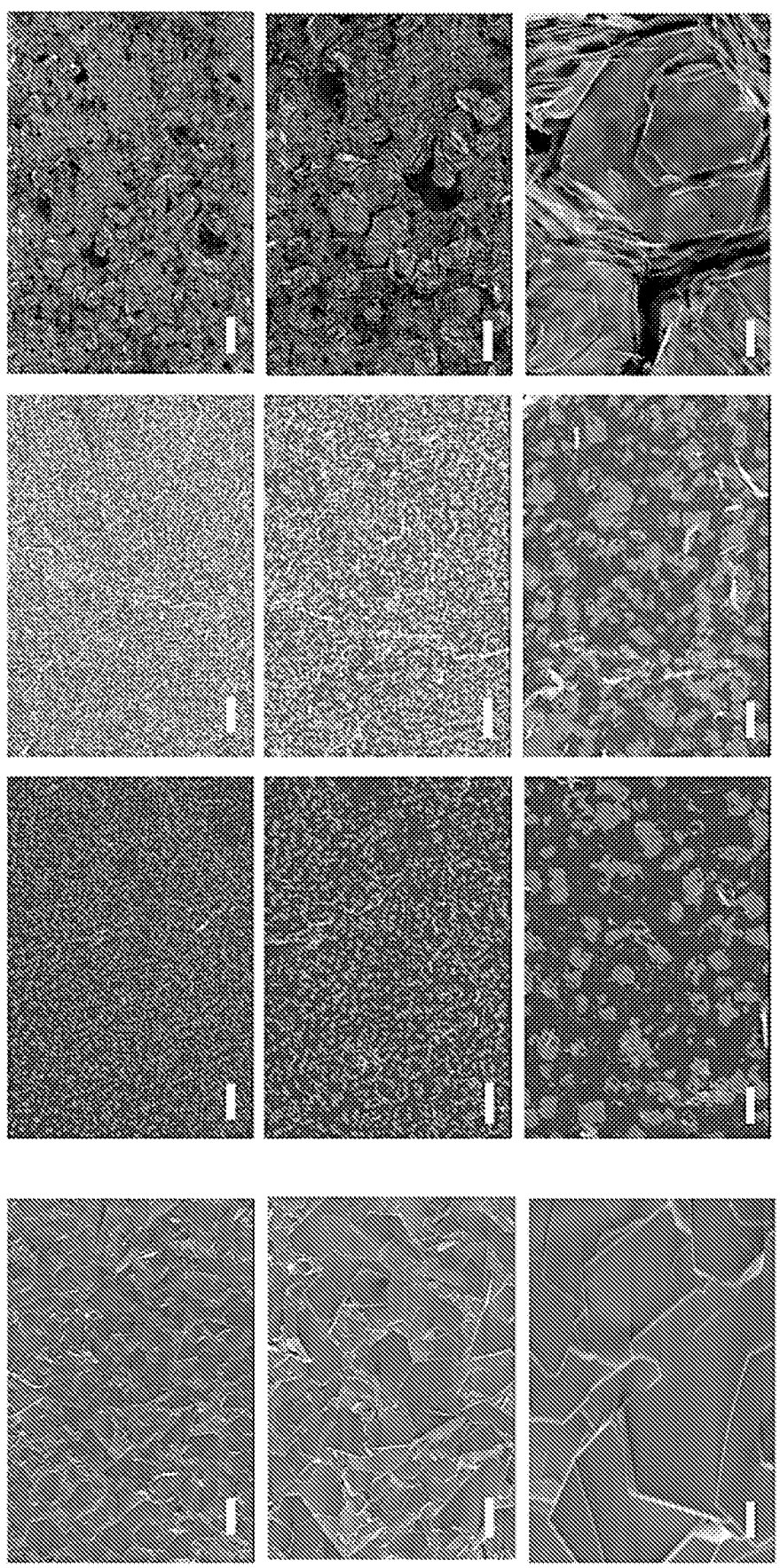
FIG. 63 shows SEM characterization of Zn deposits on bare stainless steel and graphene-coated stainless steel.
Figure 64:
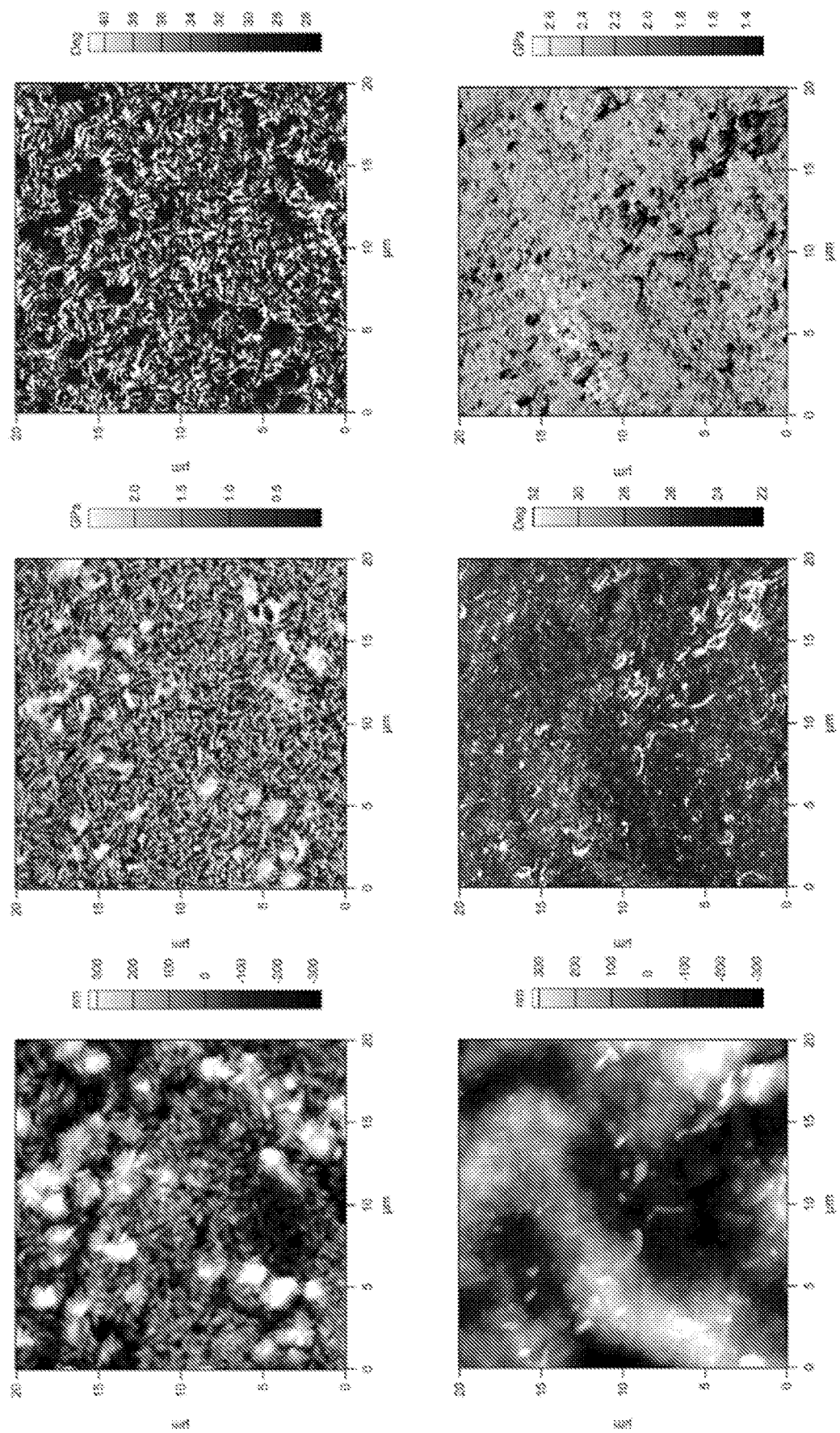
FIG. 64 shows AFM characterization of Zn deposits on bare stainless steel and graphene-coated stainless steel.
Figure 65:
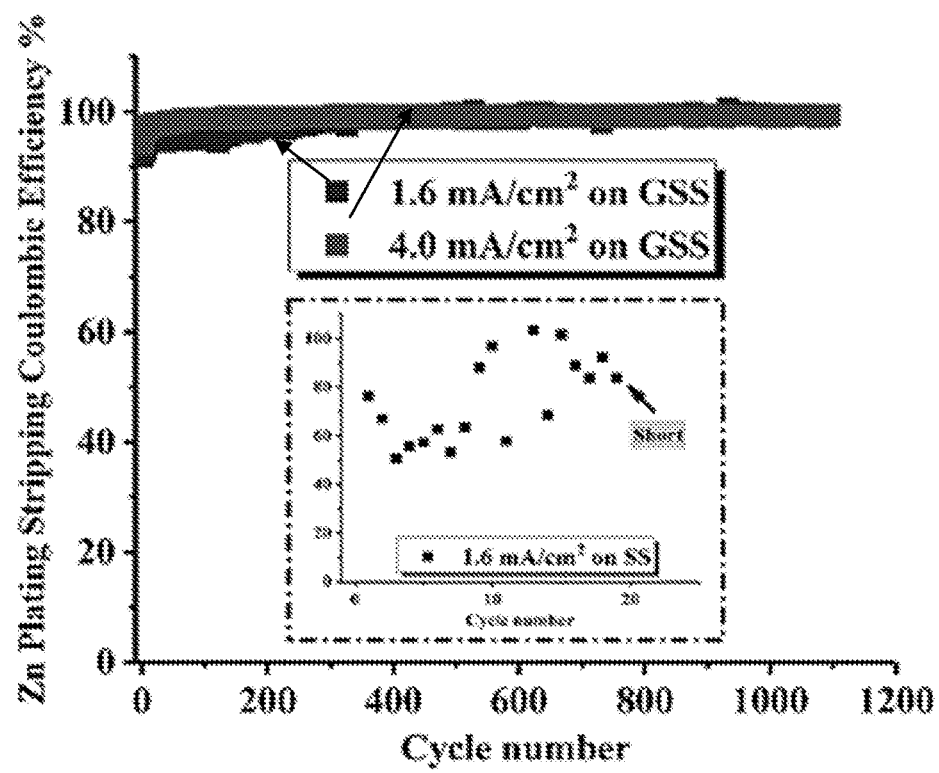
FIG. 65 shows coulombic efficiency measurements of zinc plating stripping.
Figure 65:
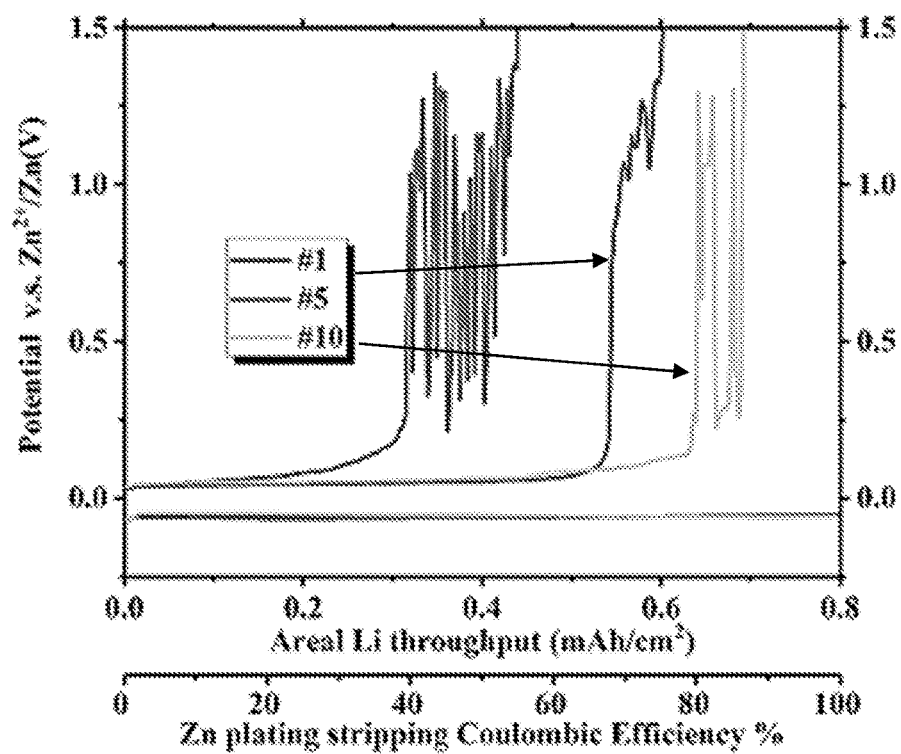
Figure 65:
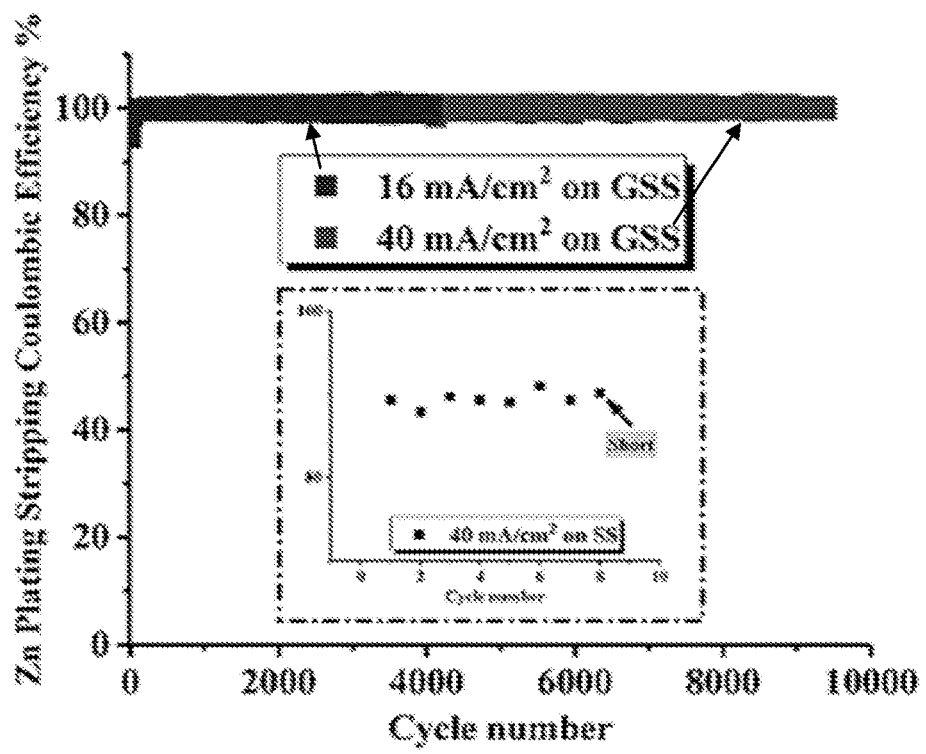
Figure 65:
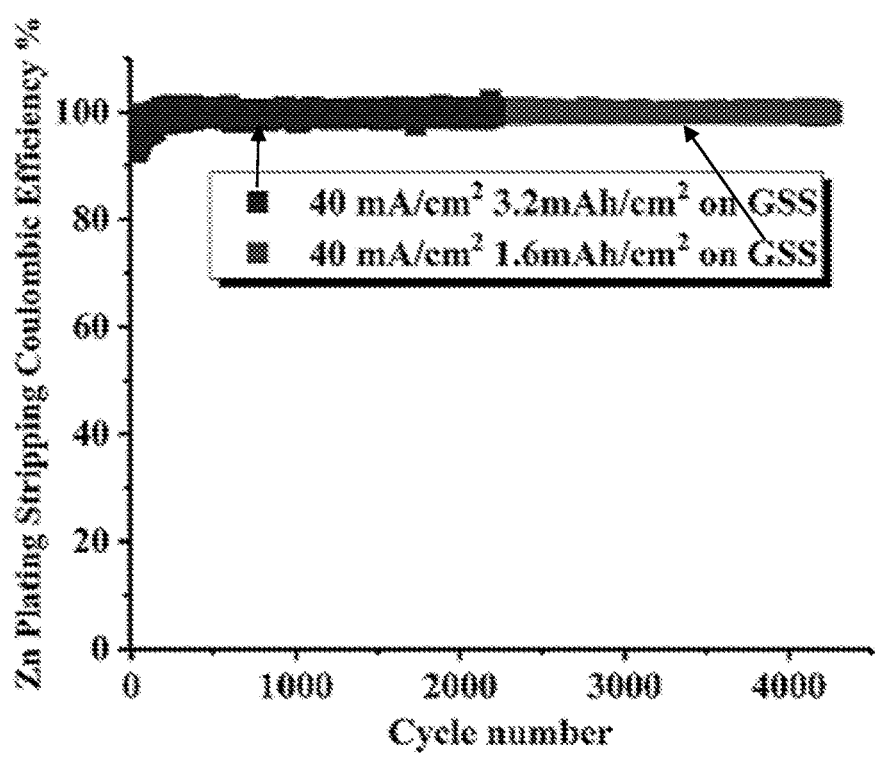
Figure 65:
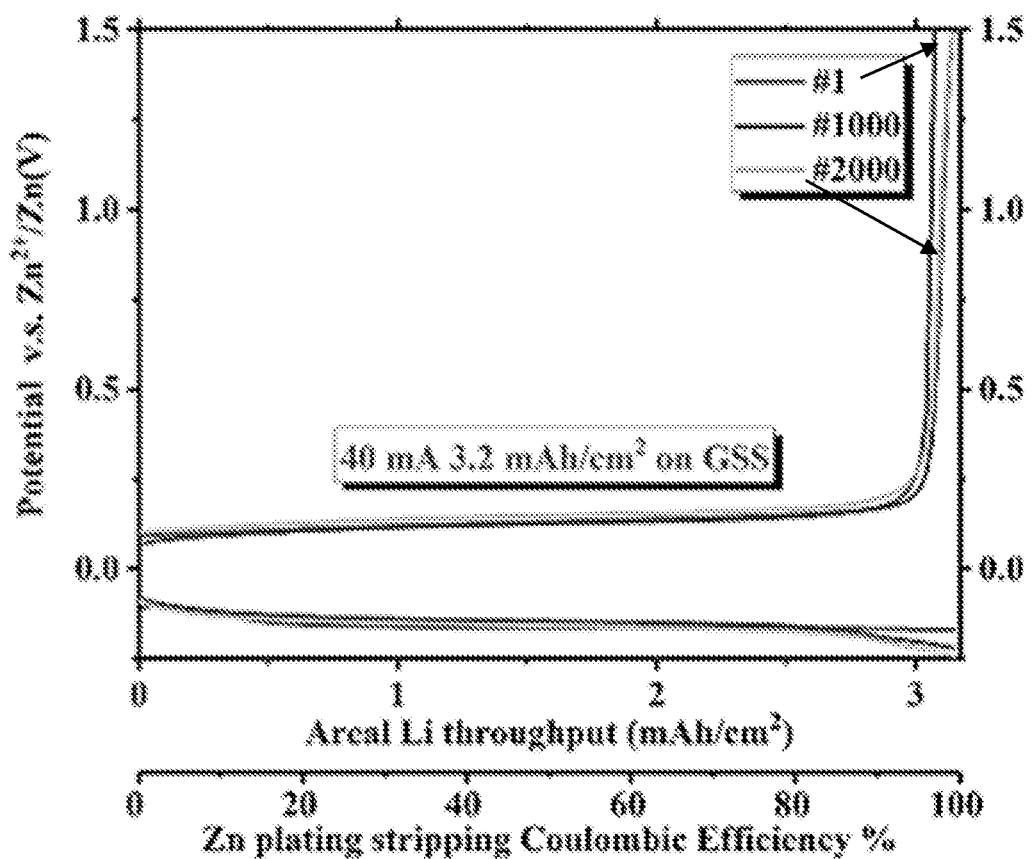

Graphene was identified as an epilayer and zinc as the active anode metal (FIG. 62). A graphene layer was formed based on the methods used in Example 1. FIG. 63 and FIG. 64 show the morphology of epitaxially electrodeposited Zn on graphene. FIG. 65 describes the zinc plating stripping efficiency on graphene coated substrate and bare substrate (stainless steel).

Although the present disclosure has been described with respect to one or more particular embodiments and/or examples, it will be understood that other embodiments and/or examples of the present disclosure may be made without departing from the scope of the present disclosure.

The invention claimed is:

1. An anode comprising:
   a metal member;
   a conducting coating disposed on at least a portion of the metal member;
   an electrodeposited layer disposed on at least a portion of the conducting coating; and
   a coherent interface having a lattice misfit of less than 15% between the conducting coating and the electrodeposited layer,
   wherein the conducting coating epitaxially templates deposition of the electrodeposited layer, and
   the conducting coating is chemically inert and/or electrochemically stable under electrochemical cycling conditions.

2. The anode of claim 1, wherein the conducting coating comprises an organic material, an inorganic material, a metal, a metal alloy, or intermetallic compound.

3. The anode of claim 2, wherein the conducting coating is graphene.

4. The anode of claim 2, wherein the conducting coating is a metal chosen from gold, silver, zirconium, titanium, iron, chromium, and combinations thereof or a metal alloy comprising a combination of gold, silver, zirconium, titanium, iron, and chromium.

5. The anode of claim 1, wherein the conducting coating is crystalline.

6. The anode of claim 1, wherein at least a portion or all of an exterior surface of the conducting coating comprises crystal facets chosen from a (001) plane in hexagonal closest packed structure, a (111) plane in face centered cubic structure, and a (110) plane in body centered cubic structure.

7. The anode of claim 6, wherein 80%-100% of the crystal facets of the conducting coating are a (001) plane in hexagonal closest packed structure, a (111) plane in face centered cubic structure, or a (110) plane in body centered cubic structure.

8. The anode of claim 1, wherein the thickness of the conducting coating is a single layer to 100 μm.

9. The anode of claim 1, wherein the conducting coating has a conductivity of $10^1$ to $10^9$ S/m.

10. The anode of claim 1, wherein the metal member is an active metal member or an inactive metal member.

11. A device comprising one or more anode(s) of claim 1.

12. The device of claim 11, wherein the device is an electrochemical device.

13. The device of claim 11, wherein device is configured so that the conducting metal ions reversibly electrodeposit on at least a portion or all of the surface of the conducting coating in contact with the electrolyte forming uniform metal layers.

14. The device of claim 13, wherein the metal layers comprising one or more crystalline domain(s) or the metal layers are crystalline metal layers.

15. The device of claim 11, wherein the electrochemical device is a battery, a supercapacitor, a fuel cell, an electrolyzer, or an electrolytic cell.

16. The device of claim 15, wherein the battery is a metal ion-conducting battery.

17. The device of claim 16, wherein the ion-conducting battery is a lithium-ion conducting battery, a potassium-ion conducting battery, a sodium-ion conducting battery, a calcium-ion conducting battery, a magnesium-ion conducting battery, a zinc-ion conducting battery, an aluminum-ion conducting battery, or an iron-ion conducting battery.

18. The device of claim 15, wherein the battery further comprises one or more cathode(s) and/or one or more electrolyte(s) and/or, optionally, one or more current collector(s) and/or, optionally, one or more additional structural component(s).

19. The device of claim 18, wherein the electrolyte is a liquid electrolyte or solid-state electrolyte.

20. The device of claim 19, wherein the liquid electrolyte is an aqueous electrolyte or a non-aqueous electrolyte.

21. The device of claim 18, wherein the one or more additional structural component(s) is/are chosen from bipolar plates, external packaging, and electrical contacts/leads to connect wires, and combinations thereof.

22. The device of claim 15, wherein the battery comprises a plurality of cells, each cell comprising a cathode, an anode, and optionally, an electrolyte, a current collector, or a combination thereof.

23. The device of claim 22, wherein the battery comprises 1 to 500 cells.

24. The device of claim 15, wherein battery exhibits one or more of the following:
   the battery does not exhibit detectible dendritic growth and/or orphaning, and/or
   a plating and/or stripping Coulombic efficiency of 95% or greater and/or,
   a plating and/or stripping Coulombic efficiency of 95% or greater for 10,000 cycles or greater and/or at rate of 40 mA/cm$^2$ or greater.

25. The anode of claim 1, wherein the conducting coating comprises a horizontally aligned close-packed basal plane with respect to the metal member surface.

26. The anode of claim 1, wherein the conducting coating comprises a plurality of exposed crystal facets having desired texture and alignment such that the reduced form of metal-ions of a metal ion-conducting electrochemical device having a lattice misfit of less than 15% between the exposed crystal facets and the reduced form of metal-ions.

27. The anode of claim 1, wherein the conducting coating comprises a desired texture and alignment formed by applying a shear force during deposition of the conducting coating.

* * * * *